US012532130B2

(12) United States Patent
Pedersen et al.

(10) Patent No.: US 12,532,130 B2
(45) Date of Patent: Jan. 20, 2026

(54) HEARING DEVICE COMPRISING A DIRECTIONAL SYSTEM CONFIGURED TO ADAPTIVELY OPTIMIZE SOUND FROM MULTIPLE TARGET POSITIONS

(71) Applicant: Oticon A/S, Smoerum (DK)

(72) Inventors: Michael Syskind Pedersen, Smoerum (DK); Jesper Jensen, Smoerum (DK); Adam Kuklasiński, Smoerum (DK); Fares El-Azm, Smoerum (DK); Sam Nees, Smoerum (DK); Sigurdur Sigurdsson, Smoerum (DK); Silvia Tarantino, Smoerum (DK); Poul Hoang, Smoerum (DK); Jan M. De Haan, Smoerum (DK); Mojtaba Farmani, Smoerum (DK); Svend Oscar Petersen, Smoerum (DK)

(73) Assignee: Oticon A/S, Smørum (DK)

( * ) Notice: Subject to any disclaimer, the term of this patent is extended or adjusted under 35 U.S.C. 154(b) by 216 days.

(21) Appl. No.: 18/330,416

(22) Filed: Jun. 7, 2023

(65) Prior Publication Data

US 2024/0414483 A1 Dec. 12, 2024

(51) Int. Cl.

*H04R 25/00* (2006.01)
*G10L 25/30* (2013.01)
*G10L 25/78* (2013.01)

(52) U.S. Cl.

CPC ............ *H04R 25/407* (2013.01); *G10L 25/30* (2013.01); *G10L 25/78* (2013.01); *H04R 25/405* (2013.01);

(Continued)

(58) Field of Classification Search

CPC .. H04R 25/407; H04R 25/405; H04R 25/505; H04R 2225/43; H04R 1/1083; H04R 1/406; H04R 3/005; H04R 25/507; H04R 25/43; H04R 2430/23; H04R 3/04; H04R 2430/00; G10L 25/30; G10L 25/78; G10L 21/0208; G10L 2021/02166

See application file for complete search history.

(56) References Cited

U.S. PATENT DOCUMENTS

2019/0272842 A1 9/2019 Bryan et al.

FOREIGN PATENT DOCUMENTS

EP 2701145 A1 2/2014
EP 2884763 A1 6/2015

(Continued)

OTHER PUBLICATIONS

Moore Alastair H. et al: "A compact Noise Covariance Matrix Model for MVDR Beamforming", IEEE/ACM Tranasactions On Audio, Speech, and Language Processing, vol. 30, Jun. 7, 2022 (Jun. 7, 2022), pp. 2049-2061, XP093175834.

(Continued)

*Primary Examiner* — Tuan D Nguyen

(57) ABSTRACT

A hearing aid comprises a multitude M≥2 microphones adapted for providing M electric input signals (x) representative of an environment of a user, at least one beamformer for generating at least one beamformed signal in dependence of beamformer weights (w) configured to be applied to said electric input signals, thereby providing said at least one beamformed signal (Y) as a weighted sum of the M of electric input signals. The beamformer weights (w) are adaptively optimized to a plurality of target positions (θ) by maximizing a target signal to noise ratio (SNR) for sound from the target positions (θ).

18 Claims, 20 Drawing Sheets

(52) U.S. Cl.
CPC ....... *H04R 25/505* (2013.01); *H04R 2225/43* (2013.01)

(56) References Cited

FOREIGN PATENT DOCUMENTS

| | | | |
|---|---|---|---|
| EP | 3252766 | A1 | 12/2017 |
| EP | 330078 | A1 | 3/2018 |
| EP | 3413589 | A1 | 12/2018 |
| EP | 3694229 | A1 | 8/2020 |
| EP | 3883266 | A1 | 9/2021 |
| WO | 2009132646 | A1 | 11/2009 |

OTHER PUBLICATIONS

Shankar Nikhil et al: "Real-time dual-channel speech enhancement by VAD assitsed MVDR beamformer for hearing aid applications using smartphone", 2022 42nd Annual International Conference of the IEEE Engineering Ini Medicine & Biology Society (EMBC), IEEE, Jul. 20, 2022 (Jul. 20, 2020), pp. 952-955, XP033815291.

Warsitx E. et al: "Blind Acoustic Beamforming Based on Generalized Eigenvalue Decomposition", IEEE Transactions on Audio, Speech and Language Processing, IEEE, US, vol. 15, No. 5, Jul. 1, 2007 (Jul. 1, 2007), pp. 1529-1539, XP011185753.

[Bitzer &Simmer; 2001] J. Bitzer and K. U. Simmer, "Superdirective Microphone Arrays," in "Microphone Arrays—Signal Processing Techniques," M. Brandstein and D. Wards (Eds.), Springer-Verlag, 2001, Chapter 2.

[Simmer et al.; 2001] Simmer, K. U., Bitzer, J., & Marro, C. "Post-filtering techniques", in "Microphone Arrays—Signal Processing Techniques," M. Brandstein and D. Wards (Eds.), Springer-Verlag, 2001, Chapter 3.

[Souden et al.; 2010] Souden, M., Benesty, J., and Affes, S., "On Optimal Frequency-Domain Multichannel Linear Filtering for Noise Reduction", IEEE Audio Speech and Language Processing vol. 18, No. 2, 2010, pp. 260-276.

[Warsitz & Haeb-Umbach; 2007] E. Warsitz and R. Haeb-Umbach, "Blind acoustic beamforming based on generalized eigenvalue decomposition", IEEE Transactions on Audio, Speech, and Language Processing, vol. 15, No. 5, pp. 1529-1539, 2007.

HEARING DEVICE COMPRISING A DIRECTIONAL SYSTEM CONFIGURED TO ADAPTIVELY OPTIMIZE SOUND FROM MULTIPLE TARGET POSITIONS

TECHNICAL FIELD

The present applicant relates to the field of hearing devices, e.g. hearing aids or headsets, in particular to noise reduction in hearing devices.

In directional noise reduction, the target sound is often assumed to be impinging from a certain direction or position, as illustrated in FIG. 1A. Assuming that the relative transfer function between the microphones for a given target position is known, we can create a directional signal which attenuates the noise under the constraint that the target position is unaltered.

For a frequency band, k, given a microphone input signal, x(k), comprising a multitude M of microphone signals $x(k)=[x_1(k), \ldots, x_M(k)]^T$, we can obtain an output signal y from a linear combination of the input signals by multiplying each microphone signal by a (complex-valued) weight, i.e. $y=w^Hx$, where $w(k)=[w_1(k), \ldots, w_M(k)]^T$ and H denotes the Hermitian transposition. In the present application, this functionality is termed 'beamforming' and is provided by a 'beamformer'.

The optimal beamformer weight $w_\theta$ that maximizes the signal to noise ratio (SNR) for a given (single) target position θ in a noise field described by the (inter-microphone) noise covariance matrix $R_V$ is given by $$w_\theta = \frac{R_V^{-1} d_\theta}{d_\theta^H R_V^{-1} d_\theta}$$

where $d_\theta$ is the relative transfer function between the microphones for signals received from a target position θ, see also FIG. 1A. The normalization factor in the denominator ensures that the weight scales the output signal such that the target signal (provided by the beamformer) is unaltered compared to the target signal (as it impinges) at the reference microphone. The target position θ is depending on the direction of the target as well as the distance from the target to the microphone array (comprising M microphones each providing a microphone signal, $x_m$, m=1, . . . , M). In the frequency domain, $d_\theta$ (which at each frequency index, k) is an M×1 vector, which-due to the normalization with the reference microphone-will contain M−1 complex values in addition to the value 1 at the reference microphone position. Likewise, the weight $w_\theta$ (at each frequency index, k) is an M×1 vector comprising a (generally complex) value to be applied to the M electric input signals $x_1(k), \ldots, x_M(k)$.

A covariance matrix of a vector $X=(X_1, \ldots, X_M)^T$ is a general term for a matrix C, whose elements $C_{Xi,Xj}$ are equal to the covariance of $X_i$ and $X_j$, i.e.

$$C_{Xi,Xj} = \mathrm{cov}[X_i, X_j] = E[(X_i - E[X_i])(X_j - E[X_j])],$$

where E is the expectation operator.

Covariance matrices are (in the context of audio processing in the time-frequency domain) defined as $R_x(k,l)=E[x(k,l)x^H(k,l)]$ (when exemplified for the noisy microphone signals x), where k and/are frequency and time indices, respectively, and x is an M-dimensional vector:

$$x(k, l) = [X_1(k, l), \ldots, X_M(k, l)]$$

comprising (generally complex) values of each of the M microphone signals for the given frequency and time (k,l).

The inter microphone target and noise covariance matrices $R_T(k,l)$ and $R_V(k,l)$ may be defined as respective covariance matrices for the input microphone signal vector x(k,l) comprising values of the M electric input signals (the microphone signals) at frequency index k at time l when the input microphone signal vector x(k,l) is labelled as target (T) and noise (N), respectively. The labelling as target (T) and noise (N) may e.g. be provided by a frequency band level voice activity detector (assuming that the target signal comprises voice (e.g. speech)).

In general, the distance between the sound source and the input transducer (e.g. microphone) picking up sound from the sound source in question matters more for the value of the acoustic transfer function (ATF) representing the propagation of sound from the source to the input transducer the smaller the distance (between source and input transducer). In other words, the larger the distance, the smaller the change of the acoustic transfer function per unit length (d(ATF)/dL, L representing distance) for a given direction from input transducer to sound source, so that direction may be a good approximation to define the acoustic transfer function for a given position of the sound source, when the distance between the sound source and the input transducer picking up sound form the sound source is above a threshold distance $L_{th}$. The threshold distance Lth may e.g. be taken to be in a range from 1-3 m, e.g. around 2 m (e.g. determined in dependence of the distance between the input transducers of the hearing device).

The above expression for optimal beamformer weight $w_\theta$ is valid under the assumption that the target is impinging from a single position/direction relative to the user (e.g. for an MVDR beamformer). Often this is not true. The target signal may not always impinge from a single position/direction. We may consider several signals as target signals or several positions/directions as target positions/directions at the same time. As described in the present disclosure, several simultaneous sound sources from different positions/directions may e.g. be considered as simultaneous targets, or all sound sources (or every speech source) in the frontal half-plane may e.g. be considered as target signals. Also, in the case of uncertainty about the target position/direction, the target positions/directions may advantageously be assumed to cover a range of possible target positions/directions.

For an MVDR beamformer, the target covariance matrix $R_T$ may be determined as the outer product of the steering vector ($d_\theta$) and its Hermitian transposition $d_\theta^H$, i.e. $R_T=d_\theta d_\theta^H$, where $d_\theta$ is the steering vector comprising relative transfer functions between the microphones and the (sole) target position θ.

SUMMARY

The present disclosure relates (mainly, but not exclusively) to a Generalized Eigen Vector beamformer (GEV), sometimes also termed a 'Generalized EigenValue beamformer'. The weights w of a GEV-beamformer can be determined as the set of weights which maximizes the signal-to-noise ratio (SNR) given by:

$$SNR(w) = \frac{w^H R_T w}{w^H R_V w}.$$

where the signal to noise ratio (SNR) is defined from a (inter-microphone) target covariance matrix $R_T$ and a (inter-microphone) noise covariance matrix $R_V$.

We may estimate the weights w which maximize the SNR as the eigenvector belonging to the largest generalized eigenvalue (hence the name GEV). It should be noticed that the set of weights (w) maximizing the SNR can be found only up to a scalar. We may hence choose to scale the weights e.g. in order to fulfill a unit response towards a pre-defined target position.

The present disclosure also deals with topics related to a minimum variance distortionless response (MVDR) beamformer.

The MVDR beamformer also referred to in the present disclosure is a special case of the GEV beamformer, where the inter-microphone target covariance matrix $R_T$ is a singular target covariance matrix given by the outer product of the steering vector $d_\theta$ and its Hermitian transposition $d_\theta^H$.

In the present disclosure the 'term look vector' is sometimes used instead of the term 'steering vector'. The term look vector refers to the case where a single target direction or position is considered, e.g. in connection with an MVDR beamformer, where the target direction is often in a look direction of the user (e.g. as determined by the direction of the nose of the user). Further, instead or the term look vector, the term "relative transfer function" may be used.

The present disclosure also deals with topics related to a generalized sidelobe canceller (GSC) beamformer structure. The GSC converts M input signals into a target-preserving path (comprising a target maintaining beamformer) and M−1 independent sidelobe cancelling beamformer paths (comprising respective target cancelling beamformers).

An MVDR beamformer as well as a GEV beamformer can be implemented as respective GSC structures. An MVDR beamformer, but also a GEV beamformer, can be constrained by implementing the beamformer using a GSC structure. Even though the target may not be limited to a single direction, we may choose to normalize the output of a GEV beamformer such that we obtain e.g. a unit response from a (one) preferred location/direction.

The present disclosure includes a plurality of aspects. It is the intention that features of the devices and methods of the different aspects can be combined between the different aspects.

A general aim of the present disclosure is to provide a basis for a migration from a scenario where a target sound source is a (single) localized (point) source to a scenario where the target sound originates from a multitude of differently located sound sources.

$1^{st}$ Aspect: (Beamformer Weights Determined by Optimizing an SNR)

An aspect of the present disclosure relates to a hearing aid comprising a beamformer providing at least one beamformed signal as a linear combination of a multitude of electric input signals, wherein the weights of the beamformer are determined by maximizing a target signal to noise ratio for sound from a plurality of target positions. The target signal to noise ratio is e.g. determined in dependence of first and second output variances of the at least one beamformer determined when the electric input signals or the at least one beamformed signal (Y) are labelled as target and noise, respectively.

A First Hearing Aid:

In a first aspect of the present application, a hearing aid adapted to be worn by a user is provided. The hearing aid comprises

- a microphone system comprising a multitude M of microphones, where M is larger than or equal to two, adapted for picking up sound from an environment of the user and to provide corresponding electric input signals (x), and
- a directional noise reduction system connected to said microphone system, the directional noise reduction system comprising at least one beamformer for generating at least one beamformed signal in dependence of beamformer weights (w) configured to be applied to said multitude (M) of electric input signals, thereby providing said at least one beamformed signal (Y) as a weighted sum of the multitude (M) of electric input signals ($Y=(w^H x)$).

The beamformer weights (w) are adaptively optimized to a plurality of target positions (θ) by maximizing a target signal to noise ratio (SNR) for sound from said plurality of target positions (θ), wherein the signal to noise ratio (SNR) is determined in dependence of first and second output variances ($|Y_T|^2$, $|Y_V|^2$) or time-averaged first and second output variances ($<|Y_T|^2>$, $<|Y_V|^2>$) of said at least one beamformer, and where said first and second output variances ($|Y_T|^2$, $|Y_V|^2$) are determined when said electric input signals (x) or said at least one beamformed signal (Y) are labelled as target (T) and noise (V), respectively.

Thereby an improved hearing aid may be provided.

Instead of the term 'output variance' the term 'output power' may be used in the above defined hearing aid.

The definition of the output as a set of complex weights (w) multiplied by the input signal (x) may assume processing in the time-frequency domain. As is known in the art, this may as well be performed in the time-domain. In the time domain this would correspond to a convolution.

The beamformed signal may be a function of time (l) and frequency (k). The labelling of the electric input signals (or the beamformed signal) as target(S) (e.g. speech) or noise (V), respectively, may be performed on a time-frequency level (k,l) (i.e. for each time-frequency unit). The labelling may be provided by a target signal detector (e.g. comprising a voice activity detector). The target detector may e.g. be configured to provide an indicator of whether or not or with what probability, a given time frequency unit (k,l) comprises a target signal, e.g. speech.

The term 'noise' may in the present context cover signals that are not labelled as target, e.g. natural or artificial noise, or signals representing a disturbance or distraction of the user from the target signal(s).

The (target) signal to noise ratio (SNR) may be expressed as $$SNR(w) = \frac{w^H R_T w}{w^H R_V w} \approx = \frac{w^H < xx^H >_T w}{w^H < xx^H >_V w}$$

-continued $$= \frac{< w^H x x^H w >_T}{< w^H x x^H w >_V}$$

$$= \frac{< Y_T^* Y_T >}{< Y_V^* Y_V >}$$

where $<z^*z>_T$ and $<z^*z>_V$ indicate an average of the signal z for a frequency band k across time frames labelled as target and noise, respectively. $z_T(k,l)$ and $z_V(k,l)$ are the signals for a time and frequency units labelled as target and noise, respectively.

The hearing aid may comprise a multitude of analysis filter banks configured to provide the electric input signals (x) in a time-frequency representation (k,l), where k is a frequency index and l is a time index. The hearing aid may comprise a multitude (M) of analysis filter banks for converting time domain electric input signals (x) from said multitude (M) of microphones to respective electric input signals (X) in a time-frequency representation (k,l). Each time-frequency unit (k',l') of an electric input signal in a time-frequency representation (k,l) comprises a (generally complex) value of the electric input signal at that time (l') and frequency (k').

The hearing aid may comprise a target signal detector configured to provide an indicator of whether or not or with what probability, a given time frequency unit (k,l) comprises a target signal, e.g. speech. The target signal detector may comprise a voice activity detector (e.g. a speech detector). A target signal does not necessarily have to be a speech signal (even though it often is labelled so). It may as well be defined as a signal impinging from certain directions (such as the frontal half-plane). The target detector may e.g. comprise a direction of arrival detector.

The hearing aid may comprise a voice activity detector for estimating whether or not, or with what probability, an input signal, or a time-frequency unit of the input signal, comprises a voice signal at a given point in time, and to provide a voice activity control signal indicative thereof. The labelling of target or noise may be provided by the voice activity detector (alone or in combination with other detectors). Typically, the labelling will be based on the input signal x, e.g. at a reference microphone, but the labelling may also be based on a linear combination of signals from more than one microphone (it may be the at least one beamformed signal (Y), but it may alternatively be based on any other beamformer). The voice activity detector may be configured to classify the input signal as dominated by speech or dominated by noise (e.g, non-speech). The voice activity detector may be configured to provide the voice activity control signal in a time-frequency representation, e.g. so that a value of the voice activity control signal is provided for each time-frequency unit (k,l).

The voice activity detector may be based on or comprise an artificial neural network (see e.g. FIG. 13).

The voice activity control signal may (in addition to the input audio signal(s), e.g. the/an electric input signal(s) or the beamformed signal) be dependent on spatial information derived from said electric input signals (x) or a signal or signals derived therefrom. The spatial information may be derived from a comparison between a beamformer with its maximum sensitivity towards the frontal half-plane and another beamformer with its sensitivity towards the back half-plane ('front' and 'back' being e.g. defined relative to the user).

The electric input signals (x) or the at least one beamformed signal (Y) may be labelled as target (T) and noise (V), respectively, in dependence of the voice activity control signal from a voice activity detector.

The target signal to noise ratio may be determined as a difference between, or a ratio of, the first and second output variances ($|Y_S|^2$, $|Y_V|^2$) or time-averaged first and second output variances ($<|Y_T|^2>$, $<|Y_V|^2>$) of said at least one beamformer.

The target signal to noise ratio may be determined in dependence of the beamformer weights (w) and of time averaged inner vector products of the multitude of electric input signals x and $x^H<xx^H>_T$ and $<xx^H>_V$, where <•> denotes average over time, and wherein $<xx^H>_T$ and $<xx^H>_V$, are determined when said electric input signals (x) are labelled as target (T) and noise (V), respectively. The labelling may e.g. be provided by the target signal detector (e.g. comprising a voice activity detector and/or a direction of arrival detector).

The target signal to noise ratio may be determined in dependence of said beamformer weights (w) and of respective inter-microphone target covariance matrix ($R_T$), and an inter-microphone noise covariance matrix ($R_V$). The signal to noise ratio may e.g. be determined as the ratio $$SNR(w) = \frac{w^H R_T w}{w^H R_V w}$$

Where $w^H R_T w$ approximates said first output variance, and where $w^H R_V w$ approximates said second output variance. The inter-microphone target covariance matrix ($R_T$) and the inter-microphone noise covariance matrix ($R_V$) are determined when said electric input signals (x) or said at least one beamformed signal (Y) are labelled as target and noise, respectively. Typically, the labelling is based on the input signal x, e.g. at a reference microphone, but the labelling may also be based on signals generated from a linear combination between more than one of the multitude of electric input signals from the (M) microphones.

The at least one beamformer may implemented as a linear combination of two or more pre-defined or adaptively determined beamformers. The beamformer weights of the pre-defined beamformers may be fixed (e.g. determined during manufacture of the hearing aid or during fitting of the hearing aid to a particular user's needs. The pre-defined beamformers may thus be denoted 'fixed beamformers'. The two or more pre-defined or adaptively determined beamformers may comprise M pre-defined or adaptively determined beamformers, where M is larger than or equal to two.

The first pre-defined or adaptively determined beamformer may be configured to have a unit response towards a target direction. A unit response towards a target direction may be provided by a target maintaining beamformer. When the beampattern is adapted in order to attenuate noise, a unit gain constraint towards a target position may be solely applied. But there may, in principle, be other directions, which have more directional amplification than the unit gain direction.

The first pre-defined or adaptively determined beamformer may be denoted a target-maintaining beamformer. The first pre-defined or adaptively determined beamformer may be configured to provide a unit response (sometimes termed a 'distortionless response') for a selected one of said multitude M of microphones, said microphone being denoted the reference microphone.

The one or more second pre-defined or adaptively determined beamformers may be configured to have a spatial minimum towards a respective one of said plurality of target positions. A spatial minimum towards a target direction may be provided by a target cancelling beamformer. The second pre-defined or adaptively determined beamformers may be denoted target-cancelling beamformers. The second pre-defined or adaptively determined beamformers may be constituted by M−1 second beamformers.

The at least one beamformer may be implemented as a generalized sidelobe canceller (GSC) for providing at least one beamformed signal (Y) in dependence of said adaptively determined beamformer weights (w), wherein the generalized sidelobe canceller comprises a multitude M of fixed beamformers, one of the M fixed beamformers being a target signal maintaining beamformer, and M−1 of the fixed beamformers being target-cancelling beamformers, each being configured to generate a beamformed signal in dependence of associated fixed beamformer weights ($W_{F,m}$, m=1, . . . , M) and wherein the adaptively determined beamformer weights (w) are determined in dependence of an adaptive parameter β or parameter vector β.

The adaptive parameter β or parameter vector β may be determined in dependence of time-averaged values of the target-maintaining beamformer and the M−1 target-cancelling beamformers.

Alternatively, the adaptive parameter beta is determined in dependence of the target covariance matrix and the noise covariance matrix.

In a generalized sidelobe canceller we may express the output Y in terms of fixed beamformers, and the adaptive parameter vector β, i.e.

$$Y = C_0 - \beta^T C$$

where β is an (M−1)×1 vector, and C is an (M−1)×1 vector of target cancelling beamformers. It can be mentioned that in some other texts (e.g. in the reference handbook quoted in [Bitzer & Simmer: 2001]) β is conjugated compared to the definition we use here. The beamformer output (Y) may as well be rewritten as $$Y = C_0 - \beta_1 C_1 - \beta_2 C_2 \cdots - \beta_{M-1} C_{M-1},$$

The fixed, distortionless target beamformer $C_0$ and the fixed target cancelling beamformers C can be expressed in terms of the input signal x and the beamformer weights expressed by the M×1 vector a and the M×(M−1) blocking matrix B, respectively, i.e.

$$C_0 = a^H x$$

and $$C = B^H x.$$

The output may thus be expressed in terms of the input signal x and the parameters α, β and β:

$$Y = (a - B\beta^*)^H x$$

We see that the output either may be expressed in terms of the fixed beamformers or in terms of the input signal.

The average of the squared-magnitude of the output may thus be expressed as $$\langle |Y|^2 \rangle = \langle (C_0 - \beta^T C)(C_0 - \beta^T C)^* \rangle,$$

which can be re-written as a sum of averages across different beamformer products. Or as $$\langle |Y|^2 \rangle = \langle (a - B\beta^*)^H xx^H (a - B\beta^*) \rangle = (a - B\beta^*)^H \langle xx^H \rangle (a - B\beta^*) = (a - B\beta^*)^H R_x (a - B\beta^*),$$

i.e. where the output instead is expressed in terms of the covariance matrix (e.g. $R_x$, $R_T$ or $R_V$, depending on the input samples, which are selected for averaging) and the parameters a, B and B.

We may notice that the estimation of covariance matrices requires averages across M real-valued terms and averages across M×(M−1)/2 complex-valued terms (taking into account that the covariance matrix is Hermitian). Similarly, we also see that the expression in terms of sums of beamformer products results in averages across M real-valued beamformer product terms and averages across M×(M−1)/2 complex-valued beamformer products (again taking into account that each complex-valued beamformer product also is represented by its complex conjugate).

The target covariance matrix ($R_T$) may be determined in advance of normal use of the hearing aid. The target covariance matrix ($R_T$) may e.g. be determined during manufacture of during a fitting session. The target covariance matrix ($R_T$) may e.g. be determined in dependence of user input, e.g. about currently preferred target positions (e.g. directions, e.g. indicated via a user interface, e.g. a graphical user interface, e.g. of an APP of a smartphone, or similar (e.g. portable, e.g. handheld) processing device). The target covariance matrix ($R_T$) may e.g. be determined in dependence of prior knowledge of one or more target positions.

The first output variance may be determined based on target directions determined in advance of normal use of the hearing aid.

$2^{nd}$ Aspect: (Target Covariance Matrix Determined in Dependence of a Multitude of Steering Vectors ($d_\theta$) for the Currently Present Target Sound Sources)

In an aspect, the present disclosure relates to a hearing aid comprising microphone/beamformer configurations that can be represented by a full-rank target covariance matrix. The $2^{nd}$ aspect relates (mainly, but not exclusively) to a Generalized Eigenvector beamformer (GEV) (or an approximation thereof).

It is proposed to adaptively optimize the beamformer weights (w) of a beamformer to a plurality of target positions (θ), e.g. by maximizing a target signal to noise ratio (SNR) for sound from said plurality of target positions (θ). The signal to noise ratio may be expressed in dependence of the beamformer weights (w) and an inter-microphone target covariance matrix $R_s$.

The inter-microphone target covariance matrix $R_T$ of a beamformer may be updated as $$R_T = \sum_\theta \sigma_\theta^2 d_\theta d_\theta^H$$

where $\sigma_\theta^2$ is the target variance for a target position θ, $d_\theta$ is a steering vector for a given position θ, and $^H$ denotes Hermitian transposition, and a summation is made over a plurality of (target sound source) positions θ. The steering vector $d_\theta$ is defined as the relative transfer function (in a frequency band k) between a reference microphone and the other microphones, for a given target (sound source) position θ, i.e. $d_\theta(k)=h_\theta(k)/h_\theta(k, \text{ref})$, where $h_\theta(k)$ is a vector of transfer functions from the source position θ to each of the microphones (m=1, . . . , M), and $h_\theta(k, \text{ref})$ is the transfer function from the source position θ to the reference microphone (m=ref). The summation may be over separately identified relevant target sound source positions. The positions of the target sound sources (relative to the hearing device microphones) may be approximated by directions to the target sound sources (i.e. from the hearing device microphones to the target sound source positions). In the present disclosure the parameter θ is intended to cover both interpretations (position, direction, where position e.g. may be represented by a combination of direction and distance relative to the hearing device microphones).

The target variance $\sigma_\theta^2$ may be regarded as a direction-dependent weighting of the different directions.

The target covariance matrix $R_T$ may be estimated as a fixed full-rank matrix by different means:

1) Estimate the most likely target directions and obtain $R_T=\Sigma_\theta p_\theta d_\theta d_\theta^H$, as described below.

2) Estimate the most likely target directions and create a target covariance matrix from a weighted sum of desired target directions. E.g. a sum of target steering vectors from a frontal half-plane, a sum of front target steering vectors obtained from a group of individuals.

3) $R_T$ may be "calibrated" in a special calibration mode, where a target sound (in absence of noise) is played from the target direction. In an MVDR beamformer, we would solely estimate the steering vector from the target covariance matrix (assuming that the target is a point source) e.g. from the eigenvector belonging to the largest eigenvalue. Here we assume that the target is not fully described by a single direction, and instead we keep the full-rank target covariance matrix.

For the MVDR beamformer, the target covariance matrix $R_T=\sigma_\theta^2 d_\theta d_\theta^H$ (one target sound source) has rank 1. In cases where the target covariance matrix ($R_T$) does not have rank 1 (but rank>1), the MVDR solution cannot be used and a GEV (or approximated GEV) beamformer may be used instead. For a GEV beamformer (in the presence of multiple target sound sources at different positions $\theta=\theta_1, \ldots, \theta_{NTS}$, where NTS is the (current) number of target sound sources), the target covariance matrix ($R_T$) may, according to the present disclosure (as indicated above), e.g. be expressed as a linear combination (e.g. a sum) of outer products of the steering vectors $d_\theta$ of the individual target sound sources located at respective positions θ, $R_T=\Sigma_\theta \sigma_\theta^2 d_\theta d_\theta^H$.

The summation in the expression of the target covariance matrix $R_T$ may e.g. be a weighted sum of the (outer) product of the most likely target steering vectors (see e.g. FIG. 6).

$$R_T = \sum_\theta p_\theta \, d_\theta d_\theta^H$$

where $p_\theta$ is a (real) weight factor (e.g. a probability estimate) of a given position θ.

The parameters $p_\theta$ and $\sigma_\theta^2$ are not necessarily related. $p_\theta$ is a probability, which usually sum to 1, whereas the variances $\sigma_\theta^2$ do not necessarily sum to 1. However, when maximizing the SNR given by the below equation $$SNR(w) = \frac{w^H R_T w}{w^H R_V w}$$

the optimal weight (w) does not change, if we e.g. multiply $R_T$ by a scalar. Hence, if the sound source from a given direction is very energetic, it will dominate the target covariance matrix. And it would most likely also be estimated as the most likely target direction.

A Second Hearing Aid:

In a 2^nd aspect of the present application, a hearing aid adapted to be worn by a user is provided. The hearing aid comprises

- a microphone system comprising a multitude (M) of microphones, where M is larger than or equal to two, adapted for picking up sound from an environment of the user and to provide corresponding electric input signals $x_m(n)$, m=1, . . . , M, n representing time,
- a directional noise reduction system connected to said microphone system, the directional noise reduction system comprising at least one beamformer for generating at least one beamformed signal in dependence of beamformer weights (w) configured to be applied to said multitude (M) of electric input signals, thereby providing said at least one beamformed signal as a weighted sum of said multitude (M) of electric input signals. The hearing aid may be adapted to provide that said beamformer weights (w) are adaptively optimized to a plurality of target positions (θ) by maximizing a target signal to noise ratio (SNR) for sound from said plurality of target positions wherein the signal to noise ratio is expressed in dependence of said beamformer weights (w), an inter-microphone target covariance matrix ($R_T$), and an inter-microphone noise covariance matrix ($R_V$), and wherein the target covariance matrix ($R_T$) is determined in dependence of a plurality of steering vectors ($d_\theta$) for said currently present target sound sources.

Thereby an improved hearing aid may be provided.

The hearing aid is configured to adaptively optimize the beamformer weights to maximize the target signal-to-noise ratio (SNR). The target signal-to-noise ratio (SNR) may be given by:

$$SNR(w) = \frac{w^H R_T w}{w^H R_V w}.$$

where the superscript H denotes Hermitian transposition.

The hearing aid may be configured to adaptively optimize the beamformer weights (w) a) by estimating the beamformer weights as the eigenvector belonging to the largest generalized eigenvalue.

The directional noise reduction system (e.g. the at least one beamformer) may comprise (or be constituted by) a Generalized Eigenvector beamformer (GEV). The term GEV is taken from [Warsitz & Haeb-Umbach: 2007]. However, in [Warsitz & Haeb-Umbach: 2007] a slightly different SNR are maximized, namely the ratio between the noisy input mixture and the noise estimate. In the present disclosure, on the other hand, a GEV-term is used wherein we maximize the ratio between a target covariance matrix and a noise covariance matrix. The structure of the equation is similar (i.e. same equations to estimate the maximum), but the covariance matrix in the numerator is defined differently.

The beamformed signal may be provided by the at least one beamformer may be formed as a linear combination of at least two of said multitude of electric input signals by multiplying each electric input signal by a complex-valued beamformer weight (w). The beamformed signal provided by the at least one beamformer may be formed as a linear combination of the multitude of electric input signals by multiplying each of the multitude of electric input signals by the (e.g. complex-valued) beamformer weight (w).

The beamformer weights for the plurality of target positions (e.g. directions) (θ) to currently present target sound sources may be determined in dependence of a multitude of steering vectors ($d_\theta$) for the currently present target sound sources.

The inter-microphone target covariance matrix $R_T$ may be determined in dependence of steering vectors of the currently considered target sound sources. The inter-microphone target covariance matrix $R_T$ may be determined as a (possibly weighted) sum of the (outer) product of the steering vectors $d_\theta d_\theta^H$ of the currently considered target sound sources (from positions $\theta=\theta_1, \ldots, \theta_{NTS}$, where NTS is the (current) number of target sound sources).

The summation in the expression of the target covariance matrix $R_T$ may be a weighted sum of the outer product of the most likely target steering vectors according to the following expression $$R_T = \sum_\theta p_\theta \, d_\theta d_\theta^H$$

where $p_\theta$ is a (real) weight factor (e.g. a probability estimate) of a given position (θ).

The target covariance matrix ($R_T$) may be adaptively determined. The plurality of target positions (θ) of the target sound sources and/or the corresponding target covariance matrix ($R_T$) may be adaptively determined. The plurality of target positions (θ) of the target sound sources and/or the target covariance matrix ($R_T$) may e.g. be adaptively determined using a maximum likelihood (ML) procedure, see e.g. EP3413589A1.

The target covariance matrix ($R_T$) may be pre-determined. The target covariance matrix ($R_T$) may e.g. be determined in a procedure prior to the normal operation of the hearing aid by the user, e.g. during manufacture or fitting of the hearing aid. The target covariance matrix ($R_T$) may thus be fixed during use of the hearing aid.

The (pre-determined) target covariance matrix ($R_T$) may be determined corresponding to a set of pre-determined target positions (θ).

The (pre-determined) target covariance matrix ($R_T$) may be determined via a calibration routine in a separate calibration mode.

The target covariance matrix ($R_T$) may be determined as a sum of outer products of steering vectors ($d_{\theta,p}$) for different persons (p). The target covariance matrix ($R_T$) may be determined as a weighted sum outer products of steering vectors ($d_{\theta,p}$) for different persons (p=1, . . . , P), the weights ($w_{d,p}$) being e.g. dependent on age, or gender (e.g. relative to the age or gender of the user).

The target covariance matrix ($R_T$) may be determined as a sum of $R_T$-matrices obtained from different individuals. An individual target covariance may either be estimated by playing a sound from a desired target direction and estimating the target covariance matrix from the hearing aid microphones signals while the hearing instrument is mounted for intended us on an individual. During absence of noise (or during high SNR), a good estimate of a target covariance is easy to obtain form an individual hearing aid user. By basing the target covariance matrix on an average across many individuals, we can ensure that the hearing instrument performs well across a population of individual users.

The target covariance matrix ($R_T$) may be pre-determined as a Rank>1 matrix of size M×M, where M is the number of electric input signals. The target covariance matrix may e.g. be a full rank matrix.

The number M of currently active microphone signals may e.g. be equal to the number of microphones of the microphone system.

The hearing aid may comprise a processor configured to apply one or more processing algorithms to the beamformed signal, or to a further noise reduced signal, and to provide a further processed signal. One of the processing algorithms may be a compressive amplification algorithm configured to compensate for a hearing impairment of the user.

The hearing aid may comprise a transform unit for converting a time domain signal to a signal in the transform domain (e.g. frequency domain or Laplace domain, Z transform, wavelet transform, etc.). The transform unit may be constituted by or comprise a time-frequency-conversion unit for providing a time-frequency (TF) representation of an input signal.

The hearing aid may comprise a multitude of time-frequency-conversion units for providing the multitude M of time-domain electric input signals $x_m(n)$, m=1, . . . , M, in a time-frequency representation (k,l), where k and I are frequency and time indices, respectively. The hearing aid may comprise a synthesis filter bank for converting the time-frequency representation of a signal (e.g. the further processed signal) to an output signal in the time domain. The time-domain output signal may be fed to an output transducer of the hearing device, e.g. to a loudspeaker, for providing the output signal as stimuli perceivable for the user of the hearing device as sound.

The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. comprising a Discrete Fourier Transform (DFT) algorithm, or a Short Time Fourier Transform (STFT) algorithm, or similar) for converting a time variant input signal to a (time variant) signal in the (time-) frequency domain. The hearing aid may comprise respective inverse transform units according to the particular application to convert one or more signals from the transform domain in question to the time domain.

The hearing aid may comprise a postfilter connected to said at least one beamformer and adapted to receive said at least one beamformed signal, or a processed version thereof, and wherein said postfilter is configured to provide gains to be applied to said at least one beamformed signal, or to said processed version thereof, in dependence of a postfilter target signal to noise ratio (PF-SNR) to provide a further noise reduced signal. The postfilter target signal to noise ratio (PF-SNR) is preferably estimated with a smaller time constant than the target signal to noise ratio (SNR) being maximized by the optimized weights of the at least one beamformer. The target and noise covariance matrices ($R_T$ and $R_V$, respectively) used in an estimation of the postfilter target signal to noise ratio (PF-SNR) may e.g. be averaged with a smaller time constant, than the target signal to noise ratio (SNR). This is e.g. illustrated in FIG. 12.

The hearing aid may be configured to provide the target signal to noise ratio (SNR) and/or the postfilter target signal to noise ratio (PF-SNR) in a time-frequency representation. The directional noise reduction system may comprise the postfilter.

The at least one beamformer may be configured to exhibit a distortionless response for a specified position of a target sound source. The distortionless response for a specified position of a target sound source can be expressed as $w^H d_\theta = 1 = (w^H d_\theta)(d_\theta^H w)$, where w is a vector comprising the optimized weights of the at least one beamformer and $d_\theta$ is the steering vector for the specified preferred target position (θ).

The beamformer weights (w) of the at least one beamformer may be determined to provide that the at least one beamformer exhibits a distortionless response for a specified position (θ) of a target sound source.

The beamformer weights may e.g. be further adapted in order to optimize the SNR of a target signal impinging from a range between +/−15°, but the beamformer weights may be normalized in order to achieve a distortionless response from 0°.

The weights of the at least one beamformer are normalized such that the sound from said plurality of target positions (θ) exhibits a unit response. A condition for providing a unit response from a plurality of target positions may be written as $w^H R_s w = 1$ as a constraint of the optimized weights of the at least one beamformer providing unit energy of sound from the plurality of target directions.

The hearing aid may comprise an output transducer configured to provide output stimuli perceivable as sound to the user in dependence of beamformed signal or the further processed signal.

The hearing aid may be constituted by or comprise an air-conduction type hearing aid, a bone-conduction type hearing aid, a cochlear implant type hearing aid, or a combination thereof.

$3^{rd}$ Aspect: (Update Covariance Matrices in Dependence of Voice Activity Detection Based on DOA, FB-Ratio, Etc.)

The $3^{rd}$ aspect relates (mainly, but not exclusively) to a Generalized Eigenvector beamformer (GEV). The $3^{rd}$ aspect may relate to configurations that can be represented by a full-rank covariance matrix.

It is proposed to update the inter-microphone target covariance matrix $R_T$ and the inter-microphone noise covariance matrix $R_V$ of a beamformer based on voice activity detection, e.g. based a) on an estimated direction of arrival of sound from a target sound source, b) on a comparison of signal content provided by a target-maintaining and a target cancelling beamformer, respectively (e.g. a difference between the two), or on c) speech detection.

A Third Hearing Aid:

In a third aspect of the present application, a hearing aid adapted to be worn by a user is provided by the present disclosure. The third hearing aid comprises

- a microphone system comprising a multitude M of microphones, where M is larger than or equal to two, adapted for picking up sound from an environment of the user and to provide M corresponding electric input signals $x_m(n)$, m=1, . . . , M, n representing time,
- a directional noise reduction system connected to said microphone system, the directional noise reduction system comprising at least one beamformer for generating at least one beamformed signal in dependence of beamformer weights (w) configured to be applied to at least two of said M electric input signals, wherein the beamformer weights are adaptively optimized to a plurality of target positions (θ) by maximizing a target signal to noise ratio (SNR) for sound from said plurality of target positions (θ) determined in dependence of an inter-microphone target covariance matrix $R_T$, and an inter-microphone noise covariance matrix $R_V$.

The beamformer may be configured to update said inter-microphone target covariance matrix $R_T$ and said inter-microphone noise covariance matrix $R_V$ in dependence of a detection of voice activity, wherein said voice activity detection is based on one or more of a) an estimated direction of arrival of sound from a target sound source,
b) a comparison of signal content provided by a target-maintaining and a target cancelling beamformer, respectively, and
c) speech detection.

The purpose of the adaptation of the beamformer weights to a plurality of positions may be either to enhance a plurality of target positions, or to enhance a target signal, which direction acoustically is defined by a full-rank target covariance matrix.

In the present context, the term 'speech detection' is intended to include 'voice detection' and may e.g. be provided by a binary voice/no voice detection of a voice activity detector. The speech (voice) detection may further include an undecided state, when the presence or absence of speech (voice) cannot be decided. The voice activity detector may e.g. be implemented as a neural network based on training examples labelled in time and frequency as either voice or no voice (cf. e.g. FIG. 13).

The beamformer weights (w) of the at least one beamformer may be determined to provide that the at least one beamformer exhibits a distortionless response for a specified position (θ) of a target sound source.

The specified position be constituted by a fixed position, e.g. in front of the listener. The specified position may, however, be allowed to change over time, e.g. based on the dominant direction (eigenvector) of the target covariance matrix, or simply based on selecting a column of the target covariance matrix (assuming that the target covariance matrix is close to rank 1). In an embodiment only specified positions within a range of possible positions are allowed.

The signal-to-noise ratio (SNR) may be given by:

$$SNR(w) = \frac{w^H R_T w}{w^H R_V w}.$$

where H denotes Hermitian transposition.

The directional noise reduction system may comprise a Generalized Eigenvector beamformer (GEV). The GEV beamformer may be configured to update an inter-microphone target covariance matrix $R_T$ and a noise covariance matrix $R_V$ in dependence of voice activity detection, as indicated in a), b) or c) above.

The hearing aid may comprise a transform unit for converting a time domain signal to a signal in the transform domain (e.g. frequency domain or Laplace domain, Z transform, wavelet transform, etc.). The hearing aid may comprise respective inverse transform units according to the particular application to convert one or more signals from the transform domain in question to the time domain.

The voice activity detection (specifically the comparison of signal content provided by a target-maintaining and a target cancelling beamformer, respectively) may be based on b') a difference or a ratio between signal content provided by a target-maintaining and a target cancelling beamformer.

The hearing aid may comprise a front-back detector based on a comparison between a beamformer pointing towards the front and a beamformer pointing towards the back (front and back being defined relative to the user; a front direction being e.g. defined as a direction of the user's nose or a look direction of the user).

The beamformer pointing towards the front may be configured to have a lowest sensitivity (e.g. a null) for sound impinging from the back (cf. FIG. 2). The beamformer pointing towards the back may be configured to have a lowest sensitivity (e.g. a null) for sound impinging from the front (cf. FIG. 2). In a preferred embodiment, the front beamformer has a unit response towards the front, and the back beamformer has a unit response towards the back. Alternatively, the norm of the front and back weight vectors may be similar.

The beamformer pointing towards the front may be a super-cardioid having its maximum sensitivity configured to have a maximum sensitivity for sound impinging from the front of the user (cf. FIG. 3). The beamformer pointing towards the back may be a super-cardioid having its maximum sensitivity configured to have a maximum sensitivity for sound impinging from the back of the user (cf. FIG. 3).

The front and the back beamformers may be based on two microphones (i.e. first order beampatterns), preferably microphones located in a horizontal plane (e.g. related to the heard of the user, on a line or close to a line parallel to the front-back axis, e.g. defined by the nose of the user). The front and back beamformers may, however, be based on all available microphone signals.

The target direction of the front and back facing beamformers may be fixed, e.g. tied to a look direction (θ) of the user defining a pre-defined steering vector de.

The target direction may however, deviate from the look direction of the user.

The fixed beampatterns may be chosen based any desired target angle of interest, i.e. e.g. a fixed beampattern that optimizes $$SNR = \frac{w^H \sum_{\theta \in target} g_\theta d_\theta d_\theta^H w}{w^H \sum_{\theta \in noise} g_\theta d_\theta d_\theta^H w},$$

where $g_\theta$ is a possible weight of the signal impinging from the direction θ, and $d_\theta$ is a relative acoustic transfer function from the direction θ known in advance. The summations $\Sigma_{\theta \in target}$ and $\Sigma_{\theta \in noise}$, respectively, indicate that a sum across specific (e.g. pre-recorded) steering vectors (d) assigned as belonging to the target and assigned as belonging to noise directions, respectively.

The inter-microphone target covariance matrix $R_T$ and the inter-microphone noise covariance matrix $R_V$ may be updated in dependence of respective target- and noise-update criteria related to the comparison of signal content provided by a target-maintaining and a target cancelling beamformer, respectively.

The target update criterion and the noise update criterion may be complementary (e.g. in that the noise update criterion is equal to NOT (target update criterion)).

The target-update criterion may e.g. be $$\text{If: } \log|C_F(t,f)| - \log|C_B(t,f)| > \kappa_F\text{: Update } R_T$$

where 'log' is a logarithm function, |•| denotes an absolute value (magnitude), $C_F$ and $C_B$ refer to the outputs of the target-maintaining (e.g. front facing) and target cancelling (e.g. back facing) beamformers, respectively, and $\kappa_F$ and $\kappa_B$ are thresholds of the respective beamformers. The thresholds $\kappa_F$ and $\kappa_B$ are illustrated in FIG. 4A. Parameters t and f represent time and frequency, respectively.

The noise-update criterion may e.g. be $$\text{If: } \log|C_F(t,f)| - \log|C_B(t,f)| \leq \kappa_B\text{: Update } R_V.$$

The parameter κ (kappa) corresponds to the magnitude difference between the two beampatterns for a given angle (θ). For the particular plot, the beampattern difference as function of angle is a monotonic decreasing function, so in the present particular case, a difference between the front and back beamformer of e.g. 3 dB may correspond to the angle where $C_F-C_B=3$ dB. So, for all angles where the difference is greater than 3 dB, we update the inter microphone target covariance matrix $R_T$, and for all angles where the difference is smaller than e.g. −3 dB we update the inter microphone noise covariance matrix $R_T$. From the angles where the difference between $C_F$ and $C_B$ is neither greater than +3 dB nor smaller than −3 dB, we do not update any of the two covariance matrices.

The thresholds $\kappa_F$ and $\kappa_B$ may e.g. be equal, e.g. equal to 3 dB. If the thresholds are equal, the update is front-back symmetric, and either $R_T$ or $R_V$ is updated.

It may be advantageous to not update the beamformers ($C_F$, $C_B$), when the difference $C_F-C_B$ is (numerically) small. The same goes for other thresholds, e.g. a voice activity-based threshold.

The thresholds $\kappa_F$ and $\kappa_B$ may e.g. be adaptively determined, e.g. in dependence of a current acoustic environment.

The inter-microphone target covariance matrix $R_T$ and the inter-microphone noise covariance matrix $R_V$ may be updated recursively, when the respective target- and noise-update criteria are fulfilled. The target and noise covariance matrices may be updated recursively with the same time constant or with different time constants. The time constant may change based on a sensor input, e.g. if it is detected that the head is moving or turning, the update rate may be increased.

The front back ratio (FBR) optimizing beamformer may be based on estimated target ($R_T$) and noise ($R_V$) covariance matrices that are determined when the respective target- and noise-update criteria are fulfilled.

The dashed line in FIG. 4A shows the FBR optimizing beamformer based on estimated target ($R_T$) and noise ($R_V$) covariance matrices, where $R_T$ is based on time frames where $\log|C_F(t,f)|-\log|C_B(t,f)|>3$ dB, and $R_V$ is based on time frames where $\log|C_F(t,f)|-\log|C_B(t,f)|\leq-3$ dB.

The front back decision may be implemented using a neural network. An implementation of an input stage comprising an FBR optimizing beamformer using a neural network (e.g. comprising Gated Recurrent Unit (GRU) layers) is illustrated in FIG. 4B, 4C.

The target covariance matrix ($R_T$) may be a fixed (predetermined), full rank matrix and only the noise covariance matrix ($R_V$) may be adaptive.

The direction-based decision may be combined with a decision based on voice activity. E.g. the target covariance may only be updated when the time-frequency unit fulfils a direction-based criterion as well as when voice (or other sounds defined as sounds of interest) is present.

The combination with a voice activity detector is a advantageous. The combination of a voice activity detector (VAD) and a direction-based decision (e.g. based on FBR) can ensure that the target covariance matrix is updated only when both a voice-based and a direction-based criterion is fulfilled.

EXAMPLES

The target covariance matrix $R_T$ is updated when voice is active AND the signal is impinging from the front.

The options for when noise covariance matrix $R_V$ is updated may differ from when the target covariance matrix $R_T$ is updated:

Option 1:

$R_V$ is updated when the signal is impinging from the back.

Option 2:

$R_V$ is updated when the signal is impinging from the back AND no speech is detected.

Option 3:

$R_V$ is updated when the signal is impinging from the back OR no speech is detected.

An example of a speech detector (e.g. a voice activity detector) implemented as a neural network is described in FIG. 13 below.

Instead of a front-back detector based (general) voice activity detector as described in connection with FIG. 2, 3, 4A, 4B, 4C, an own voice detector based on a comparison between at least one own voice cancelling beamformer and another linear combination between the microphones may be implemented (along the same lines).

Instead of a voice activity detector for detecting voice in an environment of the user, an own-voice detector may be implemented in similar manner (by denoting the user's own voice as 'target' and substituting front- and back-facing beamformers with beamformers pointing towards the user's mouth and opposite (the latter e.g. being implemented as an own-voice cancelling beamformer).

In the framework of FIG. 2 (or FIG. 3), e.g., the front facing beamformer ($C_F$) is substituted by an own voice enhancing (or maintaining) beamformer, and the rear facing beamformer ($C_B$) is substituted by an own voice cancelling beamformer. An own voice decision (OVD(k,l)) based on a comparison between the own voice enhancing beamformer and the own voice cancelling beamformer may be made. The comparison may be applied in different frequency channels. The comparison may be based on the magnitude response or the log-magnitude. When the comparison is greater than a pre-defined threshold own voice is detected in the particular frequency channel. A joint decision ($OVD_{joint}(k,l)$) across frequency can be found e.g. if own voice is detected in more than X channels (e.g. in a majority of channels (e.g. frequency bands).

A joint decision across frequency ($OVD_{joint}(k,l)$) may be based on a trained neural network. The neural network may be a feed forward network, a convolutive network or a recurrent network. The input layer may be based on more than one time frame of comparisons between at least one own voice cancelling beamformer and another linear combination of the input microphones, such as an own voice enhancing beamformer. The training on the neural network may be based on audio sampled which are labelled either as own voice or no own voice. At the output layer, before applying a threshold, a nonlinear activation function, e.g. a sigmoid function, may be applied.

In addition to the comparison between beampatterns, the own voice decision may be based on a (general) voice activity detector, such that own voice is only detected when the comparison yields that own voice and voice is detected. The voice activity detector may e.g. be based on a trained neural network as well (cf. e.g. FIG. 13). In an embodiment the own voice detection is based on a jointly trained network exploring both the voice features as well as the beamformer-based features.

Own voice decisions may be found jointly across hearing aids in a binaural setup. E.g. "own voice" may only be detected if both hearing aids detect own voice. "no own voice" may only be detected if both instruments detect no own voice meaning that we also may have time frames which may be labelled "undecided".

The own voice cancelling beamformer and the own voice enhancing beamformer may as well be applied as separate input to the detector (before comparison, hereby leaving the comparison to the neural network).

In an embodiment the neural network is implemented as a simple linear regression unit.

A target covariance matrix ($R_T$) for a weighted sum of (e.g. currently) possible target steering vectors, i.e. $R_T=\Sigma_{\theta=\theta_1}^{\theta=\theta} p_\theta d_\theta d_\theta^H$, where $\theta_1, \ldots, \theta$ represent the (e.g. currently) relevant positions, e.g. estimated by a maximum likelihood estimation (MLE) based method, may be provided based on likelihood estimates, where $p_\theta$ is a weight based on the estimated probability (or likelihood) of a given direction $\theta$ (at a given point in time), see e.g. EP3413589A1.

The position range included in the search for currently relevant positions of target sound sources may e.g. be limited based on prior knowledge related to a specific listening situation (e.g. a specific acoustic environment). The position range may e.g. be quantized, see e.g. EP3413589A1.

The range of positions evaluated by the MLE method may e.g. be the full range around the user relevant for a conversation between the user and one or more communication partners (e.g. distance $\in$[0.5 m: 3 m] AND [angle $\in$[0°, 360°]). The range of positions evaluated by the MLE method may e.g. be a subrange, or a plurality of subranges, of the full range (e.g. a sub range of a front half plane (e.g. a sub-range around) 0° and a sub-range of a back half plane (e.g. a sub-range around) 180°, etc.). The range of angles evaluated by the MLE method may e.g. be [0°, 360°] (full range around the user) or limited to a sub-range, e.g. to [−90°, +90°] (e.g. a front half plane, e.g. relative to the user's look direction), or to [0°, +180°]/[0°, −180°] (the left or right half-plane), or to sub-ranges thereof.

The term 'a range of positions' may (alternatively or additionally) be understood as 'a range of positions across individuals', e.g. a specific position measured across different people.

The most likely target position (or target steering vector) may be selected from a dictionary of different candidates. Instead of selecting a single target steering vector (e.g. for use in an MVDR beamformer) a number ($N_\theta$) of (currently) possible target steering vectors (given the current (noisy) electric input signals picked up by the input transducers of the hearing device) may be identified as the steering vectors ($d_\theta$) having the largest likelihood (e.g. probability, $p_\theta$). The steering vectors having the largest likelihood may e.g. be taken to be the steering vectors having a likelihood larger than a threshold value ($p_{th}$), or the $N_\theta$ steering vectors corresponding to the Ne largest (current) likelihood values (e.g. probabilities). The probability threshold value ($p_{th}$) may e.g. be larger than or equal to 0.4, e.g. in a range between 0.5 and 1, such as larger than or equal to 0.6. The number ($N_\theta$) of largest likelihood values may e.g. be in the range between two and ten, e.g. between three and five, e.g. equal to three or four.

A target covariance matrix ($R_T$) may also be given by an average of target covariance matrices obtained across different individuals.

4$^{th}$ Aspect: (GSC-MVDR Beamformer (LMS or Gradient Update))

A mathematical division in an LMS/NLMS update may be less accurate compared to a division used in a single step (direct) estimation. In the NLMS case, however, the division may be implemented simply by a shift operator, which is computationally much cheaper.

The alternation of LMS, NLMS (and Sign LMS) solutions with a single step (direct) estimation have the implementation-related advantage that they only consider second order terms (two numbers multiplied) rather than 4$^{th}$ order terms (i.e. 4 numbers multiplied), because 4$^{th}$ order multiplications are much harder to implement in fixed-point arithmetic, as the bit-width is much wider.

A Fourth Hearing Aid:

In a fourth aspect of the present application, a hearing aid adapted to be worn by a user is provided by the present disclosure. The fourth hearing aid comprises

- a microphone system comprising a multitude M of microphones, where M is larger than or equal to three, adapted for picking up sound from an environment of the user and to provide M corresponding electric input signals $x_m(n)$, m=1, . . . , M, n representing time,
- a directional noise reduction system connected to said microphone system, the directional noise reduction system comprising a general sidelobe canceller (GSC) structure implemented as a minimum variance distortionless response (MVDR) beamformer for providing at least one beamformed signal, the general sidelobe canceller (GSC) structure comprising at least three fixed beamformers comprising
  - an M×1 target-maintaining beamformer exhibiting a distortionless response for a specified position of a target sound source, the target-maintaining beamformer being configured to provide a desired response from the target position, such as an omnidirectional response, and thereby a target maintaining signal in dependence of beamformer weights when applied to said M electric input signals, and
  - at least M−1 target cancelling beamformers each for generating a beamformed signal for attenuating sound from said specified position of the target sound source in dependence of beamformer weights configured to be applied to at least two of said M electric input signals,
  - wherein the beamformer weights of the minimum variance distortionless response (MVDR) beamformer are determined as a function of an adaptive parameter vector β, and
  - wherein the adaptive parameter vector β is determined
    - a) by using an adaptive update algorithm constituted by or comprising an LMS or NLMS update algorithm, or a sign LMS algorithm, or
    - b) by solving the equation ∇β=0, were ∇β refers the gradient with respect to β.

The M×1 target-maintaining beamformer refers to the number (M) of input signals to the target maintaining beamformer.

The NLMS algorithm may be normalized in different ways. The NLMS update term of β (p<•>) may be normalized using the norm of the fixed target cancelling beamformers C, i.e.

$$\beta(n) = \beta(n-1) + \mu\frac{C^* Y}{\|C\|^2}$$

Alternatively, the NLMS update of β may be normalized using the norm of the output signal (Y):

$$\beta(n) = \beta(n-1) + \mu\frac{C^* Y}{\|Y\|^2}$$

Both the numerator and the denominator in the above equations may be averaged across time, i.e.

$$\beta(n) = \beta(n-1) + \mu\frac{\langle C^* Y\rangle}{\langle\|C\|^2\rangle}$$

and $$\beta(n) = \beta(n-1) + \mu\frac{\langle C^* Y\rangle}{\langle\|Y\|^2\rangle}.$$

However, in this particular case, smoothing is not necessary, as the recursive update of β automatically applies smoothing.

The most simple update of β is a sign LMS update $$\beta(n) = \beta(n-1) + \mu\,\mathrm{sign}(C^* Y) = \beta(n-1) + \mu\,\mathrm{sign}\left(\sum C^*\right)\mathrm{sign}(Y)$$

The sign( ) shall be understood such that we update the real part of β in the direction of the sign of the real part of the gradient and the imaginary part of β in the direction of the sign of the imaginary part of the gradient. As the sign LMS is very simple, it may be advantageous to update β several times within one frame i.e. update β with a higher rate than the frame rate. E.g. 10 times per frame.

The adaptive update algorithm may e.g. comprise or be constituted by a SIGN LMS algorithm. The update of the adaptive parameter may be performed using the sign LMS-algorithm (e.g. a complex sign LMS algorithm), e.g. for the M>2 case, where the target cancelling beamformers are combined (added together).

In the choice between using the LMS or the NLMS algorithm, it may be worth mentioning that the division in an LMS/NLMS update can be less accurate compared to a division used in a single step estimation. In the NLMS case, the division can simply be implemented by a shift operator, which is (computationally) much cheaper than a division operation. The shift operator (corresponding to rounding the denominator to nearest 2N.

The microphone system may comprise more than 2 microphones. The microphone system may comprise 3 microphones.

The equation ∇β=0 may be arranged to isolate $\beta_i$ such that each element of the β-vector is given in terms of beamformer averages and the other elements of the β-vector, as outlined in the following.

Based on the gradient, different update rules can be derived for three microphones. In the case of three microphones, the gradient w.r.t. $\beta_1$ and $\beta_2$ is given by $$\frac{\partial |Y|^2}{\partial \beta_1} = -2C_1^*(C_0 - \beta_1 C_1 - \beta_2 C_2)$$

$$\frac{\partial |Y|^2}{\partial \beta_2} = -2C_2^*(C_0 - \beta_1 C_1 - \beta_2 C_2)$$

By setting the gradients=0, we obtain the two expressions:

$$\beta_1 = \frac{C_1^* C_0 - \beta_2 C_1^* C_2}{|C_1|^2}$$

$$\beta_2 = \frac{C_2^* C_0 - \beta_1 C_2^* C_1}{|C_2|^2}$$

We may thus find the optimal set pair of $\beta_1$, $\beta_2$, by iteratively alternating between the two expressions (where the beamformer expressions are averaged over time (e.g. $<|C_1|^2\bullet>$)):

$$\beta_1 = \frac{\langle C_1^* C_0\rangle - \beta_2 \langle C_1^* C_2\rangle}{\langle |C_1|^2\rangle}$$

$$\beta_2 = \frac{\langle C_2^* C_0\rangle - \beta_1 \langle C_2^* C_1\rangle}{\langle |C_2|^2\rangle}$$

In this solution, we do not have to select a learning rate. We solely need to select a smoothing coefficient for the average operators $\langle \bullet\bullet \rangle$. In addition, if the β-terms fluctuate during convergence, it may be advantageous to apply low-pass filtering to $\beta_1$ and to $\beta_2$. It is proposed to iteratively alternate between determining $\beta_1$ (by the above equation (possibly including LP-filtering of $\beta_1$, $\beta_2$), given a previously estimated value of (2) and $\beta_2$ (by the above equation (possibly including LP-filtering of $\beta_1$, $\beta_2$), given the previously estimated value of $\beta_1$).

The equation $\nabla\beta=0$ may be solved to isolate $\beta_i$ such that each element of the β-vector is given solely in terms of beamformer averages as outlined in the following.

Notice, from the above equations, we may also insert $$\beta_2 = \frac{C_2^* C_0 - \beta_1 C_2^* C_1}{|C_2|^2}$$

into $$\beta_1 = \frac{C_1^* C_0 - \beta_2 C_1^* C_2}{|C_1|^2}$$

and thus isolate $\beta_1$. Hereby we obtain the direct estimation of $\beta_1$ and $\beta_2$ $$\beta_1 = \frac{\langle |C_2|^2\rangle\langle C_0 C_1^*\rangle - \langle C_2 C_1^*\rangle\langle C_0 C_2^*\rangle}{\langle |C_1|^2\rangle\langle |C_2|^2\rangle - \langle C_2 C_1^*\rangle\langle C_1 C_2^*\rangle}$$

and $$\beta_2 = \frac{\langle |C_1|^2\rangle\langle C_0 C_2^*\rangle - \langle C_1 C_2^*\rangle\langle C_0 C_1^*\rangle}{\langle |C_1|^2\rangle\langle |C_2|^2\rangle - \langle C_2 C_1^*\rangle\langle C_1 C_2^*\rangle}$$

As it appears, the adaptive parameter vector β (e.g. $\beta_1$, $\beta_2$ of a microphone system comprising three microphones), or the adaptive parameter β (of a microphone system comprising two microphones), may be estimated based on averaging across the M (e.g. M=2, 3) microphones (rather than estimating the noise covariance matrix ($R_V$)).

The direct estimation of $\beta_1$ and $\beta_2$ is advantageous, as it does not depend on previous estimates of $\beta_1$ and $\beta_2$, and the convergence hereby only depends on the beamformer averages. On the other hand, the estimation depends on quartic (4th order) terms, which may be problematic to implement in fixed-point.

As an alternative, the alternating solution, where the estimate of $\beta_1$ depends on $\beta_2$ and vice versa, only depends on quadratic terms. Still both update rules do not contain any learning rate.

By defining specified position of the target sound source, it is ensured that the estimated MVDR beamformer weights are normalized such that the output signal has an undistorted response for the specified target position.

The equation $\nabla\beta=0$, were VB refers the gradient with respect to β may refer to the derivative of the magnitude squared ($|\bullet|^2$) of the output (Y) of the MVDR beamformer with respect to the adaptive parameter vector β.

The target-maintaining beamformer and the at least two target-cancelling beamformers may be fixed (i.e. defined by predefined (or occasionally (not constantly) updated) weights).

The adaptive parameter vector β may be determined in dependence of the time-averaged values of the (e.g. fixed) target-maintaining beamformer ($C_0$) and the at least two target-cancelling beamformers ($C_1$, $C_2$). Time-averaging the beamformers is an alternative to actually estimating the covariance matrices.

The at least M−1 (e.g. two) target-cancelling beamformers may be based on a subset of the M electric input signals.

The microphone system may comprise (e.g. consist of) M=3 microphones. In a first mode of operation, the two target-cancelling beamformers may be based on three electric input signals. In a second mode of operation, the two target-cancelling beamformers may be based on two electric input signals (cf. e.g. FIG. 10C). The hearing aid may be adapted to switch (e.g. fade) between the first and the second mode of operation (e.g. in dependence of a classifier of the acoustic environment, or of an estimate of a current rest-capacity of the battery of the hearing aid, or of a current power consumption of the hearing aid).

The adaptive parameter vector β for a three input GSC-beamformer may be estimated directly, but the direct estimation is difficult to implement as it requires a large dynamic range (due to the quartic terms). As an alternative to the direct estimation, an estimate based on solving the equation $\nabla\beta=0$, where VB refers to the gradient with respect to β. Thereby the adaptive parameters $\beta_1$ and 82 for a three-input solution may be estimated in an alternating way (e.g. first $\beta_1$, then $\beta_2$, then $\beta_1$, etc.). This estimation only contains second order terms, which is more desirable in a fixed-point implementation.

$5^{th}$ Aspect: (GSC-GEV Beamformer (Gradient or Sign LMS Update)

The Generalized Eigenvector beamformer (GEV) (or an approximation thereof) implemented as a generalized sidelobe canceller (GSC) structure is determined as a function of an adaptive parameter β (or parameter vector β), e.g. a) by using the LMS (or NLMS) algorithm (e.g. a Sign-LMS algorithm) or b) by solving the equation $\nabla\beta=0$ ($\nabla\beta$ being the gradient with respect to β).

The directional noise reduction system may e.g. comprise a Generalized Eigenvector beamformer (GEV) solution for 2 or 3 or more input transducers (e.g. microphones), in particular an update rule for estimating adaptive parameters (β) based on averaging across the three (or more) fixed beamformers (rather than estimating the noise covariance matrix). (e.g. including fading between beamformer weights for two and three input transducers (e.g. microphones)).

For two microphones, we still only have two fixed beamformers, but contrary to solely finding an average when noise is present, we also fine a separate average when speech (or target) is present. For two microphones, we thus estimate averages based on two beamformers, but the averages are split into averages when either we detect noise or we detect speech, which is similar to either updating a speech covariance matrix or a noise covariance matrix (based on the electric input signals from the input transducers), but in the present disclosure it is proposed to base the (speech and noise) covariances on beamformed signals instead (from the target-maintaining and the target-cancelling beamformers).

A Fifth Hearing Aid:

In a fifth aspect of the present application, a hearing aid adapted to be worn by a user is provided by the present disclosure. The fifth hearing aid comprises

- a microphone system comprising a multitude M of microphones, where M is larger than or equal to two, adapted for picking up sound from an environment of the user and to provide M corresponding electric input signals $x_m(n)$, m=1, . . . , M, n representing time,
- a directional noise reduction system connected to said microphone system and comprising a beamformer implemented as a generalized sidelobe canceller (GSC) for providing a noise reduced signal in dependence of adaptively determined beamformer weights, wherein the beamformer is configured to exhibit a distortionless response for a specified position (θ) of a specific target sound source ($S_\theta$), and wherein the generalized sidelobe canceller is configured to adaptively determine said beamformer weights to maximize a target signal to noise ratio (SNR) of the beamformed signal, wherein the target signal may comprise signals from a plurality ($N_{TS}$) of target signal sources located at different positions ($\theta_i$, i=1, . . . , $N_{TS}$) around the user, and wherein the generalized sidelobe canceller comprises a multitude M of fixed beamformers, each being configured to generate a beam pattern/beamformed signal in dependence of associated fixed beamformer weights, and wherein the adaptively determined beamformer weights of the generalized sidelobe canceller beamformer are determined in dependence of an adaptive parameter β or parameter vector β.

The adaptively determined beamformer weights of the generalized sidelobe canceller beamformer may be determined in dependence of an adaptive parameter β or parameter vector

- using a gradient equation relating to the gradient of the target signal to noise ratio with respect to the adaptive parameter β or parameter vector β, or
- using a sign LMS algorithm.

The sign LMS is a special case of the gradient algorithm, where the gradient step is limited to moving in the direction of the sign of the gradient (i.e. the sign of the real part and the imaginary part of the gradient).

The target signal to noise ratio may e.g. be expressed in dependence of the fixed (target-maintaining and target-cancelling) beamformers and the adaptive parameter β or parameter vector β.

When the adaptive parameter β or parameter vector β is updated using a Sign LMS algorithm, the step size may be held constant. The Sign LMS algorithm may be the complex Sign LMS algorithm. The step size may be complex. The real and imaginary parts of the complex step size may be kept constant.

The advantage of the sign LMS is its simplicity. E.g. divisions during the LMS update can be avoided. The adaptive parameter may be updated more frequently, e.g. more than once per frame. And the lack of accuracy in the sign-gradient step can be compensated by a frequent update of small gradient steps.

In order to increase the convergence rate, the step size(s) of the adaptive algorithm, e.g. the i Sign LMS algorithm, may be updated with a momentum term.

By updating the beamformer weights/adaptation coefficients in order to maximize the general SNR rather than a specific target signal-to-noise-ratio (from one specific target sound source ($S_\theta$), at one specific location (θ)) the beamformer weights/adaptive parameters of the beamformer thereby allow target signals to impinge from more directions than the position for which a distortionless response is provided. The target sound sources may e.g. be sound sources comprising speech. The target sound sources may e.g. be sound sources comprising music.

The (GSC) beamformer may e.g. comprise a Generalized Eigenvector beamformer (GEV) (or an approximation thereof) configured to provide a noise reduced signal determined as a function of an adaptive parameter β or parameter vector β. The Generalized Eigenvector beamformer (GEV) (or an approximation thereof) may e.g. comprise a multitude M of fixed beamformers, each being configured to generate a beam pattern/beamformed signal in dependence of associated beamformer weights. The adaptively determined beamformer weights of the GSC-beamformer may e.g. be determined in dependence of the adaptive parameter β or parameter vector β.

The (GSC) beamformer may e.g. comprise a multitude (e.g. M) of fixed beamformers, e.g. one target maintaining beamformer and M−1 target-cancelling beamformers.

The (GSC) beamformer may e.g. comprise one beamformer configured to have a distortionless response for a specific target position of a target sound source, and M−1 beamformers configured to be independent target-cancelling beamformers for the specific target position (or positions).

Hereby it is ensured that the estimated weights of the Generalized Eigenvector beamformer (GEV), or an approximation thereof, are normalized such that the output signal of the beamformer has an undistorted response for sound from the specific target position.

The distortionless position may be adaptively changed over time.

The hearing aid may comprise a postfilter connected to said at least one beamformer and adapted to receive said at least one beamformed signal, or a processed version thereof, and wherein said postfilter is configured to provide gains to be applied to said at least one beamformed signal, or to said processed version thereof, in dependence of a postfilter target signal to noise ratio to provide a further noise reduced signal.

The adaptive parameter β or parameter vector β (and thus the adaptively determined beamformer weights of the GSC beamformer) may e.g. be determined by averaging across the (e.g. M) fixed beamformers.

The update rule according to the present disclosure is an alternative to estimating a noise covariance matrix.

The Generalized Eigenvector beamformer (GEV) (or an approximation thereof) may e.g. comprise one target-maintaining beamformer and M−1 target cancelling beamformers.

In a specific power saving mode of operation, the M−1 target cancelling beamformers (and optionally the target maintaining beamformer) receive as inputs only a subset of the M electric input signals (see e.g. FIG. 8C or 10C).

The subset of the M electric input signals may comprise two electric input signals (whereby the M−1 target-cancelling beamformers (and optionally the target-maintaining beamformer) may be first order beamformers).

Each of the M−1 target cancelling beamformers may be configured to only take a subset of the M microphone signals as inputs, e.g. such that each target cancelling beamformer has inputs comprising a different subset of the M input signals (e.g. a subset consisting of two input signals, such that each target cancelling beamformer becomes a first order beamformer, e.g. a first order cardioid).

In connection with any of the preceding aspect or in a further, separate, aspect, the hearing aid is configured to provide that the first and second target cancelling beamformers of a three microphone input solution—at least in second mode of operation—are based on a subset of the three microphone inputs, and wherein the directional noise reduction system is configured to switch (e.g. fade) beamformer weights of the target maintaining beamformer and the first and second target cancelling beamformers between sets of beamformer weights optimized for three (first mode) and two microphones (second mode), respectively.

In connection with any of the preceding aspects or in a further, separate, aspect, the hearing aid comprises directional noise reduction system comprising a three microphone input GSC-structure comprising a (e.g. fixed) target maintaining beamformer and first and second (e.g. fixed) target cancelling beamformers, wherein the first and second target cancelling beamformers are based on a subset of two of the three microphone inputs, and wherein the hearing aid is configured to shift (e.g. fade) between a first and a second mode of operation, wherein all three microphone inputs are active in the first mode and wherein only two of the three microphone inputs are active in the second mode of operation.

The hearing aid is configured to store beamformer weights in memory that are optimized in advance for the first and second modes of operation of the directional system.

The transition from the first to the second mode of operation (or from the second to the first mode of operation) may be controlled by the user via a user interface of by a control signal in dependence of an indicator a complexity of the current acoustic environment around the user.

In a three-microphone input system (first mode of operation), the GSC-structure comprises a (e.g. fixed) three-input target maintaining beamformer and first and second (e.g. fixed) two-input target cancelling beamformers, whereas in a two-microphone input system the GSC-structure comprises a (one, e.g. fixed) two-input target maintaining beamformer and a single (e.g. fixed) two-input target cancelling beamformer.

The main advantage of using two-microphone (target-cancelling) beamformers in a three-microphone system is that it becomes easier to fade between a 2-microphone system and a 3-microphone system, as the target cancelling beamformer can be re-used.

The trigger for entering the specific mode of operation (change from three to two inputs to the target cancelling beamformers) may e.g. be related to saving power. The trigger may e.g. be based on the input level or another parameter, e.g. provided by a sound scene detector.

The sound scene complexity may trigger fading from two to three microphones. The trigger may e.g. be a function of level, SNR, remaining battery time, movement.

In general, it can be argued that the battery capacity is not well spent on powering three microphones in all situations. We may apply three microphone-based beamforming only in the most complex environments. Which microphones to fade away form may depend on the microphone configuration in the hearing device. It may be desirable to fade towards the two microphones whose axis is most parallel to a front-rear axis in an ordinary situation where the ser focuses attention on a sound source in the environment. In an own voice pickup (telephone) mode of operation of the hearing aid, a different two-microphone configuration may be selected. In case one of the microphones is detected not to work, the two still functional microphones may preferably be selected.

The hearing aid may comprise a classifier of the current acoustic environment of the user. The classifier may provide a classification signal representative of a current acoustic environment. The fading between which microphones of the microphone system to be used for beamforming in a given acoustic situation may be controlled by the classification signal.

In situations, with little or no noise or a signal from a single direction, there is a risk that the target covariance matrices and the noise covariances (or the corresponding fixed beamformers) may converge towards the same value (i.e. $R_T=R_V$). This can be avoided by adding a bias to the covariance matrices, i.e.

$$R_T = \langle xx^H \rangle_T + \sigma_T^2 dd^H$$

and $$R_V = \langle xx^H \rangle_V + \sigma_V^2 I$$

where $\sigma_T$ and $\sigma_V$ are small constants and I is the identity matrix (having 1's in the diagonal and 0's elsewhere). As the microphone signals will always contain microphone noise, it is most important to add a bias to the target covariance matrix, hereby ensuring that the beamformer system will converge towards an MVDR beamformer in the case of low input levels.

In the above example, the bias is a rank-1 matrix, but the added target covariance bias may also be a full rank matrix.

An SNR estimate (e.g. the target signal to noise ratio (SNR) of the beamformed signal) may be used as input to a postfilter.

The LMS or NLMS update term of the adaptive parameter or parameter matrix β (μ<•>) may be normalized in a number of different ways, see e.g. $4^{th}$ aspect.

The LMS or NLMS update rate may e.g. be further increased by adding a momentum term.

$6^{th}$ Aspect: (GSC-GEV Beamformer (Directly Determined (Fixed Beamformers) or Complex Sign LMS Update)

The $6^{th}$ aspect relates to a two-(or three-) microphone input directional system implemented as a GSC-structure comprising a GEV beamformer comprising two (or three) fixed beamformers, wherein an update rule for estimating the adaptive parameter (β) of the GSC structure is based on one of a) a direct determination based on estimation values of the beamformed signals of the two (or three) fixed beamformers, and b) the Sign LMS algorithm.

A Sixth Hearing Aid:

In a sixth aspect of the present application, a hearing aid adapted to be worn by a user is provided by the present disclosure. The sixth hearing aid comprises

- a microphone system comprising two or three microphones adapted for picking up sound from an environment of the user and to provide corresponding electric input signals $x_m(n)$, m=1, 2, or m=1, 2, 3, n representing time,
- a directional noise reduction system connected to said microphone system and implemented as a generalized sidelobe canceller (GSC) and comprising a Generalized Eigenvector beamformer (GEV) or an approximation thereof, the directional noise reduction system being configured to provide a noise reduced signal determined as a function of an adaptive parameter β, the Generalized Eigenvector beamformer (GEV) comprising at least two fixed beamformers, each being configured to generate a beamformed signal in dependence of associated beamformer weights, wherein An update rule for estimating said adaptive parameter (8) is based on at least one of

- A direct determination based on estimation values of said beamformed signals of said two fixed beamformers, and
- An update of previous values to present values according to the complex Sign-LMS algorithm.

The multitude M of microphones may be equal to two. The multitude M of microphones may be equal to three.

For a two-microphone case (M=2), two solutions (providing maximum and minimum values) of the differential equation of the cost function $\mathscr{L}$ (e.g. SNR) with respect to the adaptive parameter β may be given by the expression $$\beta = \frac{-B \pm \sqrt{B^2 - 4AC}}{2A}$$

where $$A = \langle|C_{T1}|^2\rangle\langle C_{V1}C_{V0}^*\rangle - \langle|C_{V1}|^2\rangle\langle C_{T1}C_{T0}^*\rangle$$

$$B = \langle C_{V0}C_{V1}^*\rangle\langle C_{T1}C_{T0}^*\rangle - \langle C_{T0}C_{T1}^*\rangle\langle C_{V1}C_{V0}^*\rangle - \langle|C_{T1}|^2\rangle\langle|C_{V0}|^2\rangle + \langle|C_{T0}|^2\rangle\langle|C_{V1}|^2\rangle$$

$$C = \langle C_{T0}C_{T1}^*\rangle\langle|C_{V0}|^2\rangle - \langle C_{V0}C_{V1}^*\rangle\langle|C_{T0}|^2\rangle.$$

where $C_0$, and $C_1$ are the (output signals of the) target-maintaining ($C_0$) and target-cancelling ($C_1$) beamformers, respectively, and the $C_{TN}$ and $C_{VN}$, N=0, 1, are the values of the target-maintaining ($C_0$) and target-cancelling ($C_1$) beamformers, respectively, during target (T), e.g. speech, and noise (N), respectively, and wherein |•| indicates magnitude, * indicates complex conjugate, and <•> indicates time average.

The second degree polynomial yields two solutions for β: one value maximizing the SNR; and another value minimizing the SNR. Using Muller's method, the solution to the quadratic formula can be rewritten as $$\beta = \frac{-B \pm \sqrt{B^2 - 4AC}}{2A} = \frac{2C}{-B \mp \sqrt{B^2 - 4AC}}.$$

From this equation, we can see that for $$A \to 0,\ \beta = \frac{-B + \sqrt{B^2 - 4AC}}{2A} = \frac{2C}{-B - \sqrt{B^2 - 4AC}} \xrightarrow[A \to 0]{} -\frac{C}{B}$$

and $$\beta = \frac{-B - \sqrt{B^2 - 4AC}}{2A} = \frac{2C}{-B + \sqrt{B^2 - 4AC}} \xrightarrow[A \to 0]{} (\pm)\infty.$$

So $$\beta = \frac{-B + \sqrt{B^2 - 4AC}}{2A}$$

yields the MVDR solution (i.e. A=0), which is the solution maximizing the SNR.

Update rules for the adaptive parameter (β) based on the complex sign LMS algorithm for the two-microphone case (M=2) may be given by the following expressions for the real and imaginary parts of β:

$$\Re\beta(n) = \Re\beta(n-1) + \mu_{\Re}\,\mathrm{sign}\left(\Re\left(C_{V1}^* Y_V |Y_T|^2 - C_{T1}^* Y_T |Y_V|^2\right)\right)$$

$$\mathcal{J}\beta(n) = \mathcal{J}\beta(n-1) + \mu_{\mathcal{J}}\,\mathrm{sign}\left(\mathcal{J}\left(C_{V1}^* Y_V |Y_T|^2 - C_{T1}^* Y_T |Y_V|^2\right)\right)$$

where $Y_T$ and $Y_V$ are the most recent available output signal estimates of the GSC-GEV beamformer, when the output is labelled as target (T) and (non-target) noise (N), respectively, and $\mu_{\Re}$ and $\mu_{\mathcal{J}}$ are fixed step sizes of the adaptive algorithm in the direction of the real and imaginary parts of β, respectively.

For three microphones (M=3), update rules for the adaptive parameter vector (β) based on the sign-based LMS may be given by $$\Re\beta_1(n) = \Re\beta_1(n-1) + \mu_{\Re}\,\mathrm{sign}\left(\Re\left(C_{V1}^* Y_V |Y_T|^2 - C_{T1}^* Y_T |Y_V|^2\right)\right)$$

$$\mathcal{J}\beta_1(n) = \mathcal{J}\beta_1(n-1) + \mu_{\mathcal{J}}\,\mathrm{sign}\left(\mathcal{J}\left(C_{V1}^* Y_V |Y_T|^2 - C_{T1}^* Y_T |Y_V|^2\right)\right)$$

and $$\Re\beta_2(n) = \Re\beta_2(n-1) + \mu_{\Re}\,\mathrm{sign}\left(\Re\left(C_{V2}^* Y_V |Y_T|^2 - C_{T2}^* Y_T |Y_V|^2\right)\right)$$

$$\mathcal{J}\beta_2(n) = \mathcal{J}\beta_2(n-1) + \mu_{\mathcal{J}}\,\mathrm{sign}\left(\mathcal{J}\left(C_{V2}^* Y_V |Y_T|^2 - C_{T2}^* Y_T |Y_V|^2\right)\right)$$

where $C_{TN}$ and $C_{VN}$, N=0, 1, 2 are the values of the target-maintaining ($C_0$) and target-cancelling ($C_1$, $C_2$) beamformers, respectively, during target (T), e.g. speech, and noise (N), respectively, and where $Y_V$ and $Y_T$ both depend on the most recent estimates of $\beta_1$ and $\beta_2$.

The sign LMS algorithm (i.e. the adaptive parameters) may be updated more than once per time frame, e.g. 2 times per frame or 5 times per frame.

$7^{th}$ Aspect (GSC Beamformer where SNR is Expressed in of Beamformer Weights Optimized in Dependence of Electric Input Signals):

The $7^{th}$ aspect relates to a hearing aid comprising an adaptive beamformer implemented as a generalized sidelobe canceller (GSC) comprising M fixed beamformers, wherein the beamformer weights (w) of the adaptive beamformer are adaptively optimized to a plurality of target positions (θ) by maximizing a target signal to noise ratio (SNR) for sound from said plurality of target positions (θ), where said beamformer weights (w) are optimized in dependence of time averaged inner vector products of the multitude of electric input signals x and $x^H\langle xx^H\rangle_T$ and $\langle xx^H\rangle_V$.

A Seventh Hearing Aid:

In a seventh aspect of the present application, a hearing aid adapted to be worn by a user is provided. The seventh hearing aid comprises

- a microphone system comprising a multitude (M) of microphones, where M is larger than or equal to two, adapted for picking up sound from an environment of the user and to provide corresponding electric input signals $x_m(n)$, m=1, . . . , M, n representing time,
- a directional noise reduction system connected to said microphone system, the directional noise reduction system comprising at least one beamformer for generating at least one beamformed signal in dependence of beamformer weights (w) configured to be applied to said multitude (M) of electric input signals, thereby providing said at least one beamformed signal as a weighted sum of the multitude (M) of electric input signals, wherein said at least one beamformer is implemented as a generalized sidelobe canceller (GSC) for providing a noise reduced signal in dependence of adaptively determined beamformer weights, wherein the generalized sidelobe canceller comprises a multitude M of fixed beamformers, one of the M fixed beamformers being a target signal maintaining beamformer, and M−1 of the fixed beamformers being different target-cancelling beamformers, each being configured to generate a beamformed signal in dependence of associated fixed beamformer weights ($W_{F,m}$, m=1, . . . , M) and wherein the adaptively determined beamformer weights are determined in dependence of an adaptive parameter β or parameter vector β; and wherein said beamformer weights (w) are adaptively optimized to a plurality of target positions (θ) by maximizing a target signal to noise ratio (SNR) for sound from said plurality of target positions (θ), wherein the signal to noise ratio (SNR) is expressed in dependence of said beamformer weights (w), and where said beamformer weights (w) are optimized in dependence of time averaged inner vector products of the multitude of electric input signals x and $x^H$ $\langle xx^H\rangle_T$ and $\langle xx^H\rangle_V$, where $\langle\bullet\rangle$ denotes average over time, and wherein $\langle xx^H\rangle_T$ and $\langle xx^H\rangle_V$, are determined when said electric input signals are estimated to contain target speech (T) and noise (V), respectively.

The inner vector product of x and $x^H$, refers to the vector product of the electric input signals from the M microphones arranged as a vector $x=(x_1, \ldots, x_M)^T$, where superscript T denotes transposition.

The hearing aid may comprise a voice activity detector configured to estimate whether or not or with what probability a given input signal contains voice (e.g. speech) and to provide a voice activity control signal indicative thereof.

The voice activity control signal may be used to decide when estimation of whether to contain target speech (T) and noise (V), respectively.

The decision may as well depend on other cues, e.g. spatial cues.

The beamformer weights (w) may be iteratively updated using a gradient based optimization procedure. This is possible since the weights are given as function of the adaptive parameter β (which may be optimized based on the gradient algorithm). This is further described in the paragraph below.

The beamformer weights (w) may be expressed as function of β as $w=a-B\beta^*$, and the beamformed signal Y as $Y=(a-B\beta^*)^H x=C_0-\beta C$ as $C_0=a^H x$, and $C=B^H x$, where a is the vector containing the weights of the target maintaining beamformer $C_0$, and B is the blocking matrix containing the weights of the target cancelling beamformers, C. We thus have $$\langle C_T^* Y_T\rangle = \langle Y_T C_T^*\rangle = (a-B\beta^*)^H\langle xx^H\rangle_T B = (a-B\beta^*)^H R_T B = W^H R_T B$$

$$\langle C_V^* Y_V\rangle = \langle Y_V C_V^*\rangle = (a-B\beta^*)^H\langle xx^H\rangle_V B = (a-B\beta^*)^H R_V B = W^H R_V B$$

$$\langle Y_T^* Y_T\rangle = \langle Y_T Y_T^*\rangle = (a-B\beta^*)^H\langle xx^H\rangle_T (a-B\beta^*) = (a-B\beta^*)^H R_T (a-B\beta^*) = w^H R_T w$$

$$\langle Y_V^* Y_V\rangle = \langle Y_V Y_V^*\rangle = (a-B\beta^*)^H\langle xx^H\rangle_V (a-B\beta^*) = (a-B\beta^*)^H R_V (a-B\beta^*) = w^H R_V w$$

Where T and V indicate 'target' and 'noise' (not target), respectively, and where $\langle z^*z\rangle_T$ and $\langle z^*z\rangle_V$ indicate an average of the signal z for a frequency band k across time frames (l) labelled as target and noise, respectively. $z_T$ and $z_V$ are the signals for time-frequency units labelled as target (T) and noise (V), respectively (e.g. by a voice activity detector).

The SNR is given as $$SNR(Y) = \frac{\langle Y_T^* Y_T\rangle}{\langle Y_V^* Y_V\rangle}$$

and $$SNR(w) = \frac{w^H R_T w}{w^H R_V w}.$$

We thus see that the SNR is expressed in dependence of either the output signals ($Y_T$ and $Y_V$) or the weights w (in terms of β) and the target and noise covariance matrices ($R_T$, $R_V$).

$8^{th}$ Aspect (Beamformer Wherein Beamformer Weights are Adaptively Optimized in Dependence of Steering Vectors for a Plurality of Target Positions:

The $8^{th}$ aspect relates to a hearing aid comprising an adaptive beamformer configured to generate at least one beamformed signal in dependence of beamformer weights (w), which are adaptively optimized to a plurality of target positions (θ) by maximizing a target signal to noise ratio (SNR) for sound from said plurality of target positions, and wherein the signal to noise ratio is expressed in dependence of the beamformer weights (w) and wherein the beamformer weights are optimized in dependence of steering vectors ($d_\theta$) for the plurality of target positions (θ).

An Eighth Hearing Aid:

In an eighth aspect of the present application, a hearing aid adapted to be worn by a user is provided. The eighth hearing aid comprises

- a microphone system comprising a multitude (M) of microphones, where M is larger than or equal to two, adapted for picking up sound from an environment of the user and to provide corresponding electric input signals $x_m(n)$, m=1, . . . , M, n representing time,
- a directional noise reduction system connected to said microphone system, the directional noise reduction system comprising at least one beamformer for generating at least one beamformed signal in dependence of beamformer weights (w) configured to be applied to said multitude (M) of electric input signals, thereby providing said at least one beamformed signal as a weighted sum of said multitude (M) of electric input signals, said beamformer weights (w) are adaptively optimized to a plurality of target positions (θ) by maximizing a target signal to noise ratio (SNR) for sound from said plurality of target positions, wherein the signal to noise ratio is expressed in dependence of said beamformer weights (w) and wherein said beamformer weights are optimized in dependence of steering vectors ($d_\theta$) for said plurality of target positions (θ).

The inter-microphone target covariance matrix $R_T$ may be determined as a (possibly weighted) sum of the (outer) product of the steering vectors $d_\theta d_\theta^H$ of the currently considered target sound sources (from positions $\theta=\theta_1, \ldots, \theta_{NTS}$, where NTS is the (current) number of target sound sources).

The summation in the expression of the target covariance matrix $R_T$ may be a weighted sum of the outer product of the most likely target steering vectors according to the following expression:

$$R_s = \sum_\theta p_\theta\, d_\theta d_\theta^H$$

where $p_\theta$ is a (real) weight factor (e.g. a probability estimate) of a given position θ, The SNR may be expressed in terms of steering vectors (look vectors):

$$\begin{aligned} SNR &= \frac{\langle Y_T Y_T^* \rangle}{\langle Y_V Y_V^* \rangle} \\ &= \frac{\langle |Y_T|^2 \rangle}{\langle |Y_V|^2 \rangle} \\ &= \frac{w^H R_T w}{w^H R_V w} \\ &= \frac{w^H \left(\sum_\theta p_\theta d_\theta d_\theta^H\right) w}{w^H R_V w} \\ &= \frac{(a - B\beta^*)^H \left(\sum_\theta p_\theta d_\theta d_\theta^H\right)(a - B\beta^*)}{(a - B\beta^*)^H \langle xx^H \rangle_V (a - B\beta^*)} \end{aligned}$$

We notice that $\langle |Y|^2 \rangle$ can be written as $$\begin{aligned} \langle |Y|^2 \rangle &= (a - B\beta^*)^H \langle xx^H \rangle (a - B\beta^*) \\ &= a^H \langle xx^H \rangle a + \beta^T B^H \langle xx^H \rangle B\beta^* - \beta^T B^H \langle xx^H \rangle a - a^H \langle xx^H \rangle B\beta^* \\ &= \langle a^H xx^H a \rangle + \beta^T \langle B^H xx^H B \rangle \beta^* - \beta^T \langle B^H xx^H a \rangle - \langle a^H xx^H B \rangle \beta^* \end{aligned}$$

As $a^H x$ and $B^H x$ are expressions for beamformers, we see that the covariance may be replaced by beamformer averages. Similarly, the numerator $\langle |Y_T|^2 \rangle$ may be expressed in terms of beamformers $$\begin{aligned} \langle |Y_T|^2 \rangle &= (a - B\beta^*)^H \left(\sum_\theta p_\theta d_\theta d_\theta^H\right)(a - B\beta^*) \\ &= a^H \left(\sum_\theta p_\theta d_\theta d_\theta^H\right) a + \beta^T B^H \left(\sum_\theta p_\theta d_\theta d_\theta^H\right) B\beta^* - \end{aligned}$$

-continued $$\beta^T B^H \left(\sum_\theta p_\theta d_\theta d_\theta^H\right) a - a^H \left(\sum_\theta p_\theta d_\theta d_\theta^H\right) B\beta^*$$

The numerator may thus as well be expressed in terms of fixed beamformer values given by a weighted sum of steering vectors multiplied by the fixed beamformer weights given by a and B.

The target covariance matrix ($R_T$) may be determined as a sum of outer products of steering vectors ($d_{\theta,p}$) for different persons (p). The target covariance matrix ($R_T$) may be determined as a weighted sum outer products of steering vectors ($d_{\theta,p}$) for different persons (p=1, . . . , P), the weights ($w_{d,p}$) being e.g. dependent on age, or gender (e.g. relative to the age or gender of the user).

In one formulation the SNR is expressed in terms of the averages of the products between the fixed beamformers output (Y). More specifically, the expected beamformer output while target is dominant ($Y_T$) and the expected beamformer outputs in the beamformers while the noise is dominant ($Y_V$).

The SNR which is optimized is estimated in dependence of the

Fixed target maintaining beamformer (a) (estimated separately when target is present/absent (or based on a fixed target covariance)), The fixed target cancelling beamformers (B) (estimated separately when target is present/absent (or based on a fixed target covariance)).

The at least one beamformer may be implemented as a GEV beamformer may be expressed in terms of target covariance ($R_T$) and noise covariance ($R_V$) matrices. However, the SNR may also be expressed in terms of the different estimated fixed beamformers in the GSC structure (where the covariance matrices need not be specifically estimated). In other words, rather than estimating covariance matrices, the averages are estimated as cross-products between a target maintaining beamformer and target cancelling beamformers (estimated during presence/absence of target/noise)).

$9^{th}$ Aspect (GSC Beamformer with a Variable Number of Active Input Signals):

State of the art hearing devices may comprise more than two microphones, e.g. three or more. In general, it can be argued that the (generally scarce) battery capacity is not well spent on powering all microphones of a hearing aid in all situations. All (e.g. three) microphone-based beamforming may be applied only in the most complex acoustic environments. Which microphones to fade away form may depend on the microphone configuration in the hearing device. It may be desirable to fade towards the two microphones whose axis is most parallel to a front-rear axis in an ordinary situation where the user focuses attention on a sound source in the environment. In an own voice pickup (telephone) mode of operation of the hearing aid, a different two-microphone configuration may be selected. In that case, we need a different steering vector d, and consequently a different target-maintaining beamformer a and a different target cancelling beamformer B. In case one of the microphones is detected not to work, the two still functional microphones may preferably be selected.

A Ninth Hearing Aid:

In a ninth aspect of the present application, a hearing aid adapted to be worn by a user is provided. The ninth hearing aid comprises a microphone system comprising a multitude M of microphones, where M is larger than or equal to three, adapted for picking up sound from an environment of the user and to provide corresponding M electric input signals ($X_m$, m=1, . . . , M)

a directional noise reduction system connected to said microphone system, the directional noise reduction system comprising a generalized sidelobe canceller (GSC) beamformer configured to provide at least one beamformed signal (Y), wherein the generalized sidelobe canceller comprises a multitude M of fixed beamformers, one of the M fixed beamformers being a target signal maintaining beamformer (a), and M−1 of the fixed beamformers being target-cancelling beamformers ($b_{m-1}$, m=2, . . . , M), each being configured to generate an intermediate beamformed signal ($C_{m-1}$, m=1, . . . , M) in dependence of associated fixed beamformer weights ($W_{F,m-1}$, m=1, . . . , M), and wherein the at least one beamformed signal (Y) is determined in dependence said multitude M of intermediate beamformed signals ($C_{m-1}$, m=1, . . . , M), wherein said M fixed beamformers—in a first mode of operation of the directional system—are configured to receive said M electric input signals as inputs, and to each provide said respective intermediate beamformed signals ($C_{m-1}$, m=1, . . . , M) in dependence of said M electric input signals ($X_m$, m=1, . . . , M) and said respective fixed beamformer weights ($W_{F,m-1}$, m=1, . . . , M), and wherein said M−1 target-cancelling beamformers—in a second mode of operation of the directional system—are configured to receive a subset of said M electric input signals as inputs and to each provide said respective intermediate beamformed signals ($C_{m-1}$, m=2, . . . , M) in dependence of said subset of said M electric input signals ($X_m$, m=1, . . . , M) and respective fixed beamformer weights ($w'_{F,m-1}$, m=2, . . . , M).

In case fading is implemented from two to one microphone, the GSC structure can be dispensed with. Otherwise, the GSC structure may be used.

The target-maintaining and target-cancelling beamformers need not necessarily be fixed. The beamformer weights (a and B) may be adaptively updated to adapt towards the target direction.

Preferably, the system comprises M−1 target cancelling beamformers. But less than M−1 may be used (so that we optimize for less than M−1 microphones).

The number M of microphones may be equal to three.

Different options exist in order to make two independent target-cancelling beamformers. One option is to select M−1 of M columns in the matrix given by $(I-(dd_{ref}^*/d^H d))$. In that case each target-cancelling beamformer becomes a linear combination of all three microphone signals (for M=3, cf. e.g. FIG. 8C).

In another option (cf. e.g. FIG. 8C, for M=3), two independent first order target cancelling beamformers may be created. For example:

One target cancelling beamformer based on microphone #1 and microphone #2:

Another target cancelling beamformer based on microphone #1 and microphone #3.

The resulting weights become dependent on all three microphones, and we can obtain the same resulting gains from this linear combination as we could when each target cancelling beamformer was based on all three microphones.

In the second mode of operation, the number of electric input signals ($X_{m\bullet}$) to the target maintaining beamformer may e.g. be equal to M−1.

The advantage of the second solution (for M=3) is that we can fade e.g. microphone 3 out simply by turning the target cancelling beamformer ($C_2$) based on microphone 1 ($M_1$) and microphone 3 ($M_3$) off. The target canceling beamformer ($C_1$) based on microphone 1 ($M_1$) and microphone 2 ($M_2$) do not need to be changed depending on whether the resulting beamformer depends on 2 or 3 microphones.

The target maintaining beamformer $C_0$, however needs to be scaled differently. When it is based on a different number of microphones. In the case of three microphones (M=3), the weights a of the target maintaining beamformer are given by d $d_1^*/(|d_1|^2+|d_2|^2+|d_3|^2)$, where microphone 1 ($M_1$) is the reference microphone. In the case of two microphones (M=2), it is given by: d $d_1^*/(|d_1|^2+|d_2|^2)$. The scaling difference between three and two microphones is thus $(|d_1|^2+|d_2|^2+|d_3|^2)/(|d_1|^2+|d_2|^2)$, a value, which approximately is around 1.5. But the correct scaling difference would be $(|d_1|^2+|d_2|^2+|d_3|^2)/(|d_1|^2+|d_2|^2)$ or $(|d_1|^2+|d_2|^2)/(d_1|^2+|d_2|^2+|d_3|^2)$ depending on the fading direction.

In the second mode of operation, the number $M_{sub,0}$ of electric input signals received by the target maintaining beamformer (a) is M.

In the second mode of operation, the subsets ($SS_{m-1}$, m=2, . . . , M) of the M electric input signals ($X_m$, m=1, . . . , M) received by the M−1 target-cancelling beamformers ($b_{m-1}$, m=2, . . . , M) may comprise $M-1 \geq M_{sub,m-1} \geq 2$ of the M electric input signals ($X_m$, m=1, . . . , M).

The number ($M_{sub,m-1}$) of electric input signals ($X_{m\bullet}$) of a given subset ($SS_{m-1}$, m=2, . . . , M) may be equal for all M−1 target cancelling beamformers ($b_{m-1}$, m=2, . . . , M).

At least two of the subsets may comprise a different number of electric input signals.

At least two of the subsets may have at least one electric input signal different from each other.

The number ($M_{sub,m-1}$) of electric input signals ($X_m$) may e.g. be equal to two for at least one, such as a majority or all, of the M−1 target cancelling beamformers ($C_{m-1}$, m=2, . . . , M).

When switching between the first and second modes of operation, an instant change between using two and three microphones may be applied. To minimize abrupt sound effects that might annoy the user, a fading between the two modes may, however, be applied.

The hearing aid may be configured to switch (e.g. fade) between the first and second modes of operation of the directional system in dependence of a mode selection signal.

In a directional system comprising three microphones, the target maintaining beamformer may apply approximately ⅓ of the weighting to each microphone signal. In a directional system comprising two microphones, the target maintaining beamformer may apply approximately ½ of the weighting to each microphone signal. The simplest thing to do when fading is to apply a scaling to each weight while fading. i.e. while fading from three to two microphones. An example hereof is shown in FIG. 8C.

The hearing aid may comprise a classifier of the current acoustic environment of the user. The classifier may provide a classification signal representative of a current acoustic environment. The mode selection signal may be determined (or influenced) by the classification signal.

The mode selection signal may e.g. be determined (or influenced) by a detected sound scene complexity. Switching (fading) from M−1 to M (e.g. from two to three) inputs to the target-cancelling beamformers may e.g. be initiated by a detection of a more complex acoustic environment and vice versa.

The hearing aid may be configured to switch (e.g. fade) between the first and second modes of operation (e.g. change from M to M−1 (e.g. from three to two) inputs to the target-cancelling beamformers) to save power. The hearing aid may comprise a detector of a current status of the energy source, e.g. providing an estimate of a current rest-capacity of the battery of the hearing aid, or of a current power consumption of the hearing aid.

The mode selection signal may e.g. be a function of input level of the electric input signal(s), SNR, remaining battery time, movement of the user, etc.

Standard Features for Application to all Aspects of the Present Disclosure:

The hearing aid may comprise a multitude (M≥2) of microphones.

The hearing aid may comprise a directional noise reduction system comprising a generalized sidelobe canceller (GSC) beamformer configured to provide at least one beamformed signal, wherein the generalized sidelobe canceller comprises a multitude M of fixed beamformers, one of the M fixed beamformers being a target signal maintaining beamformer (a), and M−1 of the fixed beamformers being target-cancelling beamformers ($b_{m-1}$, m=2, . . . , M).

The at least M−1 (e.g. two) target-cancelling beamformers may be based on a subset of the M electric input signals.

The microphone system may consist of M−3 microphones. In a first mode of operation, the two target-cancelling beamformers may be based on three electric input signals. In a second mode of operation, the two target-cancelling beamformers may be based on two electric input signals. The hearing aid may be adapted to switch (e.g. fade) between the first and the second mode of operation (e.g. in dependence of a classifier of the acoustic environment, or of an estimate of a current rest-capacity of the battery of the hearing aid, or of a current power consumption of the hearing aid).

The directional noise reduction system may e.g. comprise a Generalized Eigenvector beamformer (GEV) solution for 2 or 3 or more input transducers (e.g. microphones), in particular comprising an update rule for estimating adaptive parameters (B) based on averaging across the three (or more) fixed beamformers (rather than estimating the noise covariance matrix). The directional noise reduction system may e.g. be configured to include the option of fading between beamformer weights for two and three input transducers (e.g. microphones)).

The Generalized Eigenvector beamformer (GEV) (or an approximation thereof) may e.g. comprise one target-maintaining beamformer and M−1 target cancelling beamformers.

In a specific power saving mode of operation, the M−1 target cancelling beamformers may receive as inputs only a subset of the M electric input signals (see e.g. FIG. 8C, FIG. 10C).

The subset of the M electric input signals may comprise two electric input signals (whereby the M−1 target-cancelling beamformers are first order beamformers).

Each of the M−1 target cancelling beamformers may only take a subset of the M microphone signals as inputs, e.g. such that each target cancelling beamformer has inputs comprising a different subset of the M input signals (e.g. a subset consisting of two input signals, such that each target cancelling beamformer becomes a first order beamformer).

In connection with any of the preceding aspect or in a further, separate, aspect, the hearing aid may be configured to provide that the first and second target cancelling beamformers of a three microphone input solution are based on a subset of the three microphone inputs, and wherein the beamformer—e.g. in a specific mode of operation—is configured to fade the beamformer weights of the first and second target cancelling beamformers between sets of beamformer weights optimized for two and three microphones, respectively.

The main advantage of using two-microphone beamformers in a three-microphone system is that it becomes easier to fade between a 2-microphone system and a 3-microphone system, as the target cancelling beamformer can be re-used.

The trigger for entering the specific mode of operation (change from three to two inputs to the target cancelling beamformers) may e.g. be related to saving power. The trigger may e.g. be based on the input level or another parameter, e.g. provided by a sound scene detector.

The sound scene complexity may trigger fading from two to three microphones. The trigger may e.g. be a function of level, SNR, remaining battery time, movement.

In general, it can be argued that the battery capacity is not well spent on powering three microphones in all situations. We may apply three-microphone-based beamforming only in the most complex environments. Which microphones to fade away form may depend on the microphone configuration in the hearing device. It may be desirable to fade towards the two microphones whose axis is most parallel to a front-rear axis in an ordinary situation where the user focuses attention on (a) sound source(s) in the environment. In an own voice pickup (telephone) mode of operation of the hearing aid, a different two-microphone configuration may be selected. Further, in case one of the microphones is detected not to work, the two still functional microphones may preferably be selected.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form. The present application further relates to a Generalized EigenVector beamformer, also termed a 'Generalized EigenValue beamformer', in both cases abbreviated as GEV.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology, e.g. LE Audio), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g, such as less than 5 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

The hearing aid, e.g. the input unit, and or the antenna and transceiver circuitry may comprise a transform unit for converting a time domain signal to a signal in the transform domain (e.g. frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid (e.g. to decrease the number of microphones actively used).

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L−) threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.):
d) the current mode or state of the hearing aid (program selected, time elapsed since last user interaction, etc.) and/or of another device in communication with the hearing aid.

The classification unit may be based on or comprise a neural network, e.g. a recurrent neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path, but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, a headset, an earphone, an ear protection device or a combination thereof. A hearing system may comprise a speakerphone (comprising a number of input transducers (e.g. a microphone array) and a number of output transducers, e.g. one or more loudspeakers, and one or more audio (and possibly video) transmitters e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method According to a $1^{st}$ Aspect:

In an aspect, a method of operating a hearing aid adapted to be worn by a user is provided by the present disclosure. The hearing aid comprises a microphone system comprising a multitude M of microphones, where M is larger than or equal to two, adapted for picking up sound from an environment of the user and to provide corresponding electric input signals. The method comprises generating at least one beamformed signal in dependence of beamformer weights configured to be applied to said multitude of electric input signals, thereby providing said at least one beamformed signal as a weighted sum of the multitude of electric input signals, and adaptively optimizing said beamformer weights to a plurality of target positions by maximizing a target signal to noise ratio for sound from said plurality of target positions, determining the signal to noise ratio in dependence of first and second output variances, or time averaged versions of said first and second output variances, of said at least one beamformer, and where said first and second output variances are determined when said electric input signals or said at least one beamformed signal are/is labelled as target and noise, respectively.

It is intended that some or all of the structural features of the device described above, in the detailed description of embodiments' or in the claims can be combined with embodiments of the method, when appropriately substituted by a corresponding process and vice versa. Embodiments of the method have the same advantages as the corresponding devices.

A Method According to a 2nd Aspect:

In an aspect, a method of operating a hearing aid adapted to be worn by a user is furthermore provided by the present application. The hearing aid comprises a microphone system comprising a multitude (M) of microphones, where M is larger than or equal to two, adapted for picking up sound from an environment of the user and to provide corresponding electric input signals $x_m(n)$, m=1, . . . , M, n representing time. The method comprises

- generating at least one beamformed signal in dependence of beamformer weights (w) configured to be applied to said multitude (M) of electric input signals,
- adaptively optimizing said beamformer weights (w) to a plurality of target positions (θ) by maximizing a target signal to noise ratio (SNR) for sound from said plurality of target positions (θ),
- wherein the signal to noise ratio is expressed in dependence of said beamformer weights (w), an inter-microphone target covariance matrix ($R_T$), and an inter-microphone noise covariance matrix ($R_V$), and wherein the target covariance matrix ($R_T$) is determined in dependence of a multitude of steering vectors ($d_\theta$) for said currently present target sound sources.

It is intended that some or all of the structural features of the device described above, in the detailed description of embodiments' or in the claims can be combined with embodiments of the method, when appropriately substituted by a corresponding process and vice versa. Embodiments of the method have the same advantages as the corresponding devices.

The beamformer weights (w) for the plurality of target positions (θ) to currently present plurality of target sound sources may be determined in dependence of a multitude of steering vectors ($d_\theta$) for the currently present plurality of target sound sources, e.g. a weighted sum.

Methods According to 3rd-9h Aspects:

Methods according to 3rd to 9th aspects are provided by the present disclose by substituting structural features of hearing aids according to the 3rd to 9th aspects by equivalent process features.

It is intended that some or all of the structural features of the hearing aid devices according to the 3rd to 9th aspects described above, in the 'detailed description of embodiments' or in the claims can be combined with embodiments of the methods according to the 3rd to 9h aspects, respectively, when appropriately substituted by corresponding processes (and vice versa). Embodiments of the methods have the same advantages as the corresponding devices.

A Computer Program:

A computer program (product) comprising instructions which, when the program is executed by a computer, cause the computer to carry out (steps of) the methods described above (e.g. according to any of the 1st to 9th aspects), in the 'detailed description of embodiments' and in the claims is furthermore provided by the present application.

A Hearing System:

In a further aspect, a hearing system comprising a hearing aid as described above (e.g. according to any of the 1st to 9th aspects), in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may be constituted by or comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC, a wireless microphone, etc.) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Embodiments of the disclosure may e.g. be useful in applications such as hearing aids or headsets or earphones or combinations thereof.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. aids or headsets, in particular to noise reduction in such devices.

Figure 1A:
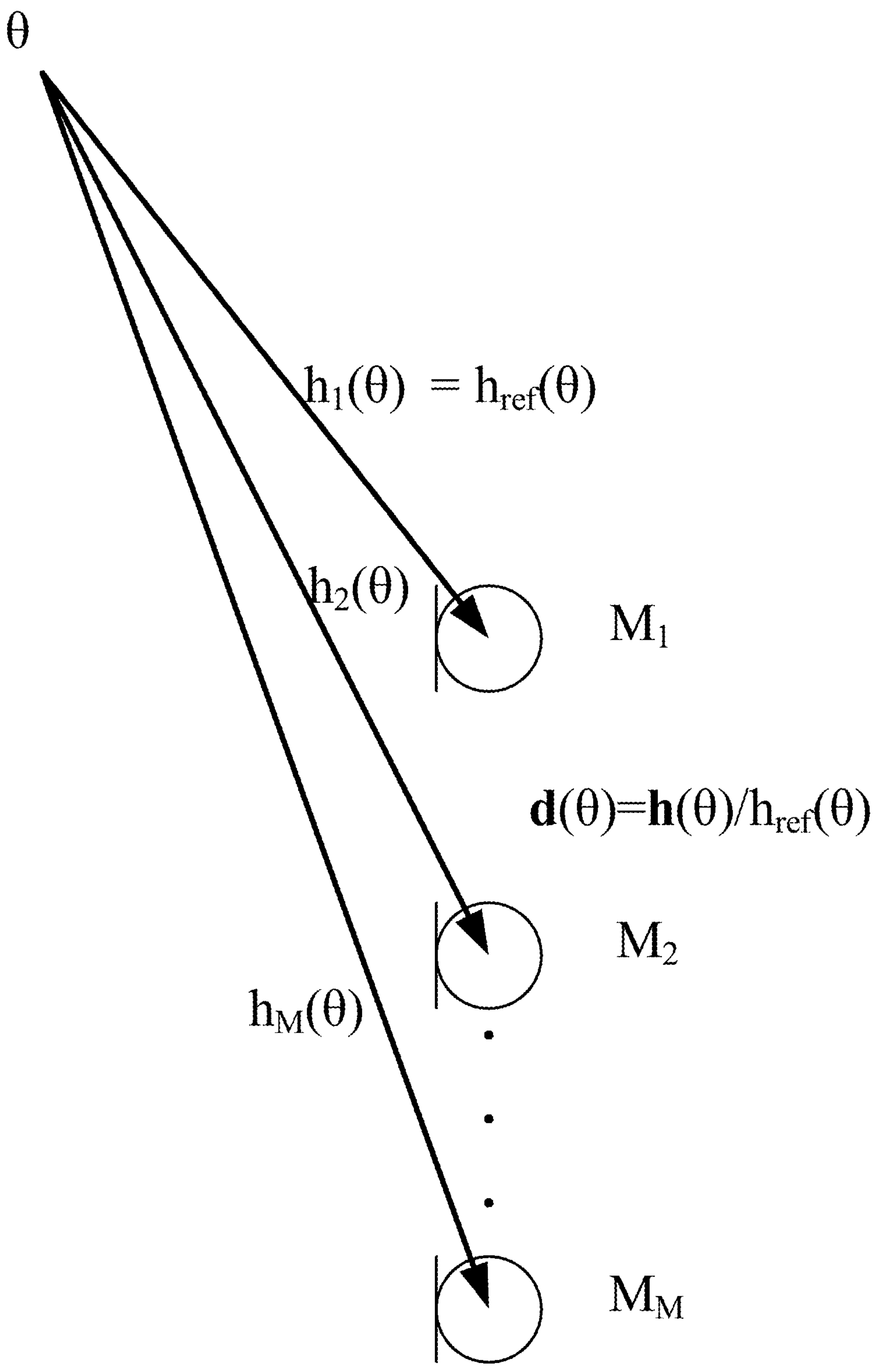
FIG. 1A illustrates that a given sound source at the position θ (e.g. relative to the hearing device, or to the user's head) has the transfer function to the m'th microphone given by $h_m(\theta)$ for a given frequency band.

FIG. 1A schematically illustrates that a given sound source at the position θ has the (absolute) (acoustic) transfer function to the $m^{th}$ microphone given by $h_m(\theta)$ for a given frequency band (k). The relative (acoustic) transfer function $d_m(\theta)$ between a reference microphone ($M_1$) and the $m^{th}$ microphone ($M_m$) is thus given by $d_m(\theta)=h_m(\theta)/h_{ref}(\theta)$, $m=1, \ldots, M$. The relative transfer functions from a given target position θ to the microphone array can thus be described by the vector $d(\theta)=h(\theta)/h_{ref}(\theta)$, where the vector $h(\theta)$ represents the absolute acoustic transfer functions ($h_m(\theta)$, $m=1, \ldots, M$) of sound from a sound source at the position θ to the M microphones of a microphone array (e.g. of a hearing device). In FIG. 1A, the microphones ($M_1, \ldots, M_M$) are indicated to be located on a common line (microphone axis). This needs not be the case, however. The steering (or look) vector d is the same as the relative transfer function between the microphones. It may be calibrated (updated) in absence of background noise, alternatively in low-noise environments, based on a sound which is played from the target direction.

For a minimum variance distortionless response (MVDR) beamformer, the set of beamformer weights which maximize the SNR at the output may be given by the following ratio:

$$SNR = \frac{w_\theta^H \sigma_\theta^2 d_\theta d_\theta^H w_\theta}{w_\theta^H \sigma_V^2 \Gamma_V w_\theta},$$

Where $\sigma_\theta^2$ is the target variance, $\sigma_v^2$ is the noise variance, and $R_V=\sigma_V^2\Gamma_V$, where $\Gamma_V$ is the normalized correlation matrix, $R_V$/TRACE ($R_V$), where the TRACE-function extracts the diagonal elements of a matrix (here $R_V$) and adds them together. The SNR at the reference microphone is thus given by $\sigma_\theta^2/\sigma_V^2$. In the particular case where the target signal is a single point source, the target covariance matrix is given by $R_T=\sigma_T^2\Gamma_T=\sigma_\theta^2 d_\theta d_\theta^H$. We notice that the target covariance matrix ($R_T$) is singular, as it is given by the outer product of $d_\theta$. In this particular case, where we have a closed-form solution given by $$w_\theta = \frac{R_V^{-1} d_\theta}{d_\theta^H R_V^{-1} d_\theta}.$$

which is the well-known MVDR beamformer solution.

Assuming that the target is only present at a single direction may not always comply with what the listener would like to listen to. In order to cope with that, one strategy is to estimate the most likely target direction, either by finding the most likely steering vector $d_\theta$ (cf. e.g. EP3413589A1) or by estimating the most likely direction to a point sound source of current interest to the user (cf. e.g. EP3300078A1).

Now we will consider the more general case, where more than one direction could be of interest to the listener, e.g. multiple talkers from (separate) single directions, or everything in the front half plane. In that case we assume that the target covariance matrix has full rank, e.g. that the target covariance matrix may be a sum of different steering vectors, i.e.

$$R_T = \sigma_T^2 \Gamma_T = \sum_\theta \sigma_\theta^2 d_\theta d_\theta^H.$$

In that case, we need to find the set of weights w which maximizes $$SNR = \frac{w^H R_T w}{w^H R_V w}.$$

The above problem is well-known and the solution w can be estimated as the eigenvector belonging to the largest generalized eigenvalue.

The weight w may as well be estimated, e.g. by iteratively updating w using a gradient based optimization.

The gradient is given by $$\begin{aligned}\nabla w &= 2\frac{w^H R_V w R_T w}{(w^H R_V w)^2} - 2\frac{w^H R_T w R_V w}{(w^H R_V w)^2} \\ &= 2\frac{w^H R_V w R_T w - w^H R_T w R_V w}{(w^H R_V w)^2}.\end{aligned}$$

Other gradient algorithms may be used. We may find a set of weights w that maximizes SNR, and e.g. fulfils $\nabla w=0$. However, we can only find w up to a scaling and we thus have to choose how the set of weights that maximizes the SNR should be normalized, e.g. by having a unit gain towards a certain direction, i.e. fulfilling $|w^H d_\theta|^2=1$.

This type of beamforming is often referred to as generalized eigenvector (GEV) beamforming.

Figure 1B:
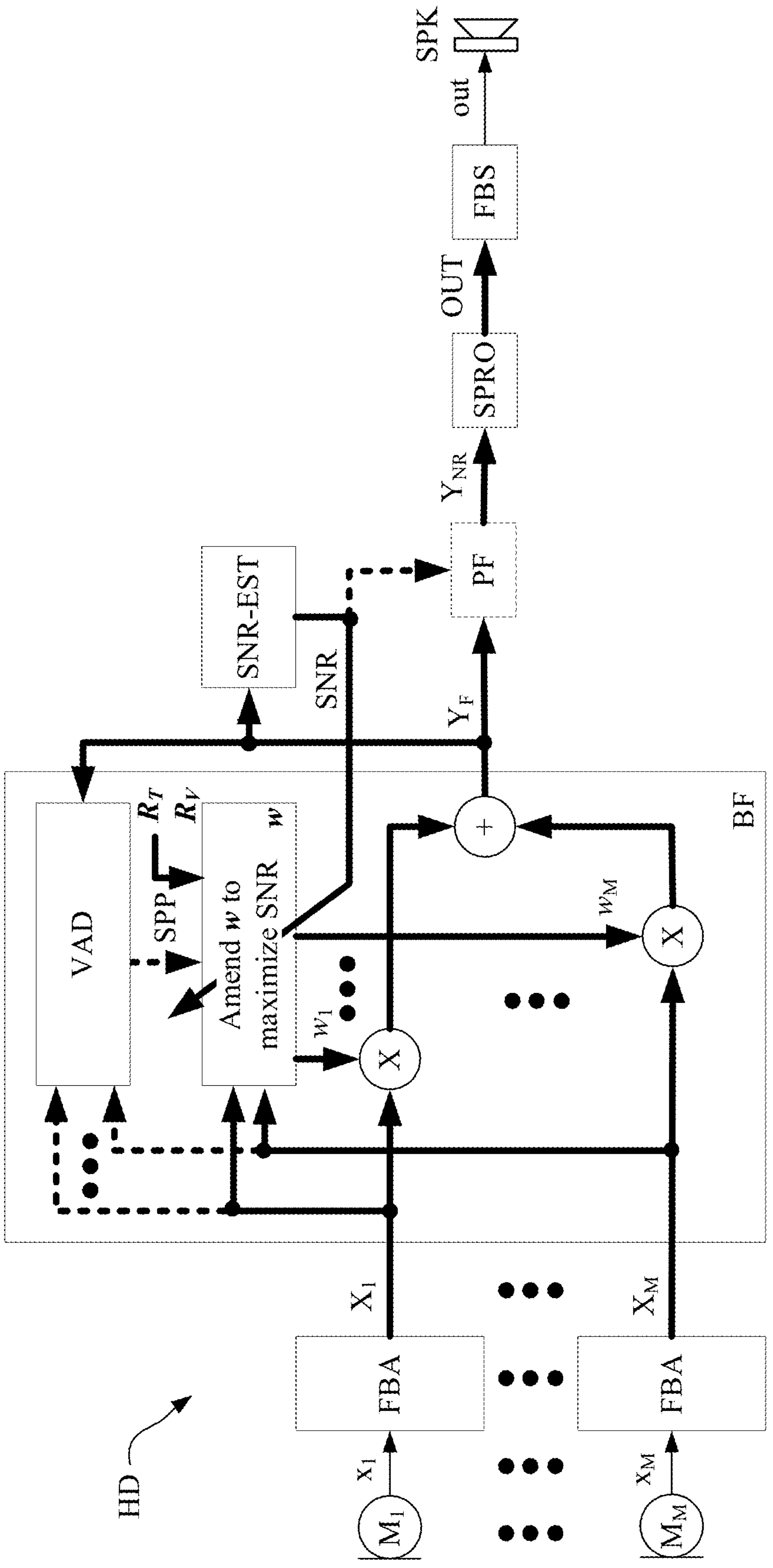
FIG. 1B schematically shows a hearing aid comprising a directional system according to an embodiment of the present disclosure.

FIG. 1B schematically shows a hearing device (HD), e.g. a hearing aid, adapted to be worn by a user. The hearing aid comprises a microphone system comprising a multitude M of microphones ($M_1, \ldots, M_M$), where M is larger than or equal to two, adapted for picking up sound from an environment of the user and to provide corresponding electric input signals ($x=[x_1, \ldots, x_M]$). Each of the microphone paths comprises an analysis filter bank (FBA), e.g. comprising a Fourier transformation algorithm(e.g. DFT or STFT, etc.) for converting a time-domain input signal ($x_m$, m=1, . . . , M) to frequency sub-band signals ($X_m$, m=1, . . . , M) in the time-frequency domain (k, l), where k and/are frequency and time indices, respectively. The hearing aid further comprises a directional noise reduction system connected to said microphone system.

The directional noise reduction system comprises at least one beamformer (BF) for generating at least one beamformed signal ($Y_F$) in dependence of (typically complex) beamformer weights ($w=[w_1, \ldots, w_M]$) configured to be applied to the multitude (M) of electric input signals, thereby providing the at least one beamformed signal ($Y_F$) as a weighted sum of the multitude (M) of electric input signals (x), $Y_F=(w^H x)$. To implement the weighted sum of the input signals, the beamformer comprises respective combination units (here multiplication units ('X')) for applying the (typically complex) weights ($w_1, \ldots, w_M$) to the respective electric input signals ($X_m$, m=1, . . . , M) to provide respective weighted input signals ($w_1X_1, \ldots, w_MX_M$). The weights may be complex conjugated before being multiplied to the input signal, i.e $w^H=[w_1, \ldots, w_M]$. The embodiment of the beamformer of FIG. 1B further comprises an M-input combination unit (here a summation unit ('+')) for providing the beamformed signal $Y_F$ as a linear combination of the M electric input signals, $$Y_F = w_1 X_1 +, \ldots, +w_M X_M.$$

(cf. the M multiplication units (X) and the sum unit (+) whose output is the beamformed signal ($Y_F$))

The hearing device comprises an SNR-estimator (SNR-EST) for estimating an SNR (SNR) of the beamformed signal ($Y_F$). The SNR estimator is connected to or form part of the beamformer (BF) (as in FIG. 1B) and is used in the iterative determination of the optimal weights (w) of the beamformer (cf. optimization block in FIG. 1B denoted 'Amend w to maximize SNR').

The hearing device, e.g. (as indicted in FIG. 1B) the directional system, e.g. the at least one beamformer (BF) comprises a voice activity detector (VAD, e.g. embodied as a speech detector). The voice activity detector (VAD) is configured to (continuously) estimate whether or not (binary), or with what probability, an input (audio) signal comprises a voice signal, e.g. speech. In the embodiment of FIG. 1B, the voice activity detector (VAD) receives as an input (audio) signal the beamformed signal ($Y_F$), and/or optionally one or more of the electric input signals in a time frequency representation (k,l) ($X_m$, m=1, . . . , M), cf. dashed arrows), so that the resulting voice activity control signal (VLAB) may be based on one or more of said signals. The voice activity control signal (VLAB) may be representative of a speech presence probability of a time-frequency unit (k,l), or be a binary indicator (e.g. 'speech dominant' or 'speech not dominant' (e.g. noise dominant), or e.g. labelled as target (T) and noise (N), respectively), i.e. in any case VLAB=VLAB (k,l).

The hearing device (HD) may comprise (or have access to) a number of stored parameters relevant for the optimization of the beamformer weights (w). The hearing device (HD) may comprise memory (MEM) storing such parameters. The parameters may include predetermined values of such parameters, e.g. steering vectors ($d_\theta$) (or inter-microphone target covariance matrices ($R_T$)) for a plurality of target positions (θ), and/or inter-microphone noise covariance matrices $R_V$ for a multitude of current acoustic environments (preferably of relevance to the user of the hearing device).

Figure 12:
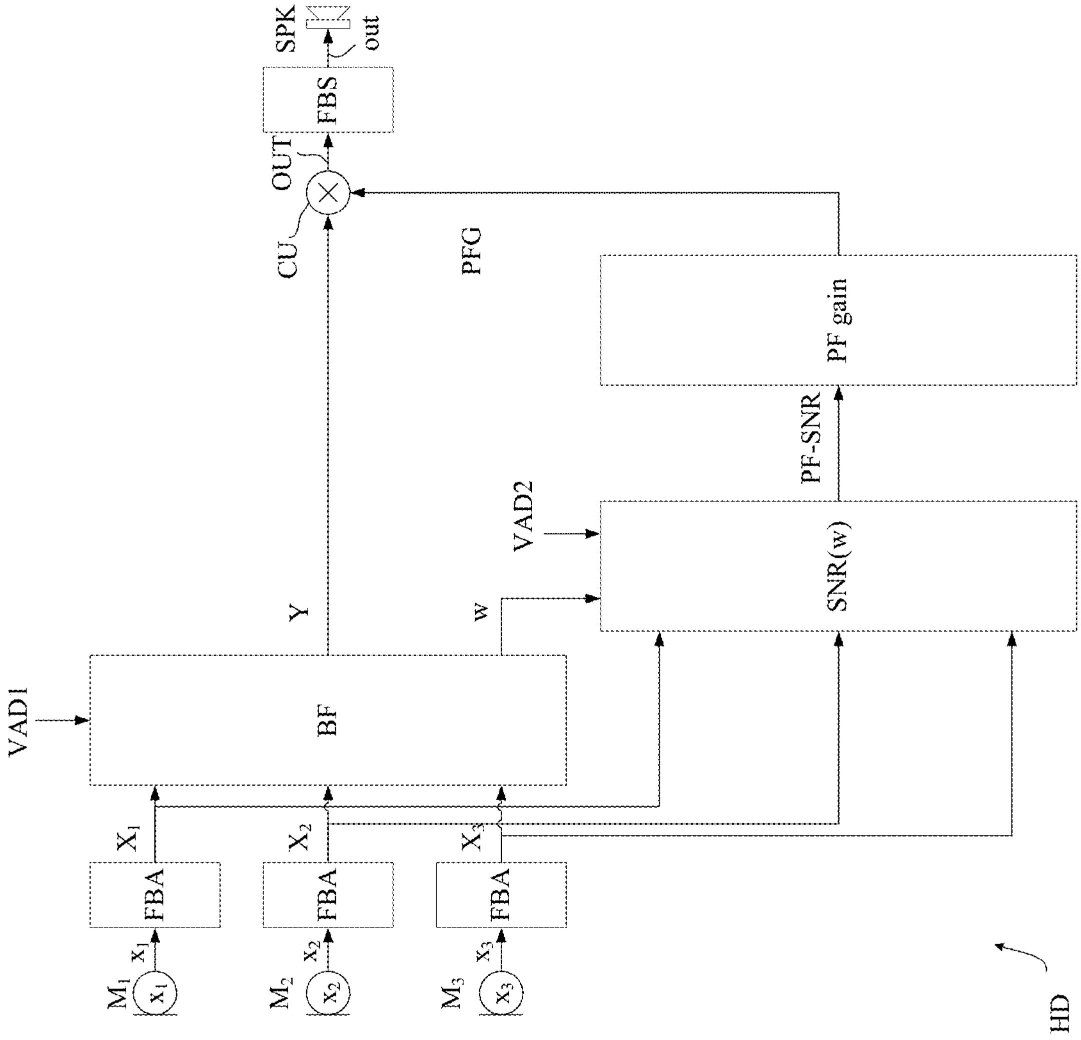

The noise reduction system may comprise further noise reduction blocks, e.g. a single-channel postfilter for further reducing noise in the 'spatially filtered (beamformed) signal ($Y_F$), cf. block (PF) with dashed enclosure in FIG. 1B, the postfilter receiving a signal to noise ratio from an SNR-estimator (e.g. from SNR-EST, or from another SNR estimator, e.g. SNR-PF and corresponding VAD-PF as indicated in dashed outline in FIG. 1B) for controlling gains of the post-filter intended to further reduce noise components of the spatially filtered (beamformed) signal ($Y_F$), cf. e.g. FIG. 12.

In the embodiment of FIG. 12 (and FIG. 1B), the Postfilter (PF) is used to further improve the optimized output (Y) of the beamformer (BF) to provide further noise reduce signal (OUT, $Y_{NR}$) by application of the postfilter gains (PFG) to the beamformed signal (Y). The post filter may alternatively be included in the beamformer weight optimization process, by optimizing the output of the post filter instead of the beamformer by maximizing its SNR. The voice activity control signal may as well be used as input to the postfilter. Either in order to estimate the weights that optimized the SNR or as an additional input besides the SNR. Different SNR-estimators may be applied to the beamformer and the postfilter, respectively.

The beamformer weights (w) are adaptively optimized to a plurality of target positions (θ) by maximizing a target signal to noise ratio (SNR) for sound from the plurality of target positions (θ). The optimization procedure is schematically indicated by block 'Amend w to maximize SNR', which in the embodiment of FIG. 1B forms part of the at least one beamformer (BF). The arrow from the SNR-estimator (SNR-EST) (signal SNR) through the block 'Amend w to maximize SNR' symbolizes the adaptive optimization procedure, wherein the beamformer weights are determined in an adaptive procedure involving an iterative change of the beamformer weights (w) (e.g. using an iterative optimization algorithm, e.g. a gradient ascent (e.g. steepest ascent) or similar algorithm) and a cost function (e.g. MSE) that monitors the change of SNR for a given change of weights. The procedure is arranged to optimize (maximize) the SNR of the beamformed signal ($Y_F$) and to freeze the weights, when SNR is maximum. Examples of different expressions of the signal to noise ratio used to optimize the beamformer weights are given below.

The hearing device (e.g. the beamformer SNR-estimation block (SNR-EST)) may be configured to adaptively estimate steering vectors ($d_\theta$) for the plurality of target positions (θ) (or corresponding inter-microphone target covariance matrices $R_T$), and/or inter-microphone noise covariance matrices $R_V$ in dependence of the voice activity control signal (VLAB) being labelled target (T) or noise (N), cf. arrow from the voice activity detector (VAD) to the SNR-estimation block (SNR-EST). The SNR-estimation block (SNR-EST) may include respective level detectors and/or smoothing units (e.g. low-pass filters) for smoothing the current estimates of target and noise over time (e.g. in the beamformed signal and/or in the electric input signals, etc.).

The hearing device may further comprise an audio signal processor (e.g. a hearing aid processor) (SPRO) for applying one or more processing algorithms to the beamformed (possibly further noise reduced) signal ($Y_F$, $Y_{NR}$), e.g. a compressive amplification algorithm that adapts a dynamic input level to fit a range of audible sound levels of the user and applies corresponding frequency dependent gains to the input signal (e.g. the beamformed signal ($Y_F$) (or the optionally further noise reduced signal $Y_{NR}$) in the embodiment of FIG. 1B). Other audio signal processing algorithms may be applied in the audio signal processor (SPRO), e.g. related to binaural aspects of hearing, to feedback control and/or echo cancelling, etc. The audio signal processor (SPRO) provides a processed output signal (OUT) in the time-frequency domain.

The hearing device may further comprise a synthesis filter bank (FBS) configured to convert a signal (OUT) in the time-frequency domain to a signal (out) in the time domain.

The hearing device further comprises an output transducer (here a loudspeaker (SPK)) for converting the processed output signal (out) to stimuli perceivable as sound to the user. The output transducer may (e.g. in a 'headset application') alternatively or additionally comprise an audio transmitter for transmitting the processed signal (out) to another device or system. The output transducer may e.g. comprise a vibrator of a bone-conducting hearing aid. The output transducer may e.g. comprise an electrode array of a cochlear implant type of hearing aid (in which case the synthesis filter bank can be dispensed with).

The hearing aid may comprise other functional units, e.g. one or more detectors, e.g. a classifier of the current acoustic environment around the user, that may be used to improve the quality of the stimuli presented to the user, e.g. to increase user's a listening comfort of the user, and/or to increase an intelligibility of speech content in the audio signals picked up or received by the hearing device.

Different expressions of the signal to noise ratio used to optimize the beamformer weights are proposed in the following.

Example 1

In an embodiment according to the present disclosure, the beamformer weights (w) are adaptively optimized to the plurality of target positions (θ) by maximizing a target signal to noise ratio (SNR) for sound from the plurality of target positions (θ), wherein the target signal to noise ratio (SNR) is expressed in dependence of first and second output variances $(|Y_T^2, |Y_V|^2)$ (or time averaged versions thereof $<|Y_T|^2>$, $<|Y_V|^2>$) of the at least one beamformer (e.g. of the at least one beamformed signal ($Y_F$), or of the (further) noise reduced signal ($Y_{NR}$) from a postfilter (PF)).

$$SNR(w) = \frac{< Y_T^* Y_T >}{< Y_V^* Y_V >}$$

The first and second output variances $(|Y_T|^2, |Y_V|^2)$ (or time averaged versions thereof $<|Y_T|^2>$, $<|Y_V|^2>$) are determined when the electric input signals (x) or at least one beamformed signal ($Y_F$, ($Y_{NR}$) in FIG. 1B) are labelled as target (T) and noise (V), respectively. The first and second output variances may be determined using the voice activity detector (VAD), cf. voice activity control signal (VLAB) of FIG. 1B.

In an embodiment according to the present disclosure, the beamformer weights (w) are adaptively optimized to a plurality of target positions (θ) by maximizing a target signal to noise ratio (SNR) for sound from the plurality of target positions (θ), wherein the signal to noise ratio is determined in dependence of the beamformer weights (w) and of time averaged inner vector products of the multitude of electric input signals X and $X^H <XX^H>_T$ and $<XX^H>_V$, where <, > denotes average over time.

$$SNR(w) = \frac{w^H < xx^H >_T w}{w^H < xx^H >_V w} = \frac{< w^H xx^H w >_T}{< w^H xx^H w >_V}$$

The time averaged inner vector products $<XX^H>_T$ and $<XX^H>_V$, are determined when the electric input signals (X) are labelled as target (T) and noise (V), respectively. The inner product $XX^H$ is equal to $X_1X_1^*+ \ldots +. X_MX_M^*$, where * denotes complex conjugation.

In an embodiment according to the present disclosure, the beamformer weights (w) are adaptively optimized to a plurality of target positions (θ) by maximizing a target signal to noise ratio (SNR) for sound from the plurality of target positions (θ), wherein the signal to noise ratio is determined in dependence of the beamformer weights (w) and of respective inter-microphone target covariance ($R_T$) and inter-microphone noise covariance ($R_V$) matrices.

$$SNR(w) = \frac{w^H R_T w}{w^H R_V w}$$

One or both of the inter-microphone target covariance ($R_T$) and inter-microphone noise covariance ($R_V$) matrices are either predetermined (e.g. selected in a given acoustic situation among a multitude of predetermined values for known acoustic situations), cf. memory (MEM) and inputs $d_\theta/R_T$, $R_V$ to the SNR-estimation block in FIG. 1B. One or both of the inter-microphone target covariance ($R_T$) and inter-microphone noise covariance ($R_V$) matrices may be adaptively determined in the SNR-estimation block, based on inputs VLAB and ($X_1, \ldots, X_M$) from the voice activity detector (VAD) and the microphones ($M_1, \ldots, M_M$), respectively.

Example 2

In an embodiment of the present disclosure, the beamformer weights (w) are adaptively optimized to a plurality of target positions (θ) by maximizing a target signal to noise ratio (SNR) for sound from the plurality of target positions (θ), wherein the signal to noise ratio is expressed in dependence of the beamformer weights (w) and an inter-microphone target covariance matrix $R_T$. The inter-microphone target covariance matrix $R_T$ may be determined in dependence of respective steering vectors ($d_\theta$) for the plurality of target positions (θ). The plurality of steering vectors ($d_\theta$) may be dynamically determined during use of the hearing device in dependence of the voice activity control signal (VLAB) (cf. arrow to the SNR-estimation block in FIG. 1B). The plurality of steering vectors ($d_\theta$) (or corresponding target covariance matrices $R_T(\theta)$) may be determined in advance for a number of the most probable target sound source positions (possibly selected in dependence of a current acoustic environment) and stored in a memory (MEM) of the hearing device (cf. input steering vectors ($d_\theta$) or covariance matrices ($R_T$) provided via dashed arrow to the SNR-estimation block (SNR-EST) of the beamformer (BF) in FIG. 1B). The signal to noise ratio (SNR) and hence the beamformer weights (w) may (additionally) depend on the inter-microphone noise covariance matrix $R_V$. The inter-microphone noise covariance matrix $R_V$ may be dynamically determined (e.g. in the SNR-estimation block of FIG. 1B) during use of the hearing device (in dependence of the voice activity control signal (VLAB)). The inter-microphone noise covariance matrix $R_V$ may be determined in advance (e.g. for a single noise sound field or for a number of different noise sound fields, e.g. for a number of corresponding acoustic situations, and stored in memory (MEM) of the hearing aid) and in a given situation selected from memory of the hearing device (cf. input $R_V$ via dashed arrow from memory to the SNR-EST-block in FIG. 1B).

The target covariance matrix ($R_T$) may be a fixed (predetermined), full rank matrix. The noise covariance matrix ($R_V$) may be adaptively determined.

The target and/or noise covariance matrices ($R_T$, $R_V$) may be estimated, when the voice activity control signal (VLAB) signal indicates that the input (audio) signal(s) monitored by the voice activity detector is (are) labelled 'target' (T=>$R_T$) and 'noise' (N=>$R_V$), respectively.

Figure 1C:
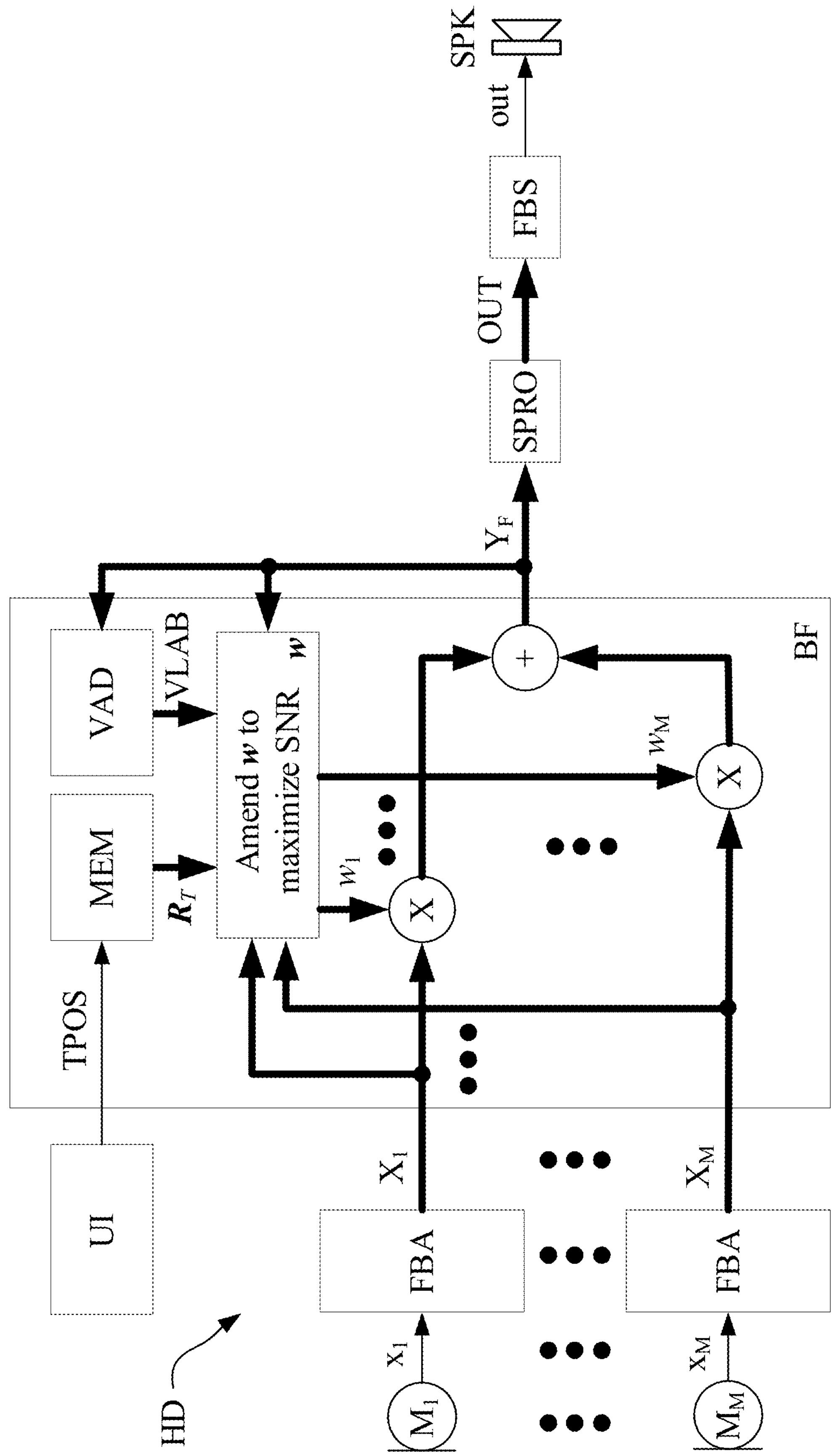
FIG. 1C schematically shows a hearing device comprising an embodiment a beamformer (BF) according to the present disclosure, wherein the beamformer comprises a weight optimization block (w) configured to determine (optimize, or approximate) the beamformer weights ($w=[w_1, \ldots, w_M]^T$) for a generalized eigenvector (GEV) beamformer (or an approximation thereof)

FIG. 1C schematically shows a hearing device (HD) comprising an embodiment a beamformer (BF) according to the present disclosure, wherein the beamformer comprises a weight optimization block (w, denoted 'Amend w to maximize SNR') configured to determine (optimize, or approximate) the beamformer weights (w $[w_1, \ldots, w_M]^T$) for a generalized eigenvector (GEV) beamformer (or an approximation thereof). The embodiment of FIG. 1C is similar to the embodiment of FIG. 1B, but partitioned differently, and further comprising a user interface (UI) configured to allow a user of the hearing device to indicate a target position, or a plurality of target positions, that the beamformer should consider when determining the beamformer weights (w) (e.g. by optimizing a signal to noise ratio for signals from the chosen target direction(s)). The user interface may be implemented as an APP of an auxiliary device (e.g. a smartphone, or similar (e.g. portable, e.g. handheld) processing device)) in communication with the hearing device. The auxiliary device may e.g. comprise a graphical (e.g. touch sensitive) display, for supporting the APP. The APP may e.g. allow the user to indicate one or more spatial angles (or angle ranges) around the user, wherein the target sound sources to be considered by the beamformer as sources of target signals are positioned. The user interface (UI) is configured to provide a target position control signal (TPOS) to a memory of the hearing device (HD) (e.g. by transmission (e.g. via a wireless link) from the auxiliary device to the hearing device). Based on a number of predetermined (and stored in MEM) target covariance matrices ($R_T(\theta)$) for the electric input signals ($X_1, \ldots, X_M$) for a multitude of user-selectable positions ($\theta$) the target covariance matrices ($R_T(\theta^*)$) for the positions selected by the user can be provided to the weight optimization block (w, denoted 'Amend w to maximize SNR'). The voice activity detector (VAD) is configured to label an input audio signal (here the beamformed signal $Y_F$) as target (T) or noise (N) on a time-frequency unit basis as indicated by the voice activity control signal (VLAB) to the weight optimization block (w). The weight optimization block (w) is configured to determine the inter-microphone noise covariance matrix $R_V$ for time segments of the frequency sub-band signals ($Y_F(k,l)$) labelled as noise (N) by the voice activity control signal (VLAB), as shown in FIG. 1C. Alternatively, the voice activity detector (VAD) may estimate noise covariance matrix $R_V$ and forward the estimate to the optimization block (w). The weight optimization block (w, denoted 'Amend w to maximize SNR') is configured to maximize SNR for the beamformed signal ($Y_F(k,l)$) given the target positions (TPOS) chosen by the user. The determined beamformer weights ($w=[w_1, \ldots, w_M]^T$) are applied to the electric (time-frequency domain) input signals ($X=[X_1, \ldots, X_M]^T$ in respective combination (here multiplication) units ('X'), whose outputs are added together in combination (here summation) unit ('+') to provide a (spatially filtered) beamformed signal ($Y_F$) as a linear combination of the electric input signals.

As shown and described in connection with FIG. 1B, the hearing device (HD) of FIG. 1C further comprises an audio signal processor (SPRO) for applying one or more processing algorithms to the beamformed (possibly further noise reduced) signal ($Y_F$), The audio signal processor (SPRO) provides a processed output signal (OUT) in the time-frequency domain and a synthesis filter bank (FBS) configured to convert a signal (OUT) in the time-frequency domain to a signal (out) in the time domain. Finally, the hearing device further comprises an output transducer (here a loudspeaker (SPK)) for converting the processed output signal (out) to stimuli perceivable as sound to the user. And possibly other functional units, e.g. to further improve the quality of the stimuli presented to the user.

Example 3

The 3rd example relates (mainly, but not exclusively) to a hearing device comprising a Generalized Eigenvector beamformer (GEV), in short denoted 'GEV-beamformer'. In connection with the GEV-beamformer, the target covariance matrix ($R_T$) is assumed to be a full-rank matrix. It is proposed to update the inter-microphone target covariance matrix $R_T$ and the inter-microphone noise covariance matrix $R_V$ of a beamformer based on voice activity detection, e.g. a) on an estimated direction of arrival of sound from a target sound source, b) on a comparison of signal content provided by a target-maintaining and a target cancelling beamformer, respectively (e.g. a difference between the two), or on c) speech detection.

Scaling w

As mentioned, maximizing $$SNR = \frac{w^H R_s w}{w^H R_v w}$$

only finds a set of weights w up to a scaling factor.

One way to cope with that may e.g. be to still impose an undistorted direction constraint for a preferred direction $\theta^*$, e.g. scaling w such that $$w^H d_{\theta^*} = 1.$$

Consequently, only a single (real-valued) scaling value of w fulfils the above constraint. This particular scaling ensures that the response towards a preferred target direction $\theta^*$ is distortionless. However, the SNR may still be optimized even though the current target direction deviates from the preferred target direction.

Estimating the Covariance Matrices

In MVDR beamforming, for a fixed target direction, we only have to estimate the noise covariance matrix. The target covariance matrix $R_T = d_\theta d_\theta^H$ is known in advance. The noise covariance matrix ($R_V$) is typically estimated during absence of speech. When we maximize an SNR, where the target is assumed not only to impinge from a desired direction, we thus need to estimate the target co-variance matrix ($R_T$) as well as the noise covariance matrix ($R_V$).

Optimizing Front-Back Ratio

In a 'front-back'-framework, it is assumed that sounds impinging from the front are of interest to the listener and sounds impinging from the back are considered as noise. In that case we aim at optimizing the front-back ratio, we thus have to decide when to update the target covariance matrix and the noise covariance matrix.

For that purpose, it is proposed to use a front-back detector based on the comparison between a beamformer pointing towards the front and a beamformer pointing towards the back. This is illustrated in FIG. 2 and FIG. 3.

Figure 2:
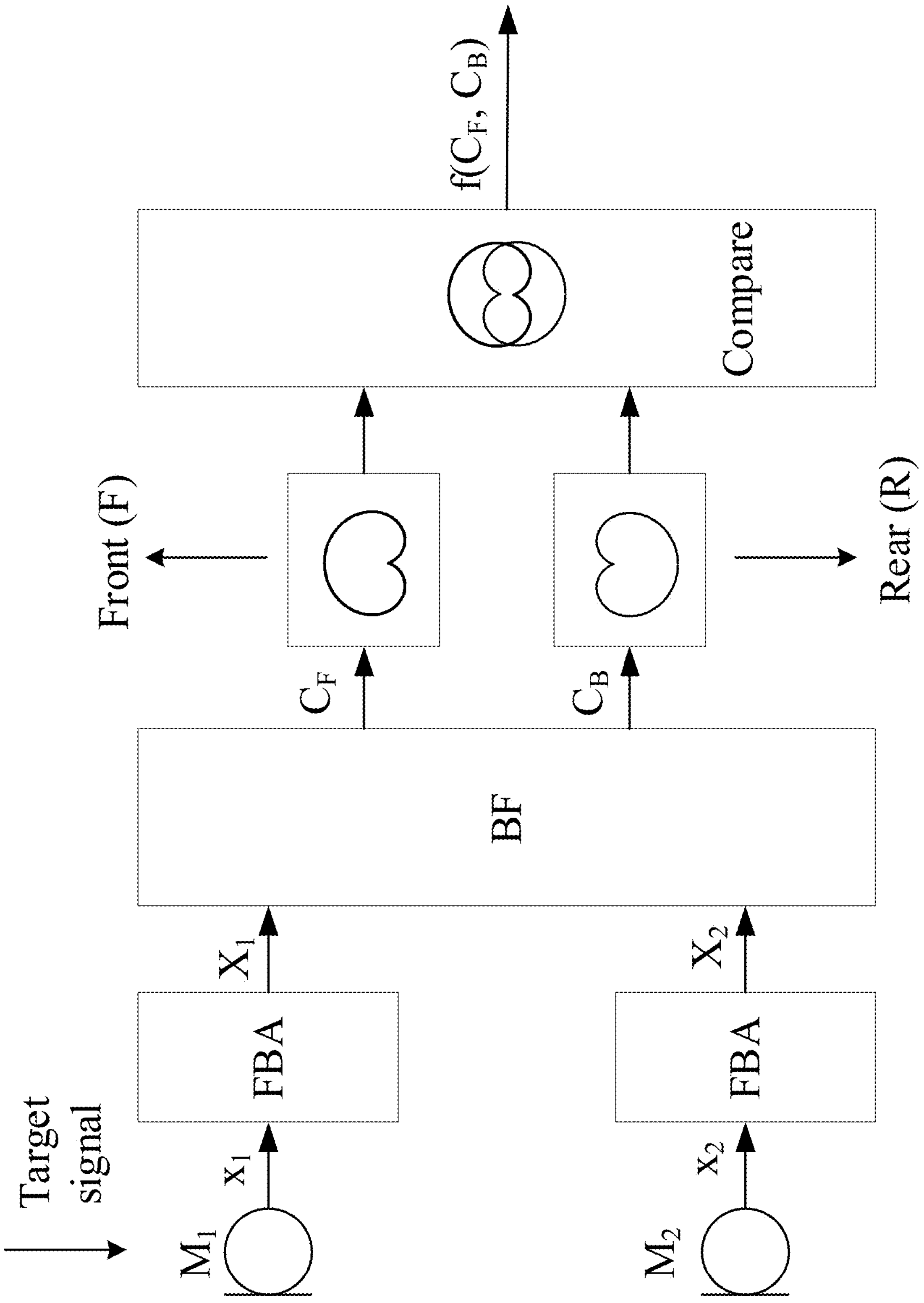
FIG. 2 shows a first embodiment of an input stage of a hearing device according to the present disclosure.
Figure 3:
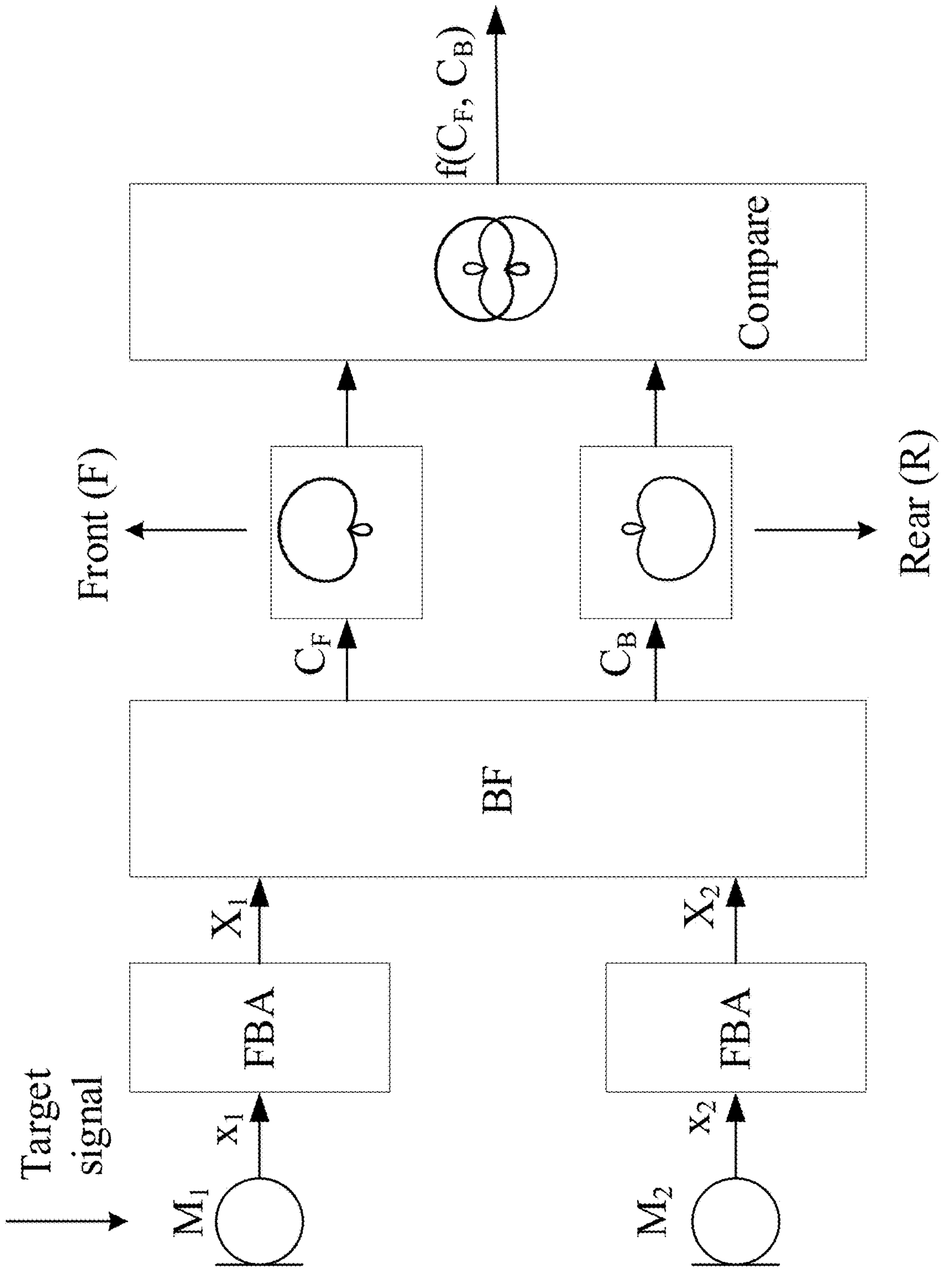
FIG. 3 shows a second embodiment of an input stage of a hearing device according to the present disclosure.

FIG. 2 shows a first embodiment of an input stage of a hearing device according to the present disclosure. FIG. 2 illustrates a system where the magnitude response of a beamformer has a cardioid pattern $C_F$ pointing towards the front (with a null towards the back) and the magnitude response of another beamformer has a cardioid pattern $C_B$ pointing towards the back (with a null towards the front).

The input stage of the hearing device of FIG. 2 comprises a microphone system comprising two microphones ($M_1$, $M_2$) adapted for picking up sound from an environment of the user and to provide corresponding electric input signals $x_m(n)$, m=1, 2, n representing time. As in FIG. 1B, each of the microphone paths comprises an analysis filter bank (FBA) for converting a time-domain input signal ($x_m$, i=1, 2) representing sound in the environment to a corresponding frequency sub-band signal ($X_m$, m=1, 2) in the time-frequency domain (k,l). The input stage of the hearing device further comprises a beamformer unit (BF) connected to the microphone system. The beamformer unit (BF) is configured to provide two beam patterns, 1) a front directed beamformer ($C_F$) pointing towards the front of the user (e.g. the user's look direction) and 2) a backwards directed beamformer ($C_B$) pointing towards the rear of the user (e.g. opposite the look direction of the user). The front directed beamformer may e.g. be implemented as a delay and sum beamformer (or equivalent). The backwards directed beamformer may e.g. be implemented as a delay and subtract beamformer (or equivalent). The front pointing beamformer may be calibrated (update weights) based on a signal from the back (e.g. from a back-cancelling beamformer). Likewise, the back-pointing beamformer may be calibrated based on a signal from the front (e.g. from a front-cancelling beamformer).

Based on a comparison (e.g. on a time-frequency unit level) between a) the magnitude response of a beamformer pointing towards the front ($C_F$, with a null (or a maximum attenuation) pointing towards the back) and b) the magnitude response of a beamformer pointing towards the back ((rear) $C_B$, with a null (or a maximum attenuation) pointing towards the front direction) it can be determined (cf. computation block 'Compare' in FIG. 2) if the impinging sound (e.g. in a given time-frequency (TF) unit) is arriving from the front or from the back, which is indicated in the resulting signal $f(C_F, C_B)$. In its simplest form, the signal $f(C_F, C_B)$ may be binary, e.g. 1 and 0 (or T (Target), N (Noise)), when a difference between $C_F$ and $C_B$ of a given TF-unit is positive and negative, respectively. The computation block 'Compare' in FIG. 2 thus implements a 'front-back-detector' and provides an output signal ($f(C_F, C_B)$) indicative of the origin (or dominant origin) of a given signal component (k,l) in the time-frequency domain.

Figure 4A:
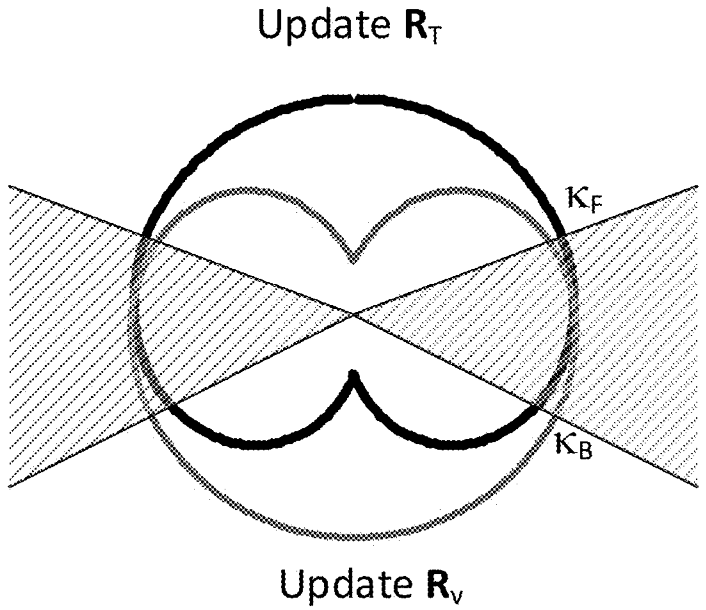
FIG. 4A shows the two thresholds $\kappa_F$ and $\kappa_B$ determining the areas in time and frequency, where either the target covariance matrix $R_s$ or the noise covariance matrix $R_v$ is updated.

For each unit in time and in frequency (t,f) (or l,k) we thus update the target covariance matrix $R_T$, and the noise covariance matrix $R_V$, based on the following criteria $$\text{If: } \log|C_F(t,f)| - \log|C_B(t,f)| > \kappa_F\text{: Update } R_T$$

$$\text{If: } \log|C_F(t,f)| - \log|C_B(t,f)| < \kappa_B\text{: Update } R_V,$$

where $\kappa_F$ and $\kappa_B$ are thresholds as illustrated in FIG. 4A.

The target ($R_T$) and noise ($R_V$) covariance matrices may be updated recursively as $$R_T(n) = \begin{cases} \lambda_T R_T(n) + (1-\lambda_T)R_T(n-1), \text{ if: } \log|C_F(t,f)| - \log|C_B(t,f)| > \kappa_F \\ R_T(n-1); \text{ otherwise} \end{cases}.$$

$$R_V(n) = \begin{cases} \lambda_V R_V(n) + (1-\lambda_V)R_V(n-1), \text{ if: } \log|C_F(t,f)| - \log|C_B(t,f)| < \kappa_B \\ R_V(n-1); \text{ otherwise} \end{cases}.$$

respectively, where n is the time frame index, and $\lambda_T$, $\lambda_V$ are coefficients in the interval [0:1]. $\lambda_T$, $\lambda_V$ are coefficients controlling the exponential decay of the update. Often the coefficient $\lambda \in [0; 1[$ is expressed in terms of a time constant given by $$\tau = \frac{-1}{\ln(1-\lambda)F_s},$$

where $F_s$ is the sample rate of the covariance matrix update.

FIG. 3 shows a second embodiment of an input stage of a hearing device according to the present disclosure. The embodiment of FIG. 3 is identical to the embodiment of FIG. 2 apart from the two beam patterns ($C_F$, $C_B$) provided by the beamformer unit (BF). In the embodiment of FIG. 3, the beamformer unit (BF) provides super-cardioids pointing towards the front and the back, respectively, of the user. Consequently, the front-back detector (Compare) is based on the comparison between a super-cardioid beamformer maximizing the front-back ratio and a super-cardioid enhancing the back-front ratio.

The advantage of using cardioid directivity patterns for comparison (as illustrated in FIG. 2) is that the difference between the cardioid patterns is a monotonic function as function of direction. However, it may also be advantageous instead to comparing two super-cardioid beampatterns as illustrated in FIG. 3, as those beampatterns on average have the best separation between the front and the back halfplane. The fixed beampatterns may as well be chosen based on any desired angles of interest, i.e. a fixed beampattern that optimizes $$SNR = \frac{w^H \sum_{\theta \in target} g_\theta d_\theta d_\theta^H w}{w^H \sum_{\theta \in noise} g_\theta d_\theta d_\theta^H w},$$

where $g_\theta$ is a possible weight of the signal impinging from the direction $\theta$, and $d_\theta$ is a relative transfer function from the direction $\theta$ known in advance. The terms 'relative transfer function' or 'steering vector' are used interchangeably, and denoted de). A special case of the above equation is the super cardioid maximizing the front-back ratio, where the target directions are given by all directions from the frontal half-plane in a diffuse noise field, and the noise directions are given by all the directions from the rear half-plane in a diffuse noise field.

The text-book definition of the front-back ratio is given by the ratio between all signals impinging from the frontal compared to the signals impinging from the back half-plane. Implicitly, the FBR assumes that signals in the frontal halfplane are of interest (target) and signals from the back are of less interest (noise). The FBR is e.g defined in [Simmer et al.; 2001].

The above examples are shown in the case of two microphones, but it also holds for more than two microphones.

FIG. 4A shows the two thresholds $\kappa_F$ and $\kappa_B$ determining the areas in time and frequency, where either the target covariance matrix $R_T$ is updated ($\log|C_F(t,f)| - \log|C_B(t,f)| > \kappa_F$) or the noise covariance matrix $R_V$ is updated ($\log|C_F(t,f)| - \log|C_B(t,f)| < \kappa_B$). In the shaded region none of the covariance matrices are updated. FIG. 4A shows the polar plots of the comparison between the two directivity patterns for a front-facing beamformer and a back-facing cardioid beamformer. As the two beampatterns have sensitivity in opposite directions, the front-back decision can be based on a comparison between the magnitude of the front-facing beamformer and the back-facing beamformer. The shown beampatterns are first order cardioids (based on two microphones), but the two beamformers may as well be based on more microphones. As the difference between the two beamformers is small around +/−90 degrees, we may choose not to update any of the covariance matrices if the signal is impinging from directions within the shaded region.

Figure 4C:
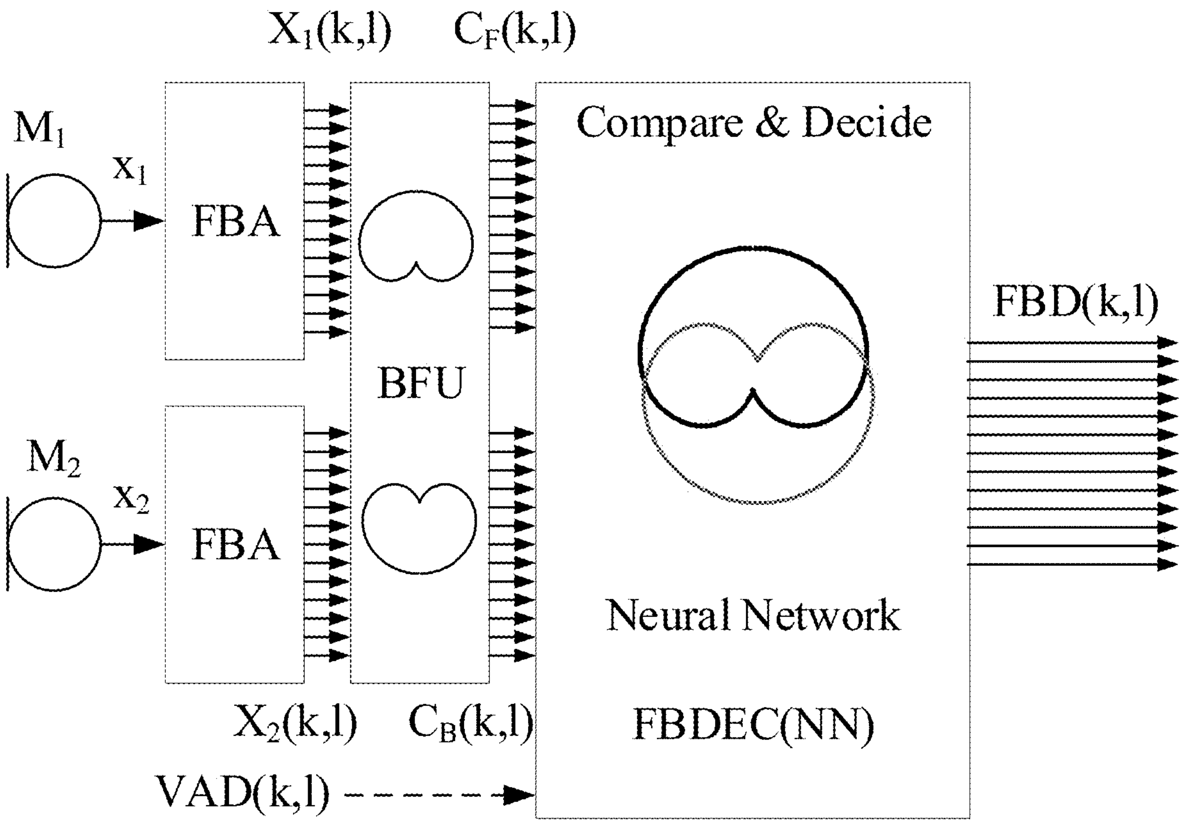
FIG. 4C schematically shows an implementation of an input stage of a hearing aid according to the present disclosure comprising an FBR optimizing beamformer as input to a neural network including the comparison function based on the FBR optimizing beamformer to provide a decision on labelling of target or noise.
Figure 4B:
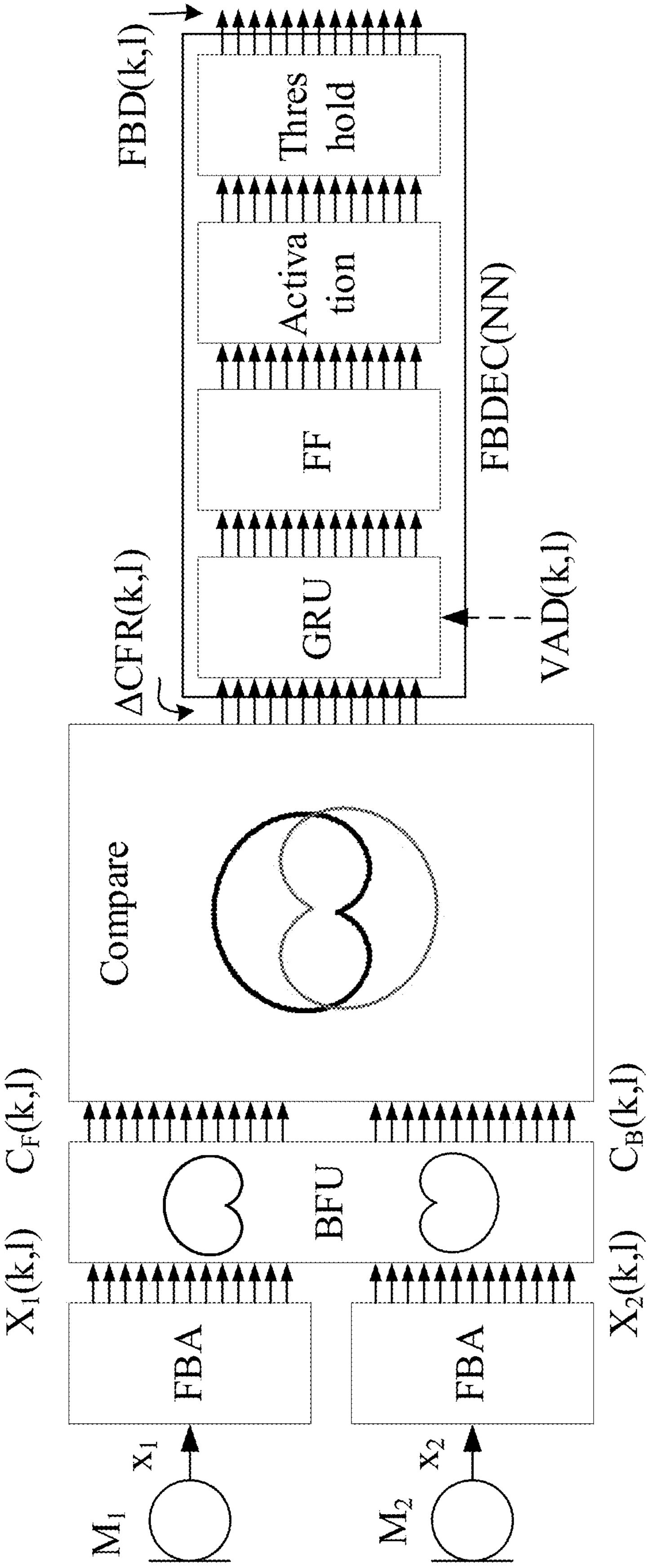
FIG. 4B schematically shows an implementation of an input stage of a hearing aid according to the present disclosure comprising an FBR optimizing beamformer and subsequent comparison of the content of the front and back beamformers used as input to a neural network to provide a decision on labelling target or noise.

FIGS. 4B and 4C schematically shows slightly different implementations of an input stage of a hearing aid according to the present disclosure comprising a Front-Back-Ratio-(FBR-) optimizing beamformer (BFU) as illustrated in FIG. 2 and FIG. 3. The front back comparison (based on a comparison of the respective outputs of the front and back beamformers (BFU)) may be used as input to a neural network (NN), e.g. a deep neural network (DNN), as shown in FIG. 4B (cf. input block 'Compare' and signal ΔCFR(k,l) in FIG. 4B), or the front back comparison may be included in the neural network (NN) as shown in FIG. 4C (cf. NN-block 'Compare and Decide' and input signals $C_F$(k,l), $C_B$(k,l) to the FBDEC(NN)-block in FIG. 4C). The input stage of the embodiments of FIG. 4B, 4C comprises two microphones ($M_1$, $M_2$) for picking up sound from the environment of the hearing aid. The microphones ($M_1$, $M_2$) provide respective (e.g. digitized) electric input signals ($x_1$, $x_2$) in the time-domain. The electric input signals ($x_1$, $X_2$) in the time-domain are converted to the time-frequency domain (cf. signals $X_1$(k,l), $X_2$(k,l), where k and/are frequency and time indices, respectively) by respective analysis filter banks (FBA). The time-frequency domain electric input signals ($X_1$(k,l), $X_2$(k,l) are fed to the Front-Back-Ratio-(FBR-) optimizing beamformer (BFU). The FBR-beamformer (BFU) provides a) a (cardioid) beamformer pointing towards the front ($C_F$, with a null (or a maximum attenuation) pointing towards the back) and b) a (cardioid) beamformer pointing towards the back ((rear) $C_B$, with a null (or a maximum attenuation) pointing towards the front direction). Alternatively, the super-cardioids of FIG. 3 or equivalent directional patterns e.g. pointing in opposite directions may be used (provided that the respective beampatterns are substantially mirror-symmetric about an axis separating 'front' from 'back'). The compare block ('Compare') in FIG. 4B is configured to compare the front and rear facing beamformers and to provide as an output a comparison signal indicative of their difference in a time-frequency representation (cf. ΔCFR(k,l)). The front-back difference measure (ΔCFR(k,l)) is input to the front-back decision block (FBDEC(NN)) that is implemented as (or comprises) a neural network (NN).

Further inputs to the neural network may be a voice activity control signal (VAD(k,l)) as shown in FIGS. 4B and 4C. The voice activity control signal may e.g. be based on one or more of the electric input signals ($X_1$, $X_2$).

In the embodiment of FIG. 4B, the neural network (NN) is exemplified by at least one layer comprising a Gated recurrent unit (GRU) followed by one or more feed forward layers (FF). At the output layer an activation function ('Activation'), e.g. a sigmoid, is applied followed by a threshold (Threshold) (indicating the 'decision' (cf. output signal FBD(k,l)): 'front' or 'back' (or 'none')). In-between the layers of the neural network (NN), non-linear activation functions (e.g. Rectified Linear units (ReLU), sigmoid, tan h, etc.) may be applied.

FIG. 4C schematically shows a further implementation of an input stage of a hearing aid according to the present disclosure comprising a Front-Back-Ratio-(FBR-) optimizing beamformer (BFU) as illustrated in FIG. 2 (or FIG. 3). FIG. 4C is similar to FIG. 4B but includes the 'Compare' function of FIG. 4B (and FIG. 2 or FIG. 3) in the neural network (NN). Thereby the comparison of the front and rear facing beamformers provided by the FBR-beamformer (BFU) is included in the neutral network computations (so that the decision is not 'biased' by a preceding comparison). The neural network may thus be trained using data where the front and back facing beamformers (or the corresponding input signals) are known for a multitude of input signals (from different directions) and having different signal to noise ratios, etc., associated with known front, back (or none) decisions (FBD( )), and optionally (if a voice activity input signal is used as a further input to the neural network) also associated with known values of the VAD-input (VAD (k,l)).

The embodiments of FIGS. 4A, 4B and 4C may be configured to focus on detecting the users own voice (instead of sound in front (or front half-plane) of the user.

The advantage of applying a neural network is that joint decisions can be made taking into account information across frequency channels.

Whereas the MVDR beamformer is the optimal solution for enhancing a single target direction in a noise field, the GEV beamformer can regard multiple directions as target directions simultaneously. This is illustrated in FIG. 5.

Figure 5:
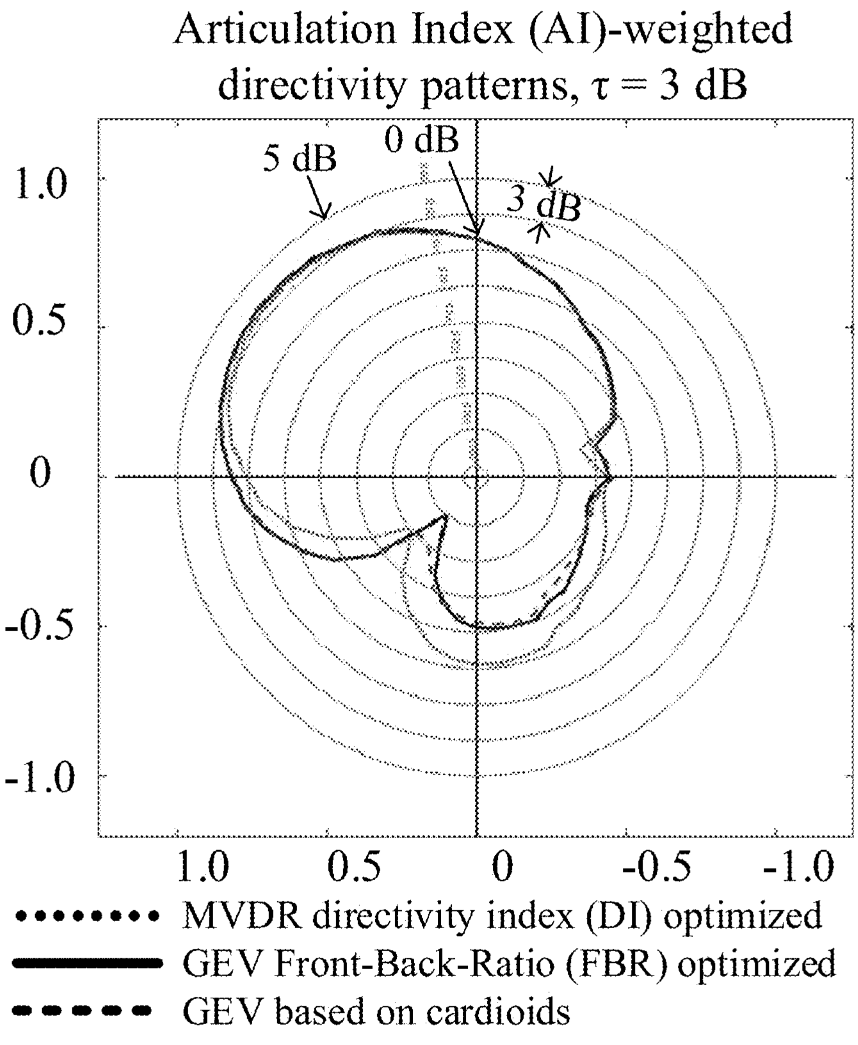
FIG. 5 shows optimization of the beamformer based on different criteria, FIG. 6 schematically illustrates how the most likely target direction (or target steering vector) may be selected among a dictionary of different candidates.

FIG. 5 shows optimization of the beamformer based on different criteria. FIG. 5 shows different directivity patterns (0 to) 360° in a cylindrically diffuse noise field in the case, where two microphones are located in a hearing aid located behind the ear. Each circle represents a 3 dB change to its nearest neighboring circle. The directivity pattern is obtained by an articulation index (AI) weighted averaging of directivity patterns across frequency bands. The articulation index (e.g. taking on values between 0 and 1) is an estimate of the fraction of speech that is audible to a hearing impaired user with a specific (frequency dependent) hearing loss As we estimate the beamformer weights separately for each frequency band, we maximize the FBR separately in each frequency band. Rather than showing a directivity plot for each frequency channel, FIG. 5 shows a frequency-weighted average directivity pattern (here exemplified by the weighting of the articulation index). The dotted directivity pattern shows the MVDR beamformer solution, where the target direction is assumed to be directly in front of the listener (0°, in the top of the plot). This directivity pattern is optimal for attenuating diffuse noise, and we thus obtain the optimal directivity index. However, if we instead optimize the front-back ratio, the MVDR beamformer is not optimal. The solid line shows the GEV directivity pattern with true target and noise covariance matrices ($R_T$ and $R_V$). In this case the DI is lower than the DI of the MVDR beamformer, but the FBR is higher. The dashed line shows the FBR optimizing beamformer based on estimated target and noise covariance matrices (based on cardioids), where $R_T$ is based on time frames where $\log|C_F(t,f)|-\log|C_B(t,f)|>3$ dB and $R_V$ is based on time frames where $\log|C_F(t,f)|-\log|C_B(t,f)|<3$ dB, cf. FIG. 4A. The FBR optimized GEV beamformer (solid curve) has a higher DI since the solid curve covers more area in the frontal half plane and less area in the rear halfplane compared to the dashed curve (MVDR beamformer).

The direction-based decision may be combined with a voice-based criterion, e.g. one or more of a) $R_T$ is only updated when the sound is from the front and voice is present, b) $R_v$ may only be updated in the absence of noise, c) $R_v$ may only be updated in absence of noise and/or when the sound is from the rear halfplane.

The directivity index(DI) is given by the ratio between the response (R) of the target direction $\theta_0$ and the response of all other directions:

$$DI(k) = \log_{10}\frac{|R(\theta_0, k)|^2}{\int |R(\theta, k)|^2 d\theta}$$

The front-back ratio (FBR) is defined as the ratio between the responses (R) of the front half plane and the responses of the back half plane:

$$FBR(k) = \log_{10}\frac{\int_{front} |R(\theta, k)|^2 d\theta}{\int_{back} |R(\theta, k)|^2 d\theta}$$

Target Covariance Matrix Based on Likely Target Directions.

Figure 6:
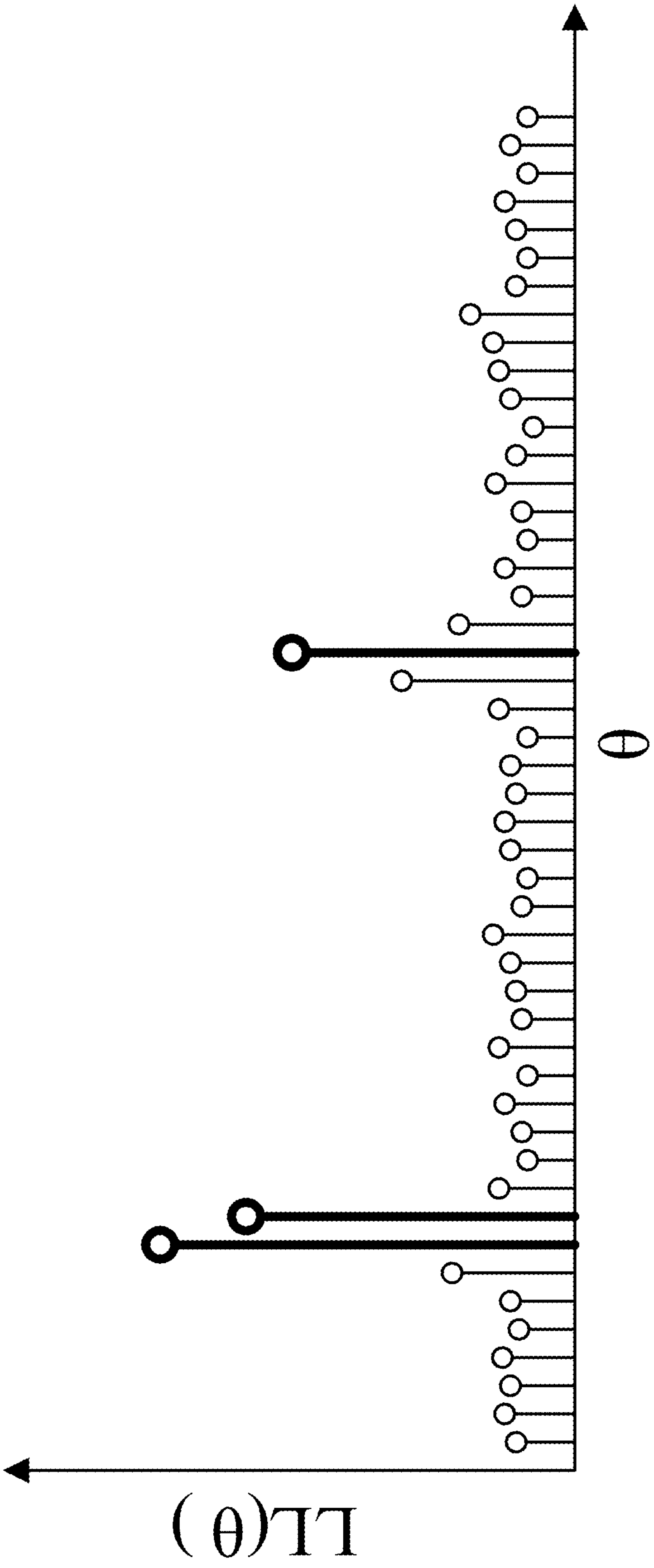

FIG. 6 shows how the most likely target direction (or target steering vector) may be selected among a dictionary of different candidates. Different methods exist for estimating the most likely target direction, e.g. for an MVDR beamformer. Instead of selecting a single target steering vector to be used in an MVDR beamformer, we may (as illustrated in FIG. 6) find a likelihood estimate for each of the multitude of target directions θ (cf. e.g. the θ-values of the N largest LL(θ) values highlighted in bold in FIG. 6, here N=3) in a dictionary of target steering vectors (relative acoustic transfer functions) for relevant positions of a sound source relative to the user. Based on the likelihood estimates, we may create a target covariance matrix from a weighted sum of the possible target steering vectors, i.e.

$$R_T = \sum_{\theta=\theta_0}^{\theta=\Theta} p_\theta d_\theta d_\theta^H,$$

where $p_\theta$ is a weight based on the estimated probability (or likelihood) of the given direction θ, where $p_\theta$ may be estimated as e.g. disclosed in EP3413589A1, or e.g. estimated by a trained neural network. The noise covariance matrix ($R_T$) is estimated during speech absence (as e.g. indicated by a voice activity detector).

Figure 7:
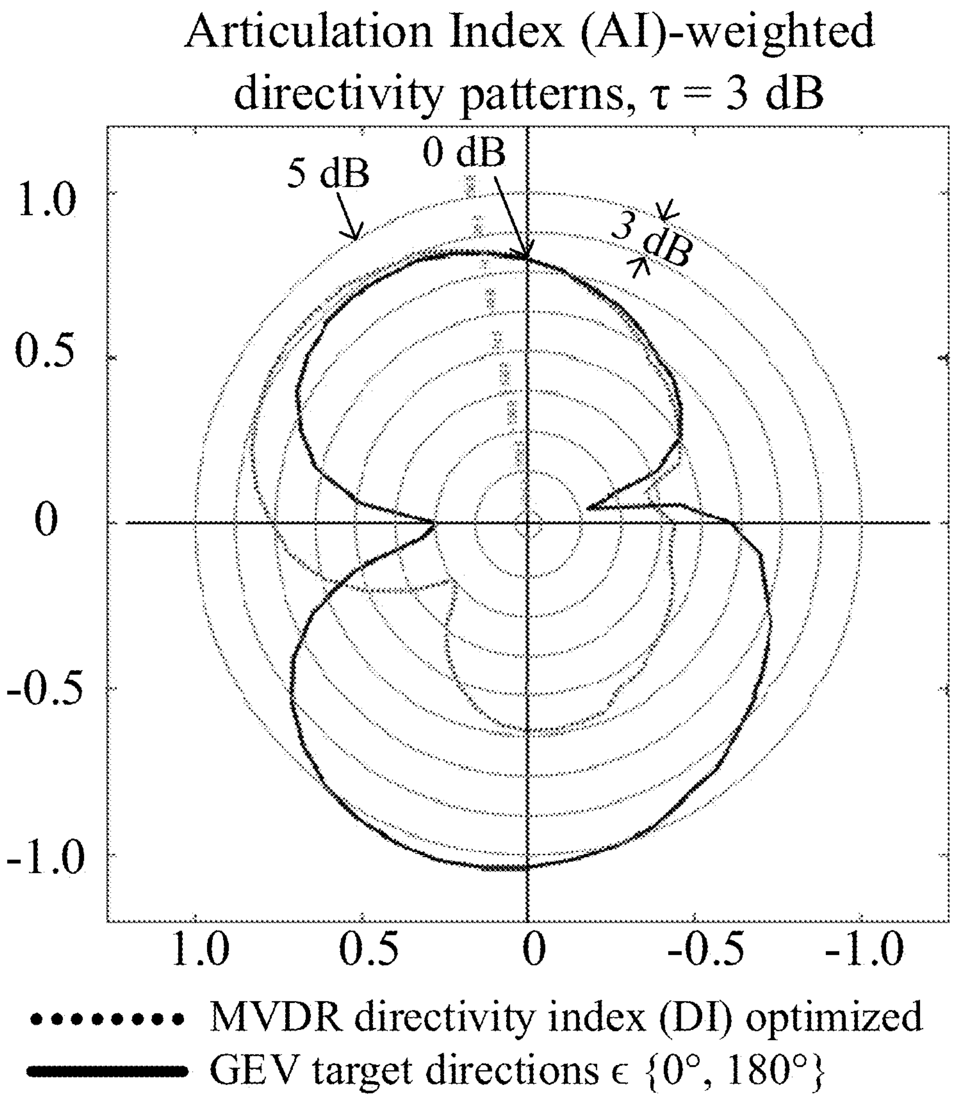
FIG. 7 shows optimization of the beamformer based on different criteria.

FIG. 7 shows different directivity patterns (0 to 360°) resulting from an optimization of the beamformer based on different criteria. The dotted line shows the directivity pattern of the well-known MVDR beamformer, in which the noise covariance matrix $R_V$ is estimated from a cylindrically diffuse noise field based on two hearing aid microphones located behind the left ear. The resulting beamformer is expected to maximize the directivity index (DI). The solid line shows the directivity pattern of a GEV beamformer optimizing for target directions estimated to be both from 0 degrees and 180 degrees. The target covariance matrix $R_T$ is thus a full rank matrix obtained by summing the outer product of the steering vector from 0 degrees and the outer product of the steering vector from 180 degrees. The noise covariance matrix $R_V$ is estimated from a cylindrically diffuse noise field. We notice that the directivity pattern has a dipole shape maintaining energy from both target direction. However, with only two microphones, we can only guarantee a distortionless response (0 dB) from a single direction, in this case the front direction.

FIG. 7 illustrates the benefit of generating a target covariance matrix based on the most likely steering vectors, i.e.

$$R_T = \sum_{\theta=\theta_0}^{\theta=\Theta} p_\theta d_\theta d_\theta^H,$$

In this particular case, we assume that target directions from both 0 degrees and 180 degrees are likely, and we thus obtain a full rank target covariance matrix as $R_s = d_0 d_0^H + d_{180} d_{180}^H$. As we see from FIG. 7, the resulting directivity pattern becomes a dipole (solid line) rather than the hypercardioid directivity pattern obtained in case where $R_T = d_0 d_0^H$ (dotted line). Looking at the solid line, see that the 180° direction (mid-bottom) is gained by approximately 10 dB compared to the dotted line. In the plot of FIG. 7, the beamformer weights are normalized such that a distortionless response (0 dB) from the target direction (0°, mid-top) is maintained, i.e. $w^H d_0 d_0^H w = 1$. Alternatively, we may normalize the weights such that $w^H R_T w = q$, where q is a scaler (scaling parameter), e.g. q=1.

Example 4

In the following, the connection between the minimum variance distortionless response (MVDR) beamformer weights and the generalized sidelobe canceller (GSC) weights is established. It is shown that the GSC structure with a single adaptive parameter can be used even though the target look vector (steering vector) is dynamically updated.

Given an acoustic transfer function h (k) (within the k'th frequency channel, we can calculate the normalized look vector $$d(k) = \frac{h(k)}{\sqrt{h^H(k)h(k)}}$$

such that $|d|^2=1$.

The MVDR beamformer is designed such that noise is suppressed maximally under the constraint that the signal from the target direction is passed through distortionless.

It can be shown (see e.g. [Bitzer & Simmer; 2001], [Souden et al.; 2010]) that the filter coefficients of the MVDR beamformer can be expressed by:

$$w_{MVDR}(k) = \frac{R_V^{-1}(k)d(k)d^*(k, i_{ref})}{d^H(k)R_V^{-1}(k)d(k)},$$

where $R_V(k)$ is the inter-microphone noise covariance matrix, and the vector d(k) is the look vector corresponding to the acoustic transfer function to the target, normalized with respect to the reference microphone.

The equation above is the same as $$w_{MVDR}(k) = \frac{R_V^{-1}(k)\bar{d}(k)}{\bar{d}^H(k)R_V^{-1}(k)\bar{d}(k)},$$

where $\bar{d}(k)$ has been normalized with respect to its reference microphone, i.e.

$$\bar{d}(k) = \frac{d(k)}{d(k, i_{ref})}$$

as $$w_{MVDR}(k) = \frac{R_V^{-1}(k)\bar{d}(k)}{\bar{d}^H(k)R_V^{-1}(k)\bar{d}(k)} = \frac{R_V^{-1}(k)\frac{d(k)}{d(k, i_{ref})}}{\frac{\bar{d}^H(k)}{\bar{d}^*(k, i_{ref})}R_V^{-1}(k)\frac{d(k)}{d(k, i_{ref})}} = \frac{R_V^{-1}(k)d(k)d^*(k, i_{ref})}{d^H(k)R_V^{-1}(k)d(k)}.$$

The above equations are valid for any number of microphones M>1. For the special case of (M=) 2 microphones, it can be shown that the MVDR filter output $Y_F$ may be expressed in terms of the fixed beamformer outputs $C_0$ and $C_1$, as $$Y_F(k) = C_0(k) - \beta(k)C_1(k),$$

where the complex scalar β is given by $$\beta = \frac{E[C_1^*(k)C_0(k)]_{VAD(k)=0}}{E\left[|C_1(k)|^2\right]_{VAD(k)=0} + c(k)},$$

where $C_0(k)=w_0^H(k)\ x(k)$ and $C_1(k)=w_1^H(k)x(k)$, where $$C_0(k) = \frac{d(k)d^*(k,1)}{\|d(k)\|^2} \text{ and } C_1(k) = \begin{bmatrix}1\\0\end{bmatrix} - \frac{d(k)d^*(k,1)}{\|d(k)\|^2},$$

noting that $w_0^H w_1=0$. Notice that this is only one example of how the beamformer weights may be selected. $C_1(k)$ just have to fulfill that the signal from a desired target direction is cancelled, and $C_0(k)$ is selected in order to have a given response in the desired target direction, e.g. a unit response. This is actually a special case of the generalized sidelobe canceller, where we have $$w_{GSC}(k) = a - B\beta,$$

Where a typically is an M×1 delay-sum beamformer vector not altering the target signal direction, and B is a blocking matrix of size M×(M−1), and β is an (M−1)×1 adaptive filtering matrix with the adaptive coefficients, which for the MVDR solution is given by [Bitzer & Simmer; 2001]

$$\beta = \left(B^H R_V B\right)^{-1} B^H C_V a,$$

where a and B are orthogonal to each other, i.e. $a^H B=0_{1\times(M-1)}$, and β is updated when speech is not present. The beamformer weights are thus calculated as $$w_{GSC}(k) = a - B\left(B^H R_V B\right)^{-1} B^H C_V a.$$

Notice that we in the following are using a slightly different notation, where the adaptive coefficient is conjugated compared to the definition of β from [Bitzer & Simmer; 2001].

In the special case of two microphones, we have $$w_{GSC}(k) = w_0(k) - w_1(k)\beta^*(k),$$

where (omitting the frequency index k)

$$\begin{aligned}\beta &= \left(w_1^H R_V w_1\right)^{-1}\left(w_1^H R_V w_0\right)^* \\ &= \frac{w_0^H R_V w_1}{w_1^H R_v w_1}\end{aligned}$$

-continued $$\begin{aligned}&= \frac{w_0^H E\left[xx^H\right]_{VAD=0} w_1}{w_1^H E\left[xx^H\right]_{VAD=0} w_1} \\ &= \frac{E\left[w_0^H xx^H w_1\right]_{VAD=0}}{E\left[w_1^H xx^H w_1\right]_{VAD=0}} \\ &= \frac{E[C_0 C_0^*]_{VAD=0}}{E[C_1 C_1^*]_{VAD=0}}.\end{aligned}$$

We notice that we may find β either directly from the signals $C_0$ and $C_1$ or we may find B from the noise covariance matrix $R_V$, i.e.

$$\beta = \frac{w_0^H R_V w_1}{w_1^H R_V w_1}$$

according to the particular design. If, for example, the signals $C_0$ and $C_1$ are used other places in the device in in question, it might be advantageous to derive β directly from these signals $$\beta = \frac{E[C_0 C_1^*]_{VAD=0}}{E[C_1 C_1^*]_{VAD=0}},$$

but, on the other hand, if it is necessary to change the look direction (steering vector d) (and hereby the weights $w_0$ and $w_1$), it is a disadvantage that the weights are included inside the expectation operator. In that case, it is an advantage to derive β directly from the noise covariance matrix.

The parameter β may be estimated adaptively. In that case, the least-square error is estimated. Given the output Y of the MVDR (GSC) beamformer $$Y(k) = C_0(k) - \beta(k)C_1(k),$$

the least-square error (err, omitting the frequency band index k) can be written as $$err = YY^* = |Y|^2.$$

In terms of $C_0$, $C_1$ and β, we can re-write $|Y|^2$ as $$\begin{aligned}|Y|^2 &= (C_0 - \beta C_1)(C_0 - \beta C_1)^* \\ &= |C_0|^2 + |\beta|^2|C_1|^2 - C_0\beta^* C_1^* - C_0^*\beta C_1 \\ &= |C_0|^2 + (\Re\beta^2 + \mathcal{J}\beta^2)|C_1|^2 - \Re\beta(C_0C_1^* + C_0^*C_1) + j\mathcal{J}\beta(C_0C_1^* + C_0^*C_1).\end{aligned}$$

Recalling that a complex derivative is given by $$\frac{\partial Z}{\partial\beta} = \frac{\partial Z}{\partial\Re\beta} + j\frac{\partial Z}{\partial\mathcal{J}\beta}.$$

where $\Re x$ and $\Im x$ indicate the real and imaginary part, respectively, of a complex parameter x (in this case the (complex) parameter β). We thus find $$\frac{\partial |Y|^2}{\partial \Re\beta} = 2\Re\beta|C_1|^2 - (C_0C_1^* + C_0^*C_1)$$

$$\frac{\partial |Y|^2}{\partial \mathcal{J}\beta} = 2\mathcal{J}\beta|C_1|^2 + j(C_0C_1^* + C_0^*C_1)$$

$$\frac{\partial |Y|^2}{\partial \beta} = 2\beta|C_1|^2 - 2C_0C_1^* = -2C_1^*(C_0 - \beta C_1) = -2C_1^*Y.$$

where 'j' is the complex unit having the property $j^2=-1$. In order to minimize $|Y|^2$, we thus update β in the negative gradient direction, i.e.

$$\beta(n) = \beta(n-1) + \mu C_1^* Y$$

where n is a time index. Rather than using the LMS algorithm, we may obtain faster update using the, the normalized LMS (NLMS) algorithm given by $$\beta(n) = \beta(n-1) + \mu\frac{C_1^* Y}{|C_1|^2}.$$

Other normalization schemes may also be applied. E.g. we may normalize the gradient by the output:

$$\beta(n) = \beta(n-1) + \mu\frac{C_1^* Y}{|Y|^2}.$$

Also, as we apply many small steps, the accuracy of the division is not required to be as high as the accuracy when estimating β in a single step $$\beta = \frac{w_0^H R_V w_1}{w_1^H R_V w_1},$$

we may thus normalize using an approximation of the denominator (e.g. rounding $|C_1|^2$ to nearest $2^N$, where N is an integer.) Hereby the division can be implemented by a shift operator. In order to avoid dividing by zero a small value may be added to $d_0$ denominator. In an embodiment the multiplied beamformers are averaged across time frames.

Figure 8A:
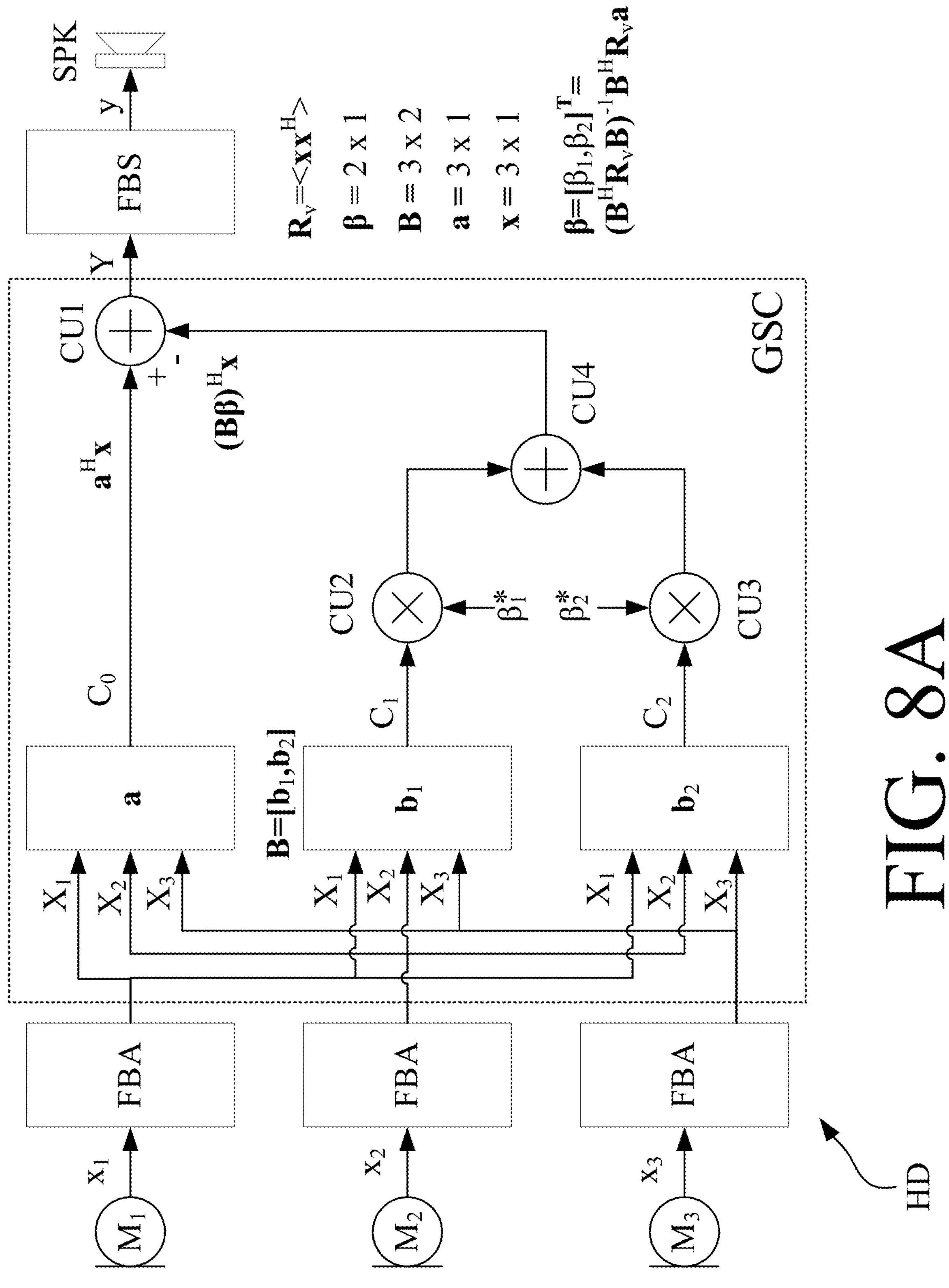
FIG. 8A shows a schematic view of an implementation of a directional noise reduction system according to the present disclosure comprising a three-microphone generalized sidelobe canceller structure.
Figure 8B:
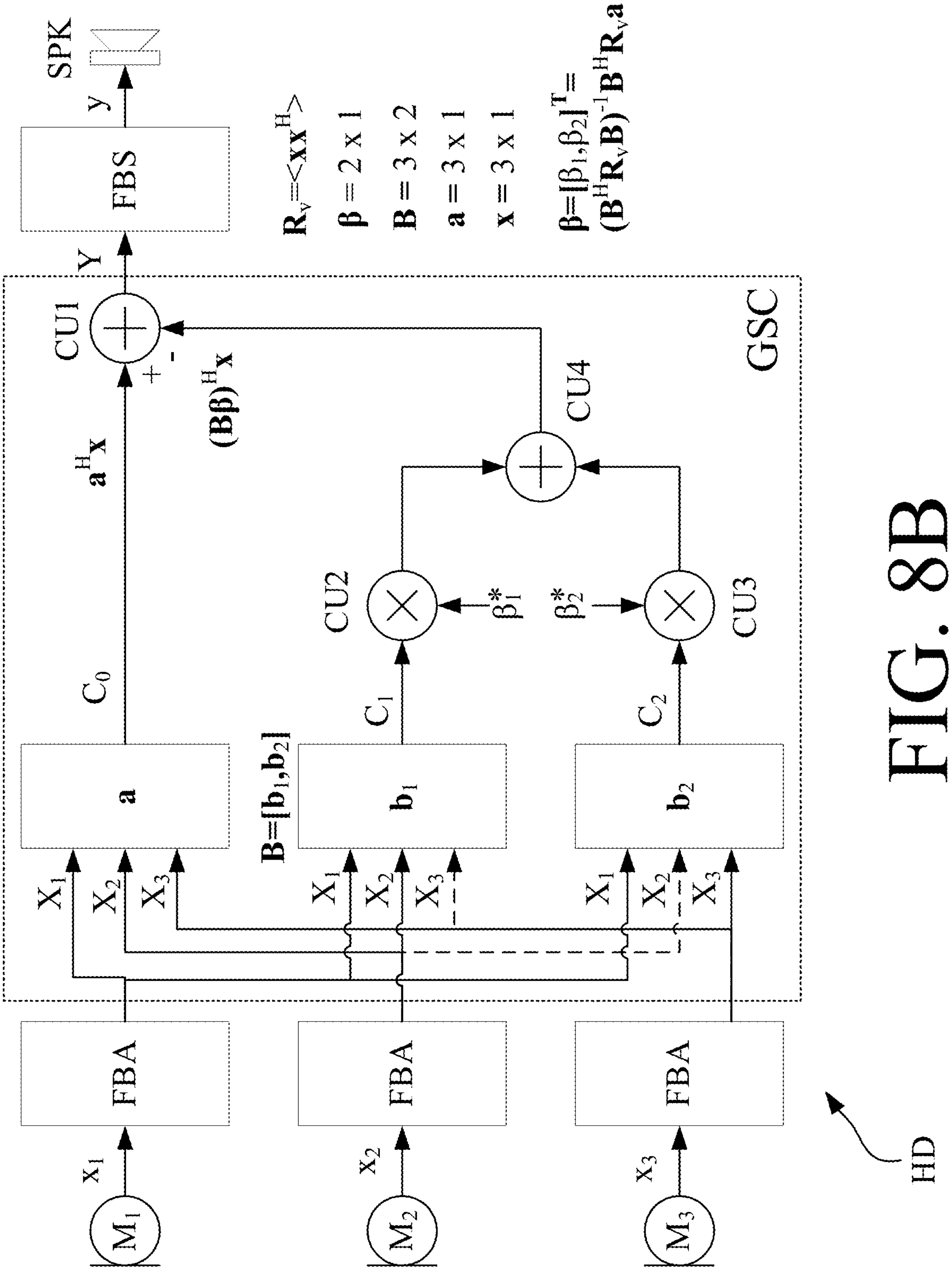
FIG. 8B shows a schematic view of an implementation of a directional noise reduction system as in FIG. 8A, but wherein rather than creating two independent target cancelling beamformers based on all three microphones, two independent first order target cancelling beamformers may be created.

FIGS. 8A and 8B each show a schematic view of an implementation of a directional noise reduction system according to the present disclosure comprising a three-microphone generalized sidelobe canceller structure. FIGS. 8A and 8B illustrate respective embodiments of a hearing device (HD) comprising three microphones ($M_1$, $M_2$, $M_3$), each providing respective electric (time-domain) input signals ($x_1$, $x_2$, $x_3$) representing sound in the environment of the hearing device (HD). Each of the electric microphone paths comprises an analysis filter bank (FBA) for converting a time-domain input signal ($x_i$, i=1, 2, 3) to a time-frequency representation ($X_i$, i=1, 2, 3), e.g. represented by respective time and frequency indices (n, k), each being associated with a (generally complex) value of the signal in question at a given time (n) and frequency (k). The hearing device further comprises a directional noise reduction system comprising a three input MVDR beamformer implemented as a GSC-structure (GSC). The output (Y) of the directional noise reduction system (here of the MVDR/GSC-beamformer) is fed to a synthesis filter bank (FBS) for converting the time-frequency representation of the signal (Y) to an output signal (y) in the time domain. The time-domain output signal is fed to an output transducer of the hearing device (HD), here a loudspeaker (SPK), for providing the output signal (v) as stimuli perceivable for the user of the hearing device as sound (here provided as vibrations in air directed towards an eardrum of the user). Further processing of the input signals representing sound, or of the output signal of the noise reduction system, may be provided, e.g. by a processor for applying one or more processing algorithms to respective signals of the signal path(s), e.g. a compressive amplification algorithm for adapting levels of the input signals to a user's hearing capability, e.g. for compensating for a hearing impairment of the user. The hearing device (HD) may e.g. implement a hearing aid or a headset (or a combination thereof).

The illustrated GSC-implementation of the MVDR beamformer (GSC, cf. dashed outline enclosing the beamformers a, $b_1$, $b_2$ and combination units $CU_1$, $CU_2$, $CU_3$, $CU_4$) comprises a blocking matrix B, wherein each row of B corresponds to the weights of two independent target cancelling beamformers, i.e.

$$B = [b_1, b_2], \text{ where } b_1 = \begin{bmatrix} b_{11} \\ b_{21} \\ b_{31} \end{bmatrix} \text{ and } b_2 = \begin{bmatrix} b_{12} \\ b_{22} \\ b_{32} \end{bmatrix}$$

The two target-cancelling beamformers can be written as $$C = B^H x = \begin{bmatrix} b_1^H x \\ b_2^H x \end{bmatrix} = \begin{bmatrix} C_1 \\ c_2 \end{bmatrix} \text{ Where } x = \begin{bmatrix} x_1 \\ x_2 \\ x_3 \end{bmatrix}$$

is the noisy input signals from the three microphones ($M_1$, $M_2$, $M_3$, respectively, in FIG. 8A, 8B), either represented by the time-domain signals ($x_i$, i=1, 2, 3) or by the time-frequency signals ($X_i$, i=1, 2, 3) in FIG. 8A, 8B. The dimension of the various elements (weights (a, $b_1$, $b_2$) and adaptive update coefficients (B)) defining the beamformer are indicated in FIGS. 8A and 8B for the M=3 case: The input signals x are represented by a 3×1 vector. The target-preserving beamformer is represented by weights a of a 3×1 vector. The two target-cancelling beamformers ($b_1$, $b_2$) are represented by blocking matrix B of dimension 3×2. The adaptive update coefficients (B) are represented by a 2×1 vector. Notice, that this can be generalized to M microphones (where M≥3).

Similarly, we can write the noisy distortionless target signal as $$C_0 = a^H x, \text{ where } a = \begin{bmatrix} a_1 \\ a_2 \\ a_3 \end{bmatrix}.$$

Now we consider the adaptive update coefficient $\beta=[\beta_1, \beta_2]^T=(B^H R_V B)^{-1} B^H R_V a$, where superscript T denotes transposition. We notice that the coefficient depends on the noise covariance matrix given by $$R_V = \langle xx^H \rangle,$$

where $\langle\bullet\rangle$ denote the (time-) average operator (i.e. average in absence of target, 'VAD=0'). Similar to the two-microphone case, we can avoid estimating the covariance matrix. We re-write $\beta$ as $$\beta = (B^H\langle xx^H\rangle B)^{-1}B^H\langle xx^H\rangle a = \left(\left\langle\begin{bmatrix} b_1^H x \\ b_2^H x\end{bmatrix}x^H[b_1, b_2]\right\rangle\right)^{-1}\left\langle\begin{bmatrix} b_1^H x \\ b_2^H x\end{bmatrix}x^H a\right\rangle = \left(\left\langle\begin{bmatrix} C_1 \\ C_2\end{bmatrix}\begin{bmatrix} C_1 \\ C_2\end{bmatrix}^H\right\rangle\right)^{-1}\left\langle\begin{bmatrix} C_1 \\ C_2\end{bmatrix}C_0^*\right\rangle = (\langle CC^H\rangle)^{-1}\langle CC_0^*\rangle.$$

Notice that in the two-microphone case (M=2), $\beta=(\langle CC^H\rangle)^{-1}\rangle CC_0^*\langle$ reduces to $$\beta = \frac{\langle C_1 C_0^*\rangle}{\langle |C_1|^2\rangle},$$

which (apart from the complex conjugation) is similar to the definition of $\beta$ otherwise in this application for a two-microphone GSC beamformer, but similar to the definition provided in [Bitzer & Simmer; 2001].

For the three-microphone case, we may further re-write the above equation as $$\beta = \begin{bmatrix}\beta_1 \\ \beta_2\end{bmatrix} = \left(\left\langle\begin{bmatrix} C_1 \\ C_2\end{bmatrix}\begin{bmatrix} C_1 \\ C_2\end{bmatrix}^H\right\rangle\right)^{-1}\left\langle\begin{bmatrix} C_1 \\ C_2\end{bmatrix}C_0^*\right\rangle = \begin{bmatrix}\langle |C_1|^2\rangle & \langle C_1C_2^*\rangle \\ \langle C_2C_1^*\rangle & \langle |C_2|^2\rangle\end{bmatrix}^{-1}\begin{bmatrix}\langle C_1C_0^*\rangle \\ \langle C_2C_0^*\rangle\end{bmatrix} = \frac{1}{\langle |C_1|^2\rangle\langle |C_2|^2\rangle - \langle C_2C_1^*\rangle\langle C_1C_2^*\rangle}\begin{bmatrix}\langle |C_2|^2\rangle & -\langle C_1C_2^*\rangle \\ -\langle C_2C_1^*\rangle & \langle |C_1|^2\rangle\end{bmatrix}\begin{bmatrix}\langle C_1C_0^*\rangle \\ \langle C_2C_0^*\rangle\end{bmatrix}$$

We thus have $$\beta_1 = \frac{\langle |C_2|^2\rangle\langle C_1C_0^*\rangle - \langle C_1C_2^*\rangle\langle C_2C_0^*\rangle}{\langle |C_1|^2\rangle\langle |C_2|^2\rangle - \langle C_2C_1^*\rangle\langle C_1C_2^*\rangle}$$

and $$\beta_2 = \frac{\langle |C_1|^2\rangle\langle C_2C_0^*\rangle - \langle C_2C_1^*\rangle\langle C_1C_0^*\rangle}{\langle |C_1|^2\rangle\langle |C_2|^2\rangle - \langle C_2C_1^*\rangle\langle C_1C_2^*\rangle}$$

As $\langle |C_1|^2\rangle\langle |C_2|^2\rangle C_2C_1^*\langle C_1C_2^*\rangle$, we may add a constant to the denominator in order to avoid dividing by zero and hereby limit the size of $\beta$.

From the above, it is clear that in order to calculate $\beta$ we need to average across two real ($\langle |C_1|^2\rangle$ and $\langle |C_2|^2\rangle$) and three imaginary terms ($\langle C_2C_1^*\rangle=\langle C_1C_2^*\rangle^*$, $\langle C_2 C_0^*\rangle$ and $(C_RC_0^*\rangle$). This is one average less compared to averaging each element of the covariance matrix (3 real averages, and 3 complex averages), and thus advantageous, when minimizing computational complexity (and thus power consumption) is a priority, as e.g. in hearing aids. In general, for M microphones, we need one real average less than when calculating the covariance matrix directly. This can be explained by the fact that the noise covariance matrix is present in both the numerator and the denominator. Therefore, we only need to estimate the covariance up to a scaling, which in the beamformer multiplication implementation saves a single real average.

The target preserving beamformer ($C_0$) is given by the weights a. The weights may be obtained from the target steering d vector as $$a = \frac{dd_{ref}^*}{d^H d}$$

The weights of the target cancelling beamformers can be found by selecting M−1 rows from the matrix given by.

$$I - \frac{dd^H}{d^H d},$$

e.g.

$$b_1 = \begin{bmatrix}1 \\ 0 \\ 0\end{bmatrix} - \frac{dd_1^*}{d^H d},\ b_2 = \begin{bmatrix}0 \\ 1 \\ 0\end{bmatrix} - \frac{dd_2^*}{d^H d}.$$

Other options (than the example above) for selecting the beamformer weights $b_1$ and $b_2$, which both cancel the signal from the target direction, exists.

In this case, each target cancelling beamformer becomes a linear combination of all three microphones. We notice that $a^HB=0$.

Alternatively, we may construct the blocking matrix solely from two independent two-microphone beamformers (similar to a Griffiths-Jim beamformer).

We may e.g. select the two first order beamformers in the blocking matrix in the following way (e.g. by removing input signal $X_3$ to $b_1$ and input signal $X_2$ to $b_2$):

We define $$d_{12} = \begin{bmatrix}d_1 \\ d_2 \\ 0\end{bmatrix},\ d_{13} = \begin{bmatrix}d_1 \\ 0 \\ d_3\end{bmatrix}.$$

The weights of the two first order beamformers thus become $$b_1 = \begin{bmatrix}1 \\ 0 \\ 0\end{bmatrix} - \frac{d_{12}d_1^*}{d_{12}^H d_{12}},\ b_2 = \begin{bmatrix}1 \\ 0 \\ 0\end{bmatrix} - \frac{d_{13}d_1^*}{d_{13}^H d_{13}}.$$

Hereby the structure of the blocking matrix becomes $$B = [b_1, b_2] = \begin{bmatrix}b_{11} & b_{12} \\ b_{21} & 0 \\ 0 & b_{32}\end{bmatrix}.$$

We notice that $a^HB=0$ is still true.

The three-microphone generalized sidelobe canceller based on two first order target cancelling beamformers is illustrated in FIG. 8B. FIG. 8B shows a schematic view of an implementation of a directional noise reduction system as in FIG. 8A, but wherein rather than creating two independent target-cancelling beamformers based on all three microphones, two independent first order target cancelling beamformers may be created. The two- or three-input target cancelling beamformers may be activated in different ('two- and three-input target cancelling beamformer'-) modes of operation of the system. Compared to FIG. 8A (which may illustrate a three-input target cancelling beamformer-mode), the dashed connections have been removed in the 'two-input target cancelling beamformer-mode' represented by the solid connections of FIG. 8B. The dimension of the various elements (weights (a, $b_1$, $b_2$) and adaptive update coefficients (β)) defining the beamformer are as indicated in FIG. 8A for the M=3 case (and repeated in FIG. 8B). A difference is that one of the elements of each column of the blocking matrix B is zero for the two-input target cancelling beamformer'-mode of operation of the system of FIG. 8B.

In general, it can be argued that the battery capacity is not well spent on powering three microphones in all situations. We may apply three microphone-based beamforming only in the most complex environments. Which microphones to fade away form may depend on the microphone configuration in the hearing device. It may be desirable to fade towards the two microphones whose axis is most parallel to a front-rear axis in an ordinary situation where the ser focuses attention on a sound source in the environment. In an own voice pickup (telephone) mode of operation of the hearing aid, a different two-microphone configuration may be selected. In case one of the microphones is detected not to work, the two still functional microphones may preferably be selected.

In a three-microphone input system (first mode of operation), the GSC-structure comprises a (e.g. fixed) three-input target maintaining beamformer (a) and first and second (e.g. fixed) two-input target cancelling beamformers ($b_1$, $b_2$), whereas in a two-microphone input system the GSC-structure comprises a (one, e.g. fixed) two-input target maintaining beamformer (a) and a single (e.g. fixed) two-input target cancelling beamformer ($b_1$).

Figure 8C:
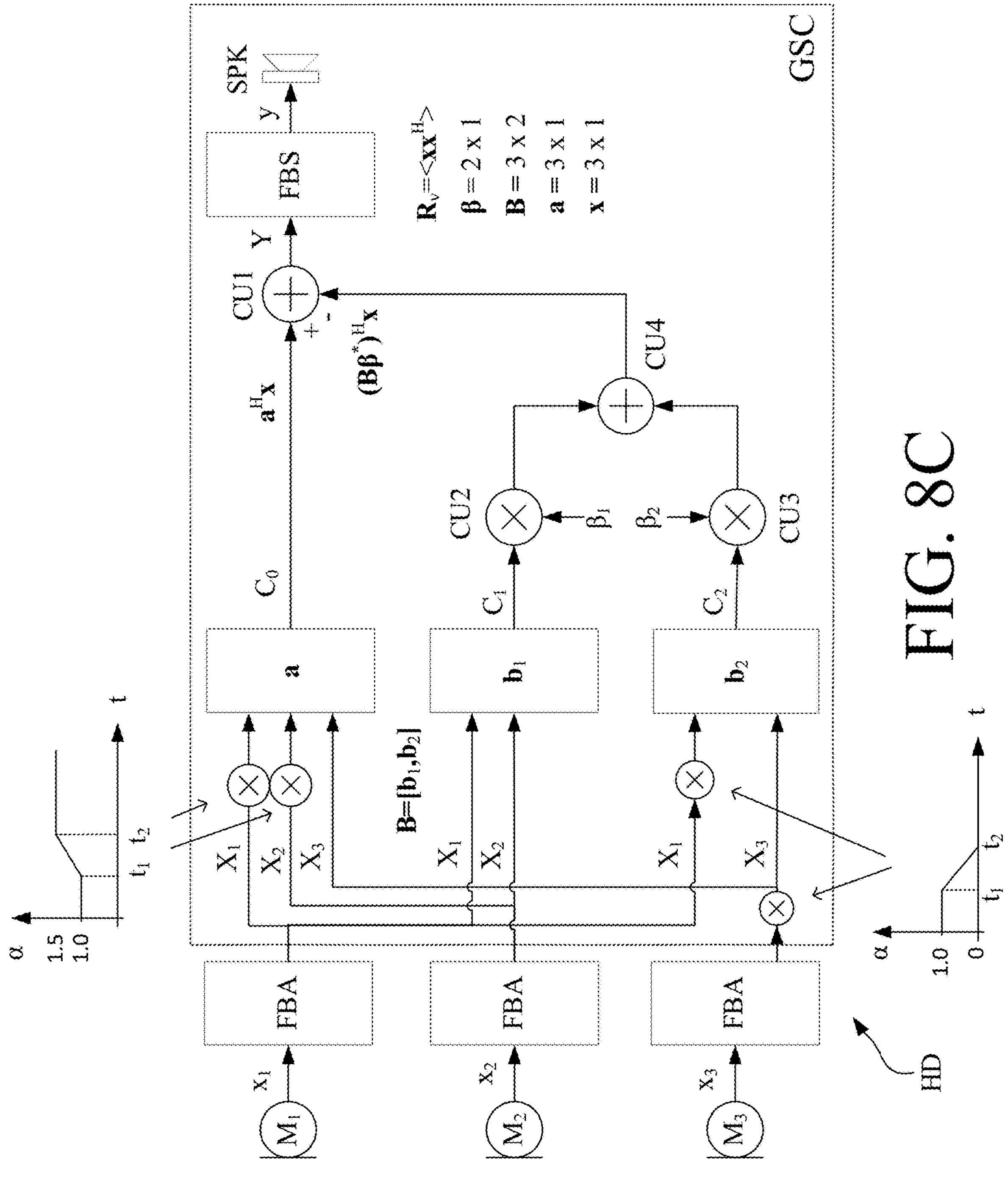
FIG. 8C shows a schematic view of an implementation of a directional noise reduction system as in FIG. 8B, wherein the influence on the beamformer weights of the fading from three to two or two to three microphones as inputs to the target cancelling beamformers is indicated, FIG. 9 schematically illustrates a surface of a loss function L as function of the real and imaginary parts of the adaptive parameter B.

FIG. 8C shows a schematic view of an implementation of a directional noise reduction system as in FIG. 8B, wherein the influence on the beamformer weights of the fading from three to two (or two to three) microphones as inputs to the target cancelling beamformers is indicated. FIGS. 8A and 8B are related to respective examples of a three input MVDR beamformer implemented as a GSC-structure (GSC) (cf. indication of update rules for the adaptive parameter vector β). It should be noted, though, that FIG. 8C illustrates a fading scheme from two to three (or vice versa) microphone inputs to the directional noise reduction system (GSC-beamformer), but is not particularly tied to an MVDR beamformer.

The starting point is a system comprising 3 inputs to the target maintaining (TM) beamformer (a) and 2 inputs to each of the target cancelling (TC) beamformers ($b_1$, $b_2$).

We then remove an input (e.g. by deactivating a microphone) to the target maintaining as well as to the target cancelling beamformers, whereby the TC-beamformers that previously received the 'removed input' are 'cancelled' (input signals are faded to zero), whereas the two remaining inputs to the TM-beamformer are faded to increase their input levels (to avoid artefacts).

The fading from a more to less (e.g. three to two) input audio data streams to a (e.g. target maintaining) beamformer over a certain fading time period may e.g. comprise that an input stage is configured to provide the more (e.g. three) data streams as input signals to the directional noise reduction system at a first point in time $t_1$ and to provide the less (e.g. two) data streams as input signals at a second point in time $t_2$, where the second time $t_2$ is larger than the first time $t_1$. The fading time $\Delta t_{fad}=t_2-t_1$ may e.g. be smaller than a predefined time range, e.g. $\Delta t_{fad}<20$ s, or <10 s, such as <5 s, e.g. between 1 s and 5s.

The fading process may comprise determining respective fading parameters ($t_1$, $t_2$), $\alpha(t_1)$, $\alpha(t_2)$) of a fading curve that gradually decreases (or increases) a weight of affected input signals, cf. e.g. fading curves (a vs. t) in the upper and lower parts of FIG. 8C.

In a directional system comprising three microphones as in FIG. 8C, the target maintaining beamformer ($C_0$) may apply approximately ⅓ of the weighting (a) to each microphone signal ($X_1$, $X_2$, $X_3$). In a directional system comprising two microphones, the target maintaining beamformer ($C_0$) may apply approximately ½ of the weighting (a) to each microphone signal. The simplest thing to do when fading is to apply a scaling to each weight while fading, i.e. while fading from three to two microphones (or vice versa). An example hereof is shown in FIG. 8C, where the scaling (a) is implemented by multiplication units ('X'), cf. arrows from the fading curves (scaling, a vs. time, t) in the upper and lower parts of FIG. 8C).

FIG. 8C shows a hearing aid (HD) comprising directional noise reduction system comprising a three-microphone input GSC-structure (GSC) comprising a (e.g. fixed) target maintaining beamformer (a) and first and second (e.g. fixed) target cancelling beamformers ($b_1$, $b_2$). The first and second target cancelling beamformers are based on a subset of two of the three microphone input signals ($X_1$, $X_2$, $X_3$). The hearing aid is configured to shift (e.g. fade) between a first and a second mode of operation, wherein all three microphone inputs ($X_1$, $X_2$, $X_3$) are active in the first mode and wherein only two of the three microphone inputs ($X_1$, $X_2$) are active in the second mode of operation. In other words, one of the three microphones ($M_3$) and one of the beamformers ($b_2$) can be deactivated in the second mode of operation.

In the example of FIG. 8C, one target cancelling beamformer (the one containing the third microphone ($M_3$)) is faded out (illustrating fading from three to two inputs to the target-maintaining beamformer (a)). Meanwhile the target-maintaining beamformer weights (a) are increased 50% e.g. by changing a weight scaling of the two remaining coefficients of input signals ($X_1$, $X_2$) from 1 to 1.5 and fading the third coefficient (on input signal $X_3$) to 0. After fading, the third microphone ($M_3$) may be turned completely off in order to save computational power. Additionally, one of the target cancelling beamformers (the one ($b_2$) containing the third microphone signal ($X_3$)) is faded out.

As an example, imagine that the target maintaining beamformer $a=[⅓, ⅓, ⅓]^T$ in a three input configuration. When fading out the third microphone, we have $$a^H x = [1/3, 1/3, 1/3] * [x_1, x_2, 0],$$

if we do not change the weights. Instead, we propose to change (e.g. fade) a to $[½, ½, 0]^T$, before turning the third microphone off.

The hearing aid may be configured to store beamformer weights (and fading parameters) in memory that are optimized in advance for the first and second modes of operation of the directional system.

The main advantage of using two-microphone (target-cancelling) beamformers in a three-microphone system is that it becomes easier to fade between a 2-microphone system and a 3-microphone system, as the target cancelling beamformer can be re-used.

The initiation of a transition from the first to the second mode of operation (or from the second to the first mode of operation) may be controlled by the user via a user interface of by a control signal in dependence of an indicator a complexity of the current acoustic environment around the user.

The trigger for entering the specific mode of operation (change from three to two inputs to the target cancelling beamformers) may e.g. be related to saving power. The trigger may e.g. be based on the input level or another parameter, e.g. provided by a sound scene detector.

The sound scene complexity may trigger fading from two to three microphones. The trigger may e.g. be a function of level, SNR, remaining battery time, movement.

The MVDR beamformer weight is proportional to $$W_{MVDR} \propto R_V^{-1} d^H.$$

If the estimated beamformer weights w are not already scaled such that $w^H d=1$, we may normalize the weights such that $$W = \frac{w}{(w^H d)^*}.$$

Hereby we have $$w^H d = \left(\frac{w}{(w^H d)^*}\right)^H d = \frac{w^H d}{w^H d} = 1.$$

Recall that the weights can be written as $$\begin{bmatrix} w_1 \\ w_2 \\ w_3 \end{bmatrix} = \begin{bmatrix} a_1 \\ a_2 \\ a_3 \end{bmatrix} - \begin{bmatrix} b_{11} & b_{12} \\ b_{21} & b_{22} \\ b_{31} & b_{32} \end{bmatrix} \begin{bmatrix} \beta_1 \\ \beta_2 \end{bmatrix}^*$$

We thus have $$w_1 = a_1 - \beta_1^* b_{11} - \beta_2^* b_{12}$$

$$w_2 = a_2 - \beta_1^* b_{21} - \beta_2^* b_{22}$$

$$w_3 = a_3 - \beta_1^* b_{31} - \beta_2^* b_{32}$$

For two microphones, we may isolate $\beta_1$ from $w_1=a_1-\beta_1{}^*b_{11}$, i.e.

$$\beta_1 = \left(\frac{w_1 - a_1}{b_{11}}\right)^*.$$

For three microphones, we may easily isolate $\beta_1$ and $\beta_2$ in the case, where the blocking matrix is given in terms of first order beamformers, $$B = \begin{bmatrix} b_{11} & b_{12} \\ b_{21} & 0 \\ 0 & b_{32} \end{bmatrix}.$$

In that case we have $$\beta_1 = \left(\frac{w_2 - a_2}{b_{21}}\right)^*$$

and $$\beta_2 = \left(\frac{w_3 - a_3}{b_{32}}\right)^*.$$

Besides saving a few multiplications in each row of the blocking matrix, the advantage of basing the target cancelling beamformers on first order cardioids (e.g. in the two-input target cancelling beamformer'-mode of operation of the system), is that it is possible to adjust each beamformer independently (to obtain a deeper target cancellation null (using the three input target-cancelling beamformers) simply by adjusting a single parameter.

Also, it becomes easier to fade from a three-microphone system into a two-microphone system without changing the target cancelling beamformer weights, because we have predefined sets of weights with 3 and 2 weights for each target-cancelling beamformer. When the target cancelling beamformer weight is based on two microphones, it becomes easier fading to a two-microphone system (or from 2 to 3), because the target cancelling beamformer will remain the Similar to the two-microphone case, the update coefficients ($\beta$ ($\beta_1$, $\beta_2$)) may be adaptively estimated for more than two microphones. For the three-microphone case, the least-square error (LMS) is estimated. Given the output Y of the 3-input GSC-structure $$Y(k) = C_0(k) - \beta_1(k)C_1(k) - \beta_2(k)C_2(k),$$

in the notation of FIG. 8A, 8B.

In terms of $C_0$, $C_1$, $C_2\beta_1$, and $\beta_2$, the magnitude squared of the output ($|Y|^2$) can be re-written as $$\begin{aligned} |Y|^2 &= (C_0 - \beta_1 C_1 - \beta_2 C_2)(C_0 - \beta_1 C_1 - \beta_2 C_2)^* \\ &= |C_0|^2 + |\beta_1|^2|C_1|^2 + |\beta_2|^2|C_2|^2 - \\ &\quad C_0\beta_1^* C_1^* - C_0\beta_2^* C_2^* - C_0^*\beta_1 C_1 - \\ &\quad C_0^*\beta_2 C_2 + \beta_1^* C_1^* \beta_2 C_2 + \beta_1 C_1 \beta_2^* C_2^*. \end{aligned}$$

The derivative with respect to the real ($\Re$) and imaginary ($\Im$) parts of $\beta_1$ can be derived:

$$\frac{\partial |Y|^2}{\partial \Re\beta_1} = 2\Re\beta_1|C_1|^2 + (C_1^*\beta_2 C_2 + C_1\beta_2^* C_2^* - C_0 C_1^* - C_0^* C_1)$$

$$\frac{\partial |Y|^2}{\partial \Im\beta_1} = 2\Im\beta_1 + j(-C_1^*\beta_2 C_2 + C_1\beta_2^* C_2^* + C_0 C_1^* - C_0^* C_1)$$

$$\begin{aligned} \frac{\partial |Y|^2}{\partial \beta_1} &= -2\left(C_0 C_1^* - \beta_2 C_1^* C_2 - \beta_1 |C_1|^2\right) \\ &= -2C_1^*(C_0 - \beta_1 C_1 - \beta_2 C_2) \\ &= -2C_1^* Y. \end{aligned}$$

Likewise, the derivative w.r.t $\beta_2$ can be derived and is given by $$\frac{\partial|Y|^2}{\partial\beta_2} = -2C_2^*Y.$$

We thus notice that the gradient update is similar to the two-microphones case, and the LMS-update of $$\beta = \begin{bmatrix}\beta_1\\ \beta_2\end{bmatrix}$$

is given by $$\beta(n) = \beta(n-1) + \mu C^* Y,$$

where $$C = \begin{bmatrix}C_1\\ C_2\end{bmatrix}.$$

Rather than using the LMS framework, a faster update may be obtained using the Normalized LMS (NLMS) algorithm given by $$\beta(n) = \beta(n-1) + \mu\frac{C^*Y}{\|C\|^2}.$$

The LMS/NLMS formula for updating the coefficients ($\beta$) are valid for any number of microphones >1.

It may however be worth mentioning that the division in an LMS/NLMS update can be less accurate compared to a division used in a single step estimation. In the NLMS case, however, the division can be implemented simply by a shift operator, which is computationally cheaper. An alternating estimation of the coefficients ($\beta$) is proposed in the following.

In order to estimate $\beta$, we have several options. We may either estimate $\beta$ directly as $$\beta_1 = \frac{\langle|C_2|^2\rangle\langle C_0C_1^*\rangle - \langle C_2C_1^*\rangle\langle C_0C_2^*\rangle}{\langle|C_1|^2\rangle\langle|C_2|^2\rangle - \langle C_2C_1^*\rangle\langle C_1C_2^*\rangle}$$

and $$\beta_2 = \frac{\langle|C_1|^2\rangle\langle C_0C_2^*\rangle - \langle C_1C_2^*\rangle\langle C_0C_1^*\rangle}{\langle|C_1|^2\rangle\langle|C_2|^2\rangle - \langle C_2C_1^*\rangle\langle C_1C_2^*\rangle}.$$

Or we may update $\beta_1$ and $\beta_2$ using the NLMS algorithm as $$\beta_1(n) = \beta_1(n-1) + \mu\frac{C_1^*Y}{|C_1|^2 + |C_2|^2},$$

$$\beta_2(n) = \beta_2(n-1) + \mu\frac{C_2^*Y}{|C_1|^2 + |C_2|^2}.$$

As the direct calculation of $\beta_1$ and $\beta_2$ include quartic ($4^{th}$ order) terms it is not very easy to implement in fixed-point arithmetic. The NLMS algorithm seems (at first sight) more promising, as only quadratic terms are involved.

However, the NLMS requires careful selection of the learning rate in order to ensure stability.

As an alternative solution to the above considered solutions, let us revisit the gradients $$\left(\frac{\partial|Y|^2}{\partial\beta_1}, \frac{\partial|Y|^2}{\partial\beta_2}\right)$$

of the output magnitude squared $|Y|^2$ with respect to the update coefficients $\beta$ $$\frac{\partial|Y|^2}{\partial\beta_1} = -2C_1^*(C_0 - \beta_1C_1 - \beta_2C_2)$$

$$\frac{\partial|Y|^2}{\partial\beta_2} = -2C_2^*(C_0 - \beta_1C_1 - \beta_2C_2)$$

By setting the gradients=0, we obtain the two expressions:

$$\beta_1 = \frac{C_1^*C_0 - \beta_2C_1^*C_2}{|C_1|^2}$$

$$\beta_2 = \frac{C_2^*C_0 - \beta_1C_2^*C_1}{|C_2|^2}$$

We may thus find the optimal set pair of $\beta_1$, $\beta_2$, by iteratively alternating between the two expressions (where the beamformer expressions are averaged over time (<•>)):

$$\beta_1 = \frac{\langle C_1^*C_0\rangle - \beta_2\langle C_1^*C_2\rangle}{\langle|C_1|^2\rangle}$$

$$\beta_2 = \frac{\langle C_2^*C_0\rangle - \beta_1\langle C_2^*C_1\rangle}{\langle|C_2|^2\rangle}$$

It is proposed to iteratively alternate between determining $\beta_1$ (by the above equation, given a previously estimated value of $\beta_2$) and $\beta_2$ (by the above equation, given the previously estimated value of $\beta_1$).

In this solution, we do not have to select a learning rate. We solely need to select a smoothing coefficient for the average operators $\langle \bullet\bullet \rangle$. In addition, if the $\beta$-terms fluctuate during convergence, it may be advantageous to apply a little low-pass filtering to $\beta_1$ and to $\beta_2$.

Notice, from the above equations, we may also insert $$\beta_2 = \frac{C_2^*C_0 - \beta_1C_2^*C_1}{|C_2|^2} \text{ into } \beta_1 = \frac{C_1^*C_0 - \beta_2C_1^*C_2}{|C_1|^2},$$

and thus isolate $\beta_1$. Hereby, we again obtain $$\beta_1 = \frac{\langle|C_2|^2\rangle\langle C_0C_1^*\rangle - \langle C_2C_1^*\rangle\langle C_0C_2^*\rangle}{\langle|C_1|^2\rangle\langle|C_2|^2\rangle - \langle C_2C_1^*\rangle\langle C_1C_2^*\rangle}$$

and $$\beta_2 = \frac{\langle|C_1|^2\rangle\langle C_0C_2^*\rangle - \langle C_1C_2^*\rangle\langle C_0C_1^*\rangle}{\langle|C_1|^2\rangle\langle|C_2|^2\rangle - \langle C_2C_1^*\rangle\langle C_1C_2^*\rangle}.$$

which are identical to the above formulas for $\beta_1$ and $\beta_2$.

Consider the signal to noise ratio defined from a target covariance matrix $R_T$ and a noise covariance matrix $R_V$:

$$SNR(w) = \frac{w^H R_T w}{w^H R_V w}.$$

We may estimate the weights w which maximizes the SNR as the eigenvector belonging to the largest generalized eigenvalue (thereby providing a GEV-beamformer). Notice that the weight vector w can be scaled by an arbitrary phase and amplitude, and still maximize the SNR. If calculating an eigenvalue is too computationally expensive, we may instead provide an approximation by maximizing the SNR using gradient ascent. The gradient is given by $$\begin{aligned}\nabla SNR(w) &= \frac{2}{w^H R_v w}[R_s w - SNR(w) R_v w] \\ &= 2\frac{w^H R_v w R_s w}{(w^H R_v w)^2} - 2\frac{w^H R_s w R_v w}{(w^H R_v w)^2}. \\ &= 2\frac{w^H R_v w R_s w - w^H R_s w R_v w}{(w^H R_v w)^2}\end{aligned}$$

Now, let us consider a more constrained optimization, where we write the weight in terms of a generalized sidelobe canceller.

In the following we assume that we can define specific time frequency units belonging to either the target signals T or the noise signals V. We may thus estimate the target covariance matrix based on the part of the input signal belonging to the target $R_T = \langle xx^H \rangle_T$. The subscript T denotes that we average over samples belonging to the target signal. Similarly, we may define the noise covariance matrix as $R_V = \langle xx^H \rangle_V$, where the subscript V denotes an average based on the samples belonging to the noise.

Recall that the output signal is given by $$Y(k) = C_0(k) - \beta_1(k)C_1(k) - \beta_2(k)C_2(k) \ \ldots \ - \beta_{M-1}(k)C_{M-1}(k),$$

where $C_0(k)$ is a signal providing an unaltered response for a given target direction, and $C_1(k), \ldots, C_{M-1}(k)$ are M−1 independent target cancelling beamformers. In the following, we disregard the frequency index k. β denotes the adaptive weights.

Recall that the output $Y = w^H x = (w_{C0} - \beta_1 {}^* w_{C1} - \beta_2 {}^* w_{C2} \ldots - \beta_{M-1} w_{C(M-1)})^H x$. As $C_T$ can be written as $\langle xx^H \rangle_T$, we may write the SNR as $$SNR = \frac{\langle Y_T Y_T^* \rangle}{\langle Y_V Y_V^* \rangle} = \frac{\langle |Y_T|^2 \rangle}{\langle |Y_V|^2 \rangle}$$

For simplicity we consider the first order differential beamformer, where $$|Y|^2 = (C_0 - \beta C_1)(C_0 - \beta C_1)^*$$

Hereby we can rewrite the SNR loss function $\mathcal{L}$ in terms of β.

$$\mathcal{L}(\beta) = \frac{\langle |Y_T|^2 \rangle}{\langle |Y_V|^2 \rangle} = \frac{\langle (C_{T0} - \beta C_{T1})(C_{T0} - \beta C_{T1})^* \rangle}{\langle (C_{V0} - \beta C_{V1})(C_{V0} - \beta C_{V1})^* \rangle}.$$

In an aspect, a generalized sidelobe canceller (GSC) comprising a specific location/direction, for which the target is unaltered, is provided. The adaptation coefficients may be updated in order to maximize the SNR of the beamformed signal (rather than the target-direction-signal to-noise-ratio), hereby allowing the target to impinge from more directions than the specific (unaltered) target direction.

We know that the gradient of $|Y|^2$ is given by $$\frac{\partial |Y|^2}{\partial \beta} = -2C_{v1}^* Y$$

In order to find the derivative of the fraction, we use the quotient rule: The derivative of a quotient is the denominator times the derivative of the numerator minus the numerator times the derivative of the denominator, all divided by the square of the denominator, i.e.

$$\nabla \mathcal{L} = \frac{\partial \mathcal{L}}{\partial \beta} = \frac{-2\langle C_{T1}^* Y_T \rangle \langle |Y_V|^2 \rangle + 2\langle C_{V1}^* Y_V \rangle \langle |Y_T|^2 \rangle}{\langle |Y_V|^2 \rangle^2}$$

We may thus update using gradient ascent (here generalized to M microphones, cf. $C_T^*$, $C_V^*$)

$$\beta(n) = \beta(n-1) + \mu \frac{-2\langle C_T^* Y_T \rangle \langle |Y_V|^2 \rangle + 2\langle C_V^* Y_V \rangle \langle |Y_T|^2 \rangle}{\langle |Y_V|^2 \rangle^2}.$$

$$\text{Where } \beta = \begin{bmatrix} \beta_1 \\ \vdots \\ \beta_{M-1} \end{bmatrix}, C_T = \begin{bmatrix} C_{T1} \\ \vdots \\ C_{T,M-1} \end{bmatrix}, \langle C_T^* Y_T \rangle = \begin{bmatrix} \langle C_{T1}^* Y_T \rangle \\ \vdots \\ \langle C_{T,M-1}^* Y_T \rangle \end{bmatrix},$$

$$C_V = \begin{bmatrix} C_{V1} \\ \vdots \\ C_{V,M-1} \end{bmatrix}, \text{ and } \langle C_V^* Y_V \rangle = \begin{bmatrix} \langle C_{V1}^* Y_V \rangle \\ \vdots \\ \langle C_{V,M-1}^* Y_V \rangle \end{bmatrix}$$

Notice, removing averages in the above update assuming that the averaging can be applied via the β learning rate μ is not going to work (as it is mathematically incorrect). The MVDR LMS update without averaging does however work, as averaging via learning rate goes well, when there is only a single averaging term.

If we take a closer look at the gradient $$\frac{-2\langle C_{T1}^* Y_T \rangle \langle |Y_V|^2 \rangle + 2\langle C_{V1}^* Y_v \rangle \langle |Y_T|^2 \rangle}{\langle |Y_V|^2 \rangle^2},$$

we see that the numerator and denominator have the same order (quartic), the LMS update is thus already normalized. However, rather than normalizing by the real scalar $\langle |Y_V|^2 \rangle^2$, we may also consider other normalization strategies:

$$\beta(n) = \beta(n-1) + \mu \frac{-2\langle C_T^* Y_T \rangle \langle |Y_V|^2 \rangle + 2\langle C_V^* Y_V \rangle \langle |Y_T|^2 \rangle}{\langle |Y_T|^2 + |Y_V|^2 \rangle^2}$$

(or alternatively (preferably) reusing the calculation of averages from the numerator (same as above))

$$\beta(n) = \beta(n-1) + \mu\frac{-2\langle C_T^* Y_T\rangle\langle|Y_V|^2\rangle + 2\langle C_V^* Y_V\rangle\langle|Y_T|^2\rangle}{\left(\langle|Y_T|^2\rangle + \langle|Y_V|^2\rangle\right)^2}.$$

We may also normalize by averaging across the output signal.

$$\beta(n) = \beta(n-1) + \mu\frac{-2\langle C_T^* Y_T\rangle\langle|Y_V|^2\rangle + 2\langle C_V^* Y_V\rangle\langle|Y_T|^2\rangle}{\langle|Y|^2\rangle^2}.$$

Or averaging by the target cancelling beamformers:

$$\beta(n) = \beta(n-1) + \mu\frac{-2\langle C_T^* Y_T\rangle\langle|Y_V|^2\rangle + 2\langle C_V^* Y_V\rangle\langle|Y_T|^2\rangle}{\langle|C_T|^2 + |C_V|^2\rangle^2}$$

(or alternatively applying separate averages (same result))

$$\beta(n) = \beta(n-1) + \mu\frac{-2\langle C_T^* Y_T\rangle\langle|Y_V|^2\rangle + 2\langle C_V^* Y_V\rangle\langle|Y_T|^2\rangle}{\left(\langle|C_T|^2\rangle + \langle|C_V|^2\rangle\right)^2}.$$

The LMS update rate may be further increased by adding a momentum term. The momentum term is given by $$\mu(n+1) = \begin{cases} \rho\mu(n), & \text{if } \mathcal{L}_n > \mathcal{L}_{n-1} \\ \sigma\mu(n), & \text{if } \mathcal{L}_n < \mathcal{L}_{n-1} \end{cases}$$

where $\rho>1$, e.g. equal to 1.01 or 1.1, and $0<\sigma<1$, e.g. 0.5. Notice that the intervals would be swapped if $\mathcal{L}$ was to be minimized rather than maximized. We may also apply a maximum and a minimum value that $\mu$ may take, i.e.

$$\mu(n+1) = \begin{cases} \min(\rho\mu(n), \mu_{max}), & \text{if } \mathcal{L}_n > \mathcal{L}_{n-1} \\ \max(\sigma\mu(n), \mu_{min}), & \text{if } \mathcal{L}_n < \mathcal{L}_{n-1} \end{cases}$$

Comparison to MVDR

By considering the gradient, $$\frac{\partial\mathcal{L}}{\partial\beta} = \frac{-2\langle C_{T1}^* Y_T\rangle\langle|Y_V|^2\rangle + 2\langle C_{V1}^* Y_V\rangle\langle|Y_T|^2\rangle}{\langle|Y_V|^2\rangle^2},$$

we see that in the case where the target signal impinges from the look direction, we have $C_{T1}=0$, and the gradient reduces to $$\frac{2\langle C_{V1}^* Y_V\rangle\langle|Y_T|^2\rangle}{\langle|Y_V|^2\rangle^2},$$

which only differs from the LMS gradient of the MVDR beamformer by a scalar.

Sign LMS:

In practice, it may be hard to ensure a stable step size, as small values in the denominator of the gradient dramatically may increase the step size. A more stable update is achieved by moving with a more fixed step size towards the gradient ascent direction or approximately towards the gradient ascent direction (e.g. using the (e.g. complex) sign-LMS algorithm). An approximate, but cheap step in the gradient direction is to adapt B with a fixed value in the direction the real and imaginary part, i.e.

$$\Re\beta(n) = \Re\beta(n-1) + \mu_{\Re}\text{sign}\left(R\left(C_{V1}^* Y_V|Y_T|^2 - C_{T1}^* Y_T|Y_V|^2\right)\right)$$

$$\Im\beta(n) = \Im\beta(n-1) + \mu_{\Im}\text{sign}\left(\Im\left(C_{V1}^* Y_V|Y_T|^2 - C_{T1}^* Y_T|Y_V|^2\right)\right)$$

Where $Y_T$ and $Y_V$ are the most recent available output signal estimates, and $\mu_{\Re}$ and $\mu_{\Im}$ are fixed step sizes.

We also notice that we may easily convert the GEV gradient ascent beamformer into an MVDR gradient ascent beamformer simply by setting $C_{T1}{}^*Y_T|Y_V|^2=0$.

Momentum:

In order to increase the convergence rate, the step sizes may be updated with a momentum term, i.e. either $$\mu_{\Re}(n+1) = \begin{cases} \rho\mu_{\Re}(n), & \text{if } \text{sign}(\Re\nabla\mathcal{L}_n) = \text{sign}(\Re\nabla\mathcal{L}_{n-1}) \\ \sigma\mu_{\Re}(n), & \text{if } \text{sign}(\Re\nabla\mathcal{L}_n) \neq \text{sign}(\Re\nabla\mathcal{L}_{n-1}) \end{cases}$$

and $$\mu_{\Im}(n+1) = \begin{cases} \rho\mu_{\Im}(n), & \text{if } \text{sign}(\Im\nabla\mathcal{L}_n) = \text{sign}(\Im\nabla\mathcal{L}_{n-1}) \\ \sigma\mu_{\Im}(n), & \text{if } \text{sign}(\Im\nabla\mathcal{L}_n) \neq \text{sign}(\Im\nabla\mathcal{L}_{n-1}) \end{cases}$$

or directly depending on the (gradient ascent) cost function $$\mu_{\Re}(n+1) = \begin{cases} \rho\mu_{\Re}(n), & \text{if } \mathcal{L}_n > \mathcal{L}_{n-1} \\ \sigma\mu_{\Re}(n), & \text{if } \mathcal{L}_n < \mathcal{L}_{n-1} \end{cases}$$

and $$\mu_{\Im}(n+1) = \begin{cases} \rho\mu_{\Im}(n), & \text{if } \mathcal{L}_n > \mathcal{L}_{n-1} \\ \sigma\mu_{\Im}(n), & \text{if } \mathcal{L}_n < \mathcal{L}_{n-1} \end{cases}.$$

Where $\rho$ is slightly greater than 1, such as 1.01 or 1.1 and $0<\sigma<1$, such as 0.5 or 0.2. We also recommend that an upper bound and a lower bound is set on $\mu_{\Re}$ and $\mu_{\Re}$.

The update may also be based on averages (which is the mathematically correct implementation. However, omitting the average operator only has limited consequences as the fixed step size ensures that):

$$\Re\beta(n) = \Re\beta(n-1) + \mu_{\Re}\text{sign}\left(R\left(\langle C_{V1}^* Y_V\rangle\langle|Y_T|^2\rangle - \langle C_{T1}^* Y_T\rangle\langle|Y_V|^2\rangle\right)\right)$$

$$\Im\beta(n) = \Im\beta(n-1) + \mu_{\Im}\text{sign}\left(\Im\left(\langle C_{V1}^* Y_V\rangle\langle|Y_T|^2\rangle - \langle C_{T1}^* Y_T\rangle\langle|Y_V|^2\rangle\right)\right)$$

For three microphones the sign-based LMS is given by $$\Re\beta_1(n) = \Re\beta_1(n-1) + \mu_{\Re}\,\text{sign}\left(\Re\left(C_{V1}^* Y_V|Y_T|^2 - C_{T1}^* Y_T|Y_V|^2\right)\right)$$

$$\Im\beta_1(n) = \Im\beta_1(n-1) + \mu_{\Im}\,\text{sign}\left(\Im\left(C_{V1}^* Y_V|Y_T|^2 - C_{T1}^* Y_T|Y_V|^2\right)\right)$$

and

-continued $$\Re\beta_2(n) = \Re\beta_2(n-1) + \mu_{\Re}\,\mathrm{sign}\left(\Re\left(C_{V2}^{*} Y_V |Y_T|^2 - C_{T2}^{*} Y_T |Y_V|^2\right)\right)$$

$$\Im\beta_2(n) = \Im\beta_2(n-1) + \mu_{\Im}\,\mathrm{sign}\left(\Im\left(C_{V2}^{*} Y_V |Y_T|^2 - C_{T2}^{*} Y_T |Y_V|^2\right)\right)$$

Notice that $Y_V$ and $Y_T$ both depend on the most recent estimates of $\beta_1$ and $\beta_2$.

Instant Solution:

We may also find the optimal $\beta$ simply by setting $$r\frac{\partial \mathcal{L}}{\partial \beta} = 0,$$

i.e. for the two-microphone case:

$$0 = -2\langle C_{T1}^{*} Y_T\rangle\langle |Y_V|^2\rangle + 2\langle C_{V1}^{*} Y_V\rangle\langle |Y_T|^2\rangle$$

By rearranging the terms, we have $$0 = \beta^2\left(\langle |C_{T1}|^2\rangle\langle C_{V1}C_{V0}^{*}\rangle - \langle |C_{V1}|^2\rangle\langle C_{T1}C_{T0}^{*}\rangle\right) + \beta\left(\langle C_{V1}C_{V0}^{*}\rangle\langle C_{T0}C_{T1}^{*}\rangle - \langle C_{T1}C_{T0}^{*}\rangle\langle C_{V0}C_{V1}^{*}\rangle - \langle |C_{T1}|^2\rangle\langle |C_{V0}|^2\rangle + \langle |C_{T0}|^2\rangle\langle |C_{V1}|^2\rangle\right) + \langle C_{T0}C_{T1}^{*}\rangle\langle |C_{V0}|^2\rangle - \langle C_{V0}C_{V1}^{*}\rangle\langle |C_{T0}|^2\rangle.$$

We thus find beta by solving the complex second order polynomial, where the two solutions correspond to the value of $\beta$ corresponding to either the maximum or the minimum of $\mathcal{L}$. The two solutions to the polynomials are given by $$\beta = \frac{-B \pm \sqrt{B^2 - 4AC}}{2A}$$

where $$A = \langle |C_{T1}|^2\rangle\langle C_{V1}C_{V0}^{*}\rangle - \langle |C_{V1}|^2\rangle\langle C_{T1}C_{T0}^{*}\rangle$$

$$B = \langle C_{V0}C_{V1}^{*}\rangle\langle C_{T1}C_{T0}^{*}\rangle - \langle C_{T0}C_{T1}^{*}\rangle\langle C_{V1}C_{V0}^{*}\rangle - \langle |C_{T1}|^2\rangle\langle |C_{V0}|^2\rangle + \langle |C_{T0}|^2\rangle\langle |C_{V1}|^2\rangle$$

$$C = \langle C_{T0}C_{T1}^{*}\rangle\langle |C_{V0}|^2\rangle - \langle C_{V0}C_{V1}^{*}\rangle\langle |C_{T0}|^2\rangle.$$

Figure 9:
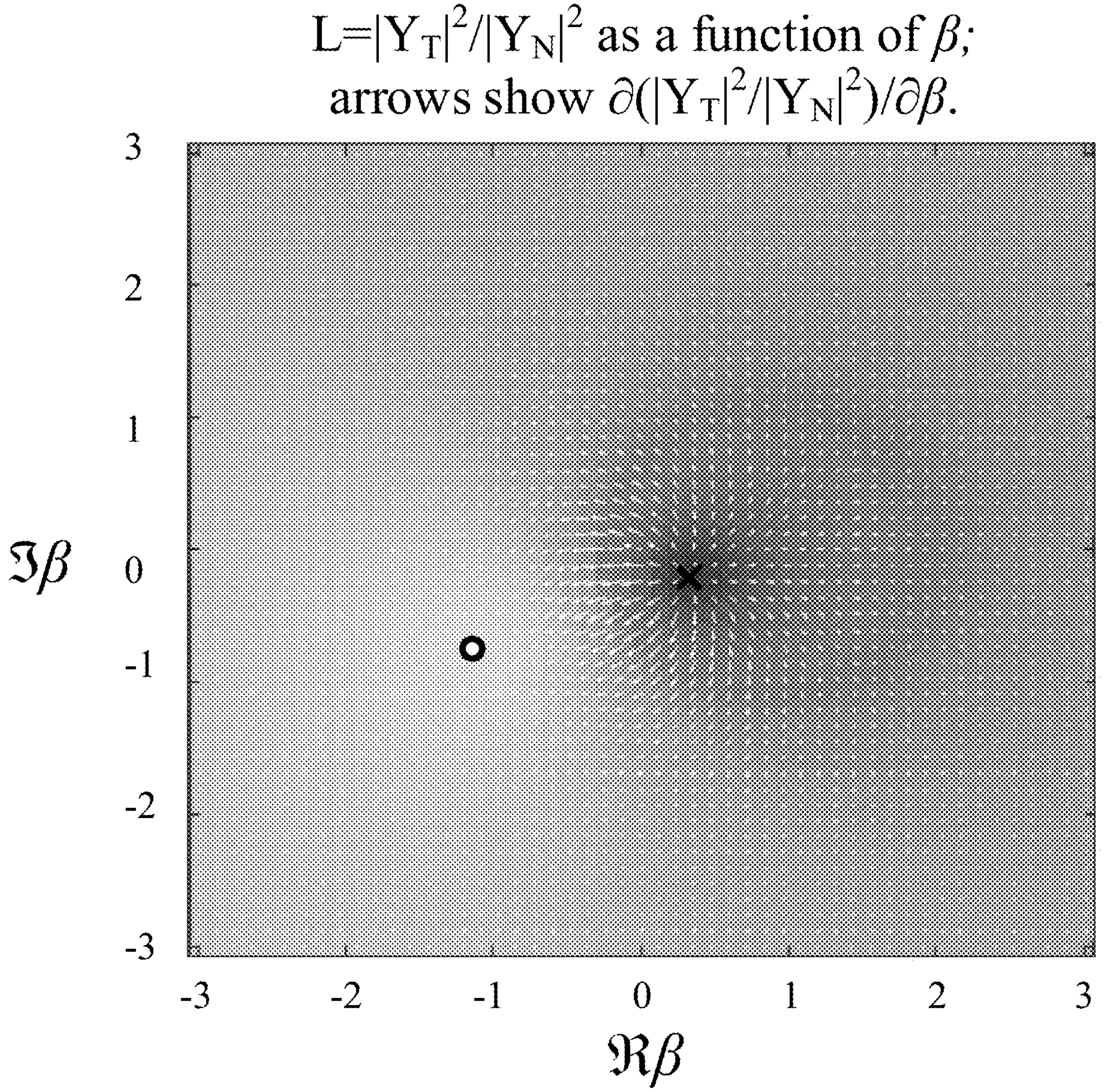

An example of the SNR plotted as function of the real and imaginary parts of $\beta$ is shown in FIG. 9. In order to compare to the MVDR beamformer, we assume a target impinging from a single direction. In that case $C_{T1}=0$, the above equation simplifies to $$0 = -\beta\langle |C_{T0}|^2\rangle\langle |C_{V1}|^2\rangle + \langle C_{V0}C_{V1}^{*}\rangle\langle |C_{T0}|^2\rangle,$$

And we see that the solution reduces to the well-known $$\beta = \frac{\langle C_{V0}C_{V1}^{*}\rangle}{\langle |C_{V1}|^2\rangle}.$$

To summarize: We may estimate a $\beta$ that maximizes an SNR, given two target maintaining beamformers: $C_{T0}$ and $C_{V0}$, and two target cancelling beamformers $C_{T1}$ and $C_{V1}$, where $C_{T0}$ and $C_{T1}$ are updated when the target is present and $C_{V0}$ and $C_{V1}$ are updated when the target is absent. It is not required that the target is solely impinging from the look direction, but the output signal is still distortionless with respect to the selected steering vector. Whether the current signal is defined as either target or noise, can be determined by a voice activity detector, DOA detector, or similar.

FIG. 9 schematically illustrates a surface of a loss function L as function of the real ($\Re\beta$) and imaginary ($\Im\beta$) part of the adaptive parameter $\beta$. The calculated gradients are shown, and the maximum and minimum are plotted with a ○ and an x, respectively. The loss function $L=|Y_T|^2/|Y_v|^2$ is mapped as a function of B. The arrows illustrate the gradient of L with respect to $\beta$: $\partial L/\partial\beta=\partial(|Y_T|^2/|Y_N|^2)/\partial\beta$. This is contrary to the MVDR solution, where we only have a single extremum. In the present case, a maximum as well as a minimum exists, as the SNR (due to the full-rank covariance matrices) cannot become infinitely large or infinitely small.

Figure 10A:
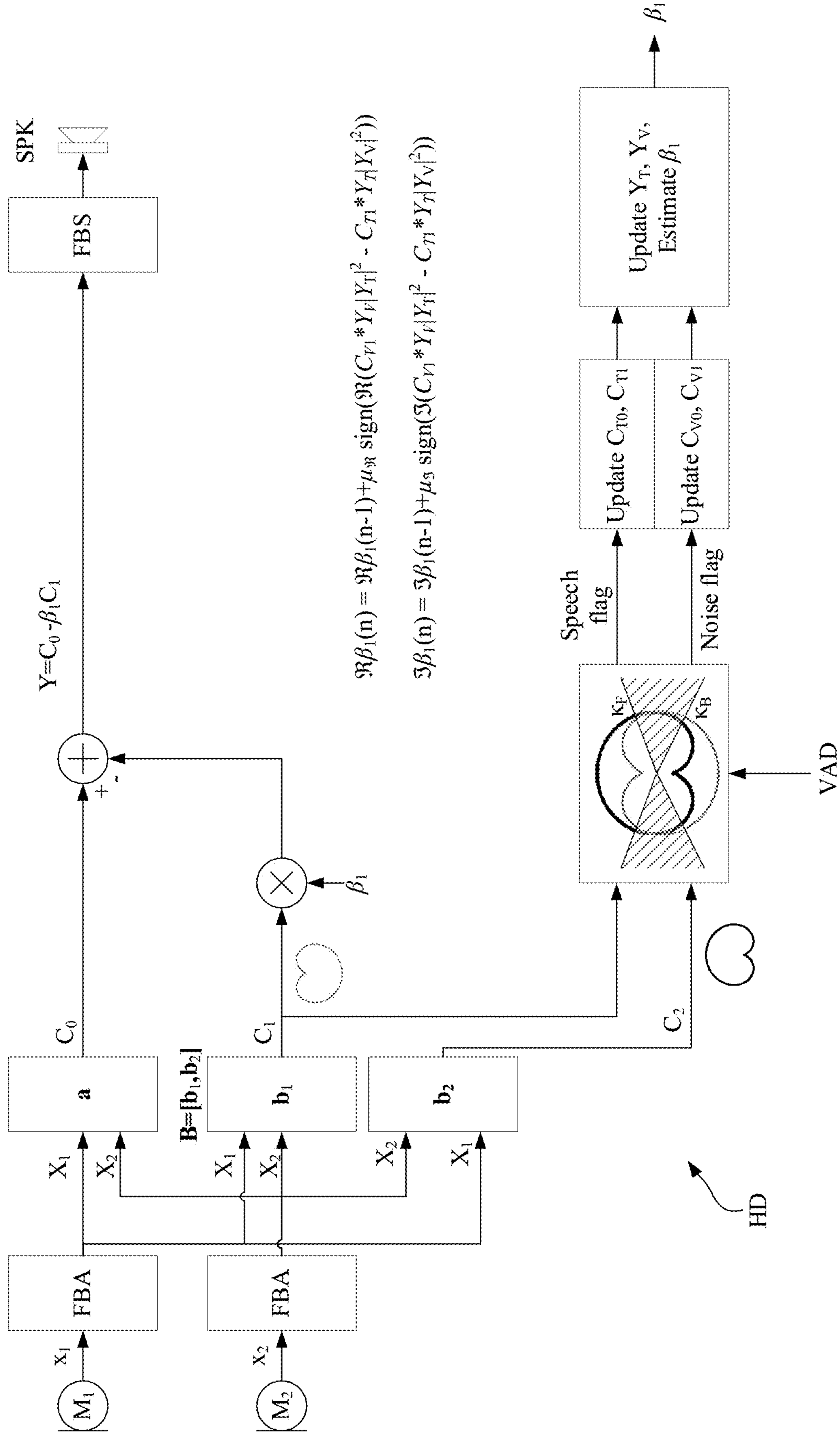
FIG. 10A shows a first example of a two-microphone GEV beamformer with gain normalization towards the front direction.

FIG. 10A shows a first (schematic) example of a hearing device (HD), e.g. a hearing aid, comprising a two-microphone GEV beamformer with gain normalization towards the front direction. The upper signal path schematically illustrates a GSC-structure beamformer (cf. blocks enclosed by dotted rectangle denoted 'GSC') based on two microphone inputs ($X_1$, $X_2$) and a target maintaining (a) and a target cancelling ($b_1$) beamformer whose outputs ($C_0$ and $C_1$, respectively) are combined (using combination units 'X' and '+') in dependence of an adaptive parameter ($\beta_1$) to provide a spatially filtered (beamformed) signal (Y), $Y=C_0-C_1\beta_1$. The upper signal path (forward path), and optionally other parts of the hearing device, may (as shown in FIGS. 10A (and 10B, 10C)) be operated in the time-frequency domain by including analysis and synthesis filter banks as appropriate (see blocks FBA and FBS in FIGS. 10A (and 10B, 10C).

Based on a voice activity detector (VAD), which enables update of target, when speech is detected from the front direction (e.g. determined by a comparison between a front and rear cardioid and a voice activity detector, cf. lower signal path in FIGS. 10A (and 10B, 10C)). It is assumed that the sound of interest mainly is speech from the frontal half-plane. The comparison between the frontal-facing beamformer and the back-facing beamformer is used to distinguish between whether sound is impinging from the front or from the back.

Figure 13:
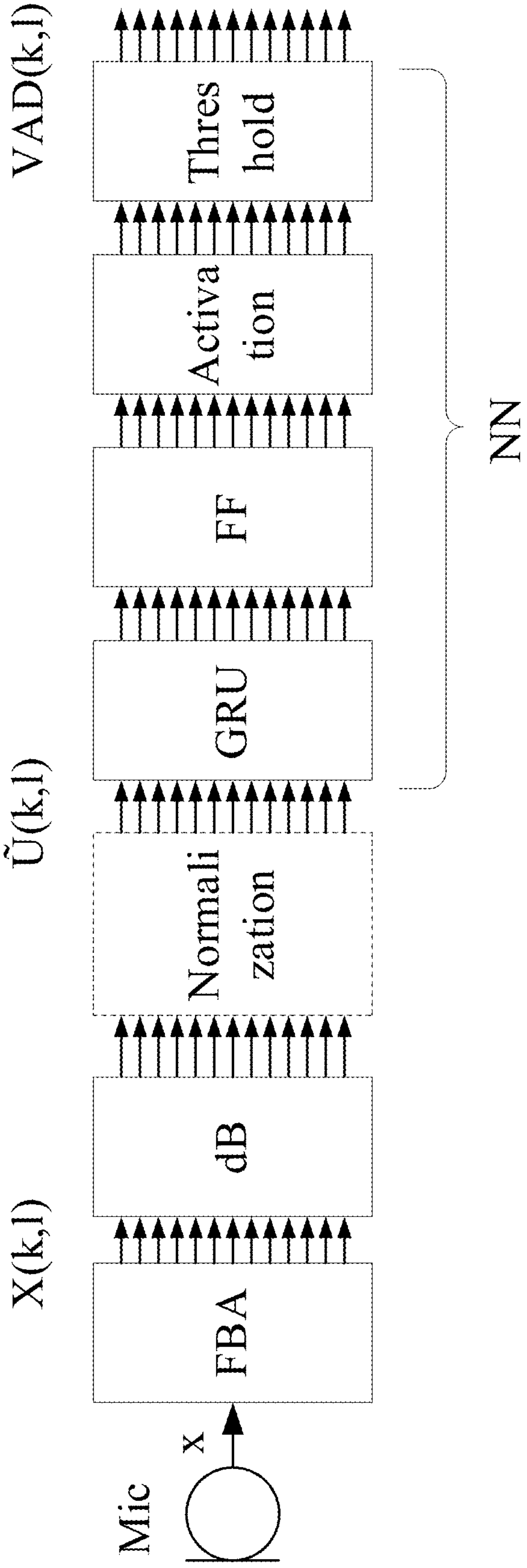

The voice activity detector (VAD, e.g. implemented using a trained neural network, see e.g. FIG. 13) is used to distinguish between sounds of interest (e.g. speech (from any direction)) and noise. The combination of the VAD and the direction-based decisions determine whether the target-related beamformers ($C_{T0}$, $C_{T1}$) or the noise-related beamformers ($C_{V0}$, $C_{V1}$) are updated. As an alternative to updating the beamformers, updating the corresponding covariance matrices ($R_T$ or $R_V$) may be considered. Based on the updated beamformer products, the adaptive beamformer weights (e.g in terms of (1) may be updated, as indicated in the right part of FIG. 10A based on the sign-LMS algorithm.

Figure 10B:
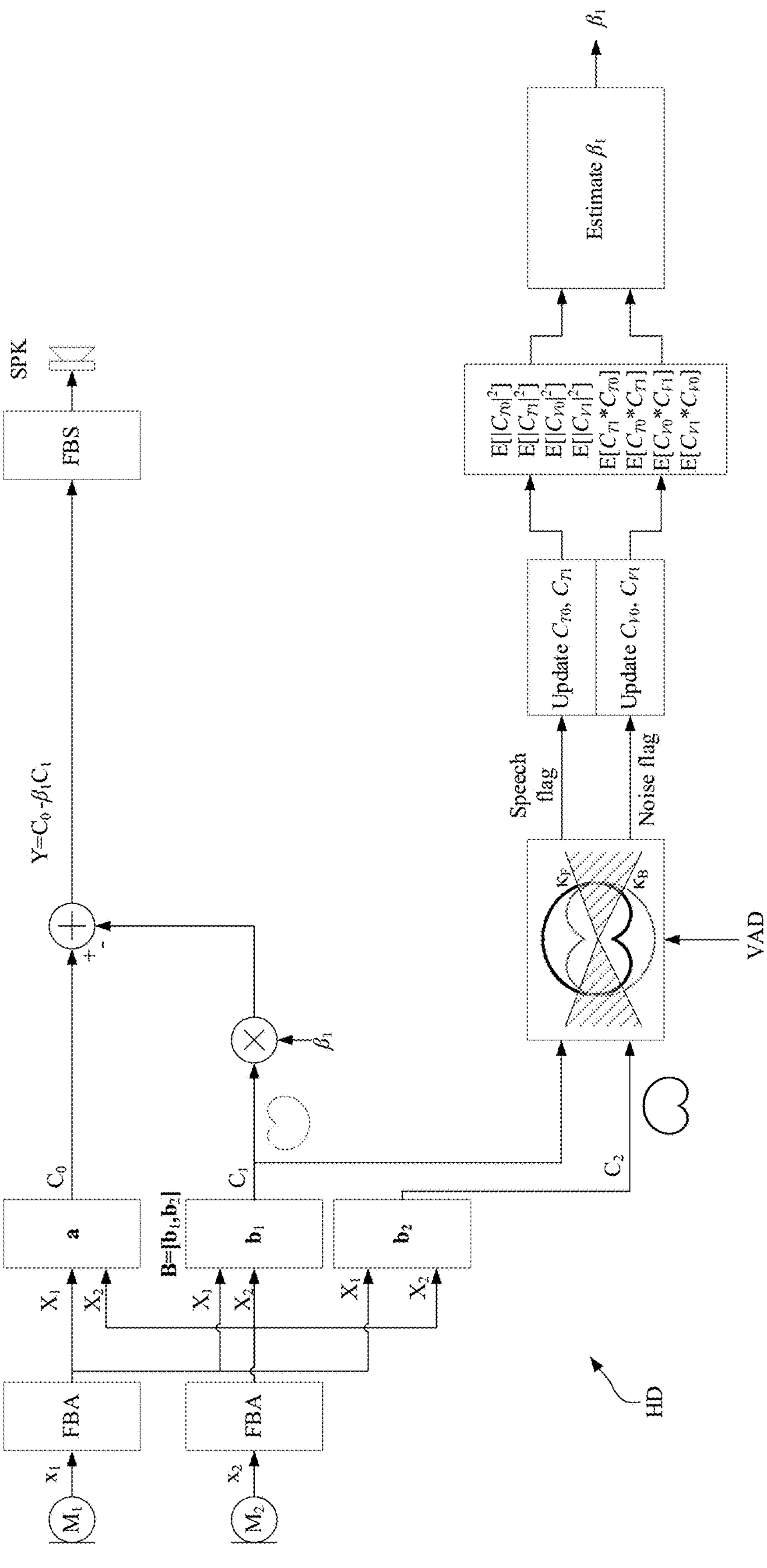
FIG. 10B shows a second example of a two-microphone GEV beamformer with gain normalization towards the front direction.

FIG. 10B shows a second example of a hearing device (HD), e.g. a hearing aid, comprising a two-microphone GEV beamformer with gain normalization towards the front direction. The embodiment of FIG. 10B is similar to the embodiment of FIG. 10A. Compared to FIG. 10A, the adaptation coefficient $\beta_1$ is estimated based on averages between the (products of the) different beamformer signals. The average values allows both updates based on LMS-algorithms, or on an instant update, to be used. The beamformer product averages are typically indicated either by E(•) or $\langle\bullet\rangle$. In FIG. 10B 'E[•]' is used, see e.g. the second last block of the lower path of FIG. 10B mentioning the average beamformer signal products that are determined in the block. In FIG. 10A averaging is not indicated. It is not necessary, because the sign LMS algorithm still works well, even in cases where the decision on the sign direction is incorrect (due to the lack of averages).

Figure 10C:
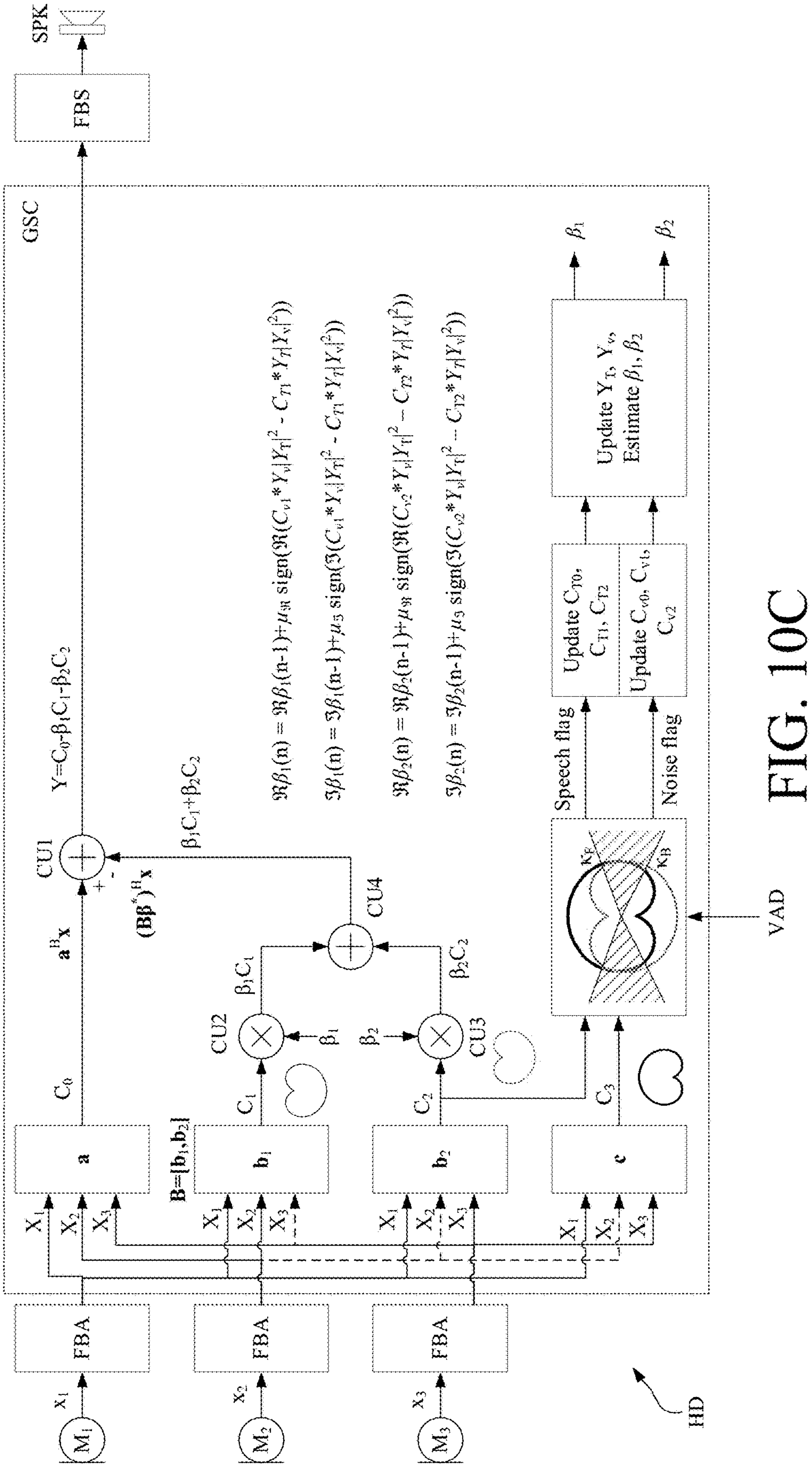
FIG. 10C shows an example of three-microphone GEV beamformer where the adaptive parameter is updated based on a Sign-LMS algorithm, FIG. 11 schematically illustrates an embodiment of a hearing aid according to the present disclosure, FIG. 12 schematically illustrates an embodiment of a hearing aid according to the present disclosure, and FIG. 13 schematically shows an implementation of a speech detector of a hearing aid according to the present disclosure using a neural network.

FIG. 10C shows an example of a hearing device (HD), e.g. a hearing aid, comprising a three-microphone GEV beamformer, where the adaptive parameter is updated based on a Sign-LMS algorithm. The embodiment of FIG. 10C is similar to the embodiment of FIG. 10A. Compared to FIG. 10A, the hearing device of FIG. 10C comprises 3 microphones ($M_1$, $M_2$, $M_3$), and hence the GSC-structure beamformer (GSC) is based on three microphone inputs ($X_1$, $X_2$, $X_3$) and a target maintaining (a) and target cancelling ($b_1$, $b_2$) beamformers whose outputs ($C_0$ and ($C_1$, $C_2$), respectively) are combined in dependence of adaptive parameters ($\beta_1$, $\beta_2$) to provide a spatially filtered (beamformed) signal (Y), $Y=C_0-(C_1\beta_1+C_2\beta_2)$, which is further processed to a signal that is audible for the user, as exemplified in relation to the embodiment of FIG. 10A (and e.g. FIG. 1B).

The front-back comparison may, as illustrated in the lower signal branch of FIG. 10C be based on two first order beampatterns ($b_2$, c, pointing in opposite directions). Preferably the two first order beamformers are based on two microphones which are aligned in the horizontal plane along a front-back axis (cf. e.g. $M_1$ and $M_2$ in FIG. 11). In the embodiment of FIG. 10C, the two first order cardioids provided by beamformers $b_2$, c are based on input signals ($X_1$, $X_3$). Alternatively, the decision may be based on all three available microphone signals ($X_1$, $X_2$, $X_3$). The sign LMS update equations are shown without averaging (E(•) or <•>) in the middle, right part of FIG. 10C, but averaging between the beamformer products may be applied, e.g. if an NLMS update is used rather than a sign LMS update.

FIG. 10C illustrates that voice activity detection (VAD) (or labelling in target (T) and noise (N), cf. arrows 'Speech flag' and 'Noise flag', respectively, in FIG. 10C) can be spatially based on a comparison between a front and a back cardioid. In this case the back cardioid ($C_2$) is based on two microphones (it could also have been based on 3 microphones, as indicated by the dashed line). The back cardioid ($C_1$) (based on microphones $M_1$, $M_2$) could also have been used as input for comparison with the front cardioid ($C_3$) rather than ($C_2$), in which case $C_3$ should preferably have been based on the same two microphones as $C_1$. Switching (e.g. fading) between two and three microphones may be considered (cf. FIG. 8C), e.g. in that the target cancelling beamformers ($b_1$, $b_2$, c) may be based on two or three microphones (as indicated by the dashed lines).

Postfilter Gain:

As we directly aim at maximizing the SNR, our objective function $$\mathcal{L}=\frac{\langle |Y_s|^2\rangle}{\langle |Y_v|^2\rangle}$$

directly yields an estimate of a signal-to noise ratio. We may thus base a postfilter gain on this SNR estimate. Either as a direct mapping of SNR to gain per frequency, or we may train a neural network in order to map our SNR estimates across frequency to gain values (see e.g. EP3694229A1).

Avoiding $R_T=R_V$:

In situations, with little or no noise or a signal from a single direction, there is a risk that the target covariance matrices and the noise covariances (or the corresponding fixed beamformers) may converge towards the same value. This can be avoided by adding a bias to the covariance matrices, i.e.

$$R_T=\langle xx^H\rangle_T+\sigma_s^2 dd^H$$

and $$R_V=\langle xx^H\rangle_V+\sigma_v^2 I$$

where $\sigma_s$ and $\sigma_v$ are small constants. As the microphone signals will always contain microphone noise, it is most important to add a bias to the target covariance matrix, hereby ensuring that the beamformer system will converge towards an MVDR beamformer in the case of low input levels.

The biases may in a similar way be added to the fixed target cancelling beamformers, i.e.

$$C_{T1}=b_1^H x+\sigma_s b_1^H d=b_1^H(x+\sigma_s d)$$

$$C_{T2}=b_2^H x+\sigma_s b_2^H d=b_2^H(x+\sigma_s d)$$

$$C_{V1}=b_1^H x+\sigma_v b_1^H=b_1^H(x+\sigma_v)$$

$$C_{V2}=b_2^H x+\sigma_v b_2^H=b_2^H(x+\sigma_v)$$

Notice, the target covariance matrix may not necessarily be biased towards a single look direction. The bias may as well be selected as a weighted sum across several target directions θ, i.e.

$$R_T=\langle xx^H\rangle_T+\sum_\theta \sigma_{s,\theta}^2 d_\theta d_\theta^H$$

Averages in Terms of Covariance Matrices:

Recall the gradient given by $$\nabla\mathcal{L}=\frac{\partial\mathcal{L}}{\partial\beta}=\frac{-2\langle C_{T1}^*Y_T\rangle\langle |Y_V|^2\rangle+2\langle C_{V1}^*Y_V\rangle\langle |Y_T|^2\rangle}{\langle |Y_V|^2\rangle^2}$$

The gradient is given in terms of averages between different beamformer signals. We may as well express the equation in terms of the covariance matrices. As $Y=(a-B\beta^*)^H x$ and $=B^H x$, we have $$\langle C_{T1}^*Y_T\rangle=\langle Y_T C_{T1}^*\rangle=(a-B\beta^*)^H\langle xx^H\rangle_T B=(a-B\beta^*)^H R_T B$$

$$\langle C_{V1}^*Y_V\rangle=\langle Y_V C_{V1}^*\rangle=(a-B\beta^*)^H\langle xx^H\rangle_V B=(a-B\beta^*)^H R_V B$$

$$\langle Y_{T1}^*Y_T\rangle=\langle Y_T Y_T^*\rangle=(a-B\beta^*)^H\langle xx^H\rangle_T(a-B\beta^*)=(a-B\beta^*)^H R_T(a-B\beta^*)$$

$$\langle Y_{V1}^*Y_V\rangle=\langle Y_V Y_V^*\rangle=(a-B\beta^*)^H\langle xx^H\rangle_V(a-B\beta^*)=(a-B\beta^*)^H R_V(a-B\beta^*)$$

The above modifications are intended to be used in all embodiments comprising beamformers, where SNR of the beamformed signal is maximized (e.g. in connection with GEV or GEV approximated beamformers).

Figure 11:
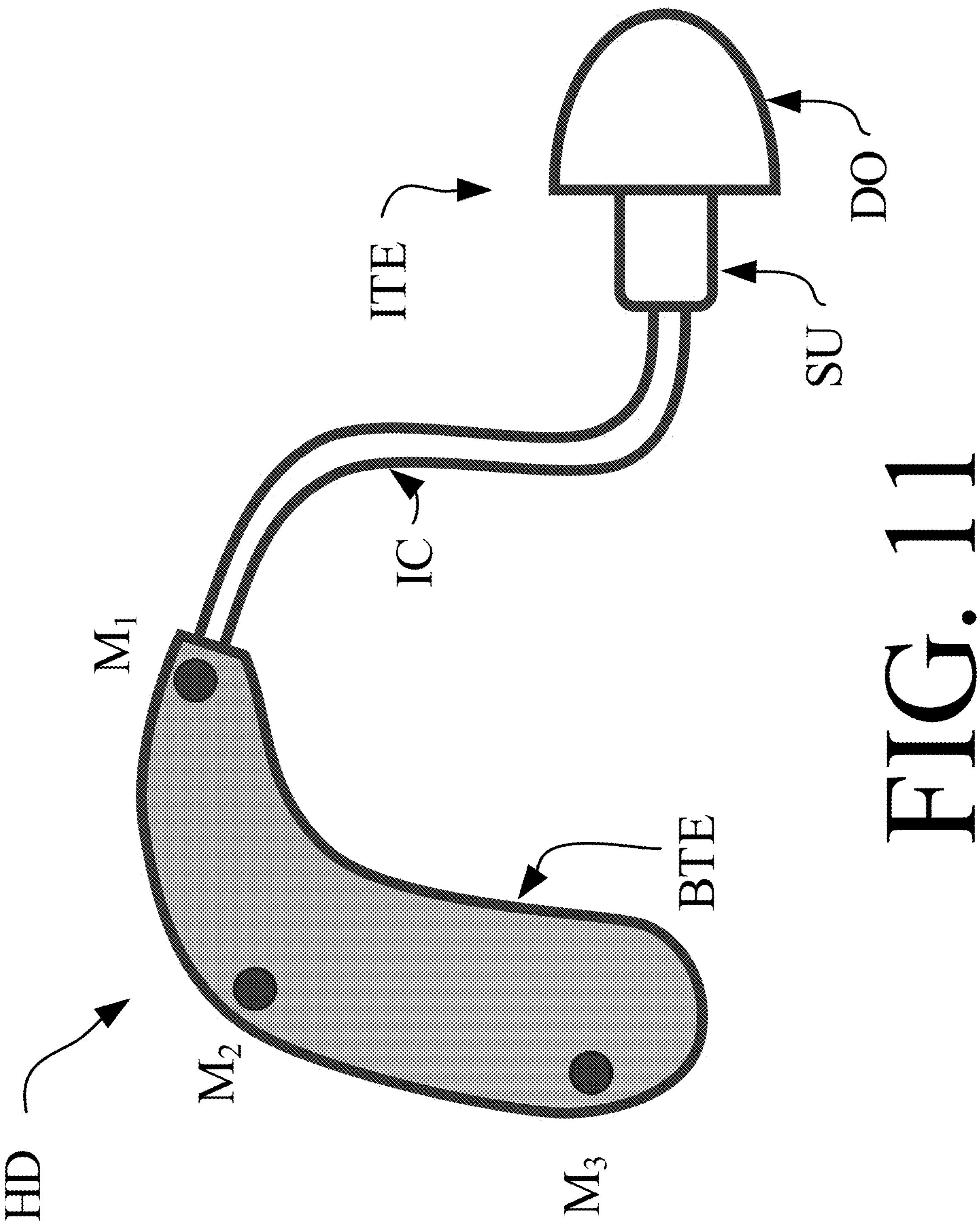

FIG. 11 schematically illustrates an embodiment of a hearing aid (HD) according to the present disclosure. The hearing aid comprises a BTE-part (BTE) adapted to be located at or behind an outer ear (pinna) of a user. The BTE-part comprises a housing wherein a microphone system comprising a multitude of microphones are accommodated (here three ($M_1$, $M_2$, $M_3$) are shown). The microphones ($M_1$, $M_2$, $M_3$) each provide an electric input signal representing sound in the environment of the hearing aid (HD). In the embodiment of FIG. 11, the microphones are located in the housing of the BTE-part, one ($M_1$) in the top part, one ($M_3$) in the bottom end, and one ($M_2$) in the middle of the housing of the BTE part. The three microphones are thereby maximally spaced apart and arranged in an angled manner. This microphone configuration may be utilized to increase the options of a directional system based thereon (e.g. to be able to create a good own voice beamformer, as well as beamformers focusing on (or cancelling) sound sources out a (horizontal) plane defined by the ears and nose of the user). The hearing aid further comprises an ITE-part (ITE) adapted to be located in or at an ear canal of the user. The ITE-part comprises a speaker unit (SU) comprising a loudspeaker for presenting processed sound based on electric input signals provided by the microphones ($M_1$, $M_2$, $M_3$). A (typically flexible) dome-like structure (DO) is attached to the speaker unit (SU) to guide it in the ear canal of the user (whereby the position of the speaker unit when mounted in the ear canal can be controlled).

The BTE- and ITE-parts are mechanically and electrically connected via an interconnecting element (IC) comprising an electric cable for electrically connecting electronic circuitry (e.g a processor) in the BTE-part to electronic circuitry (e.g. the loudspeaker) in the ITE-part.

The processor may comprise a directional noise reduction system according to the present disclosure. The processor may be connected to the microphone system. The directional noise reduction system comprises the at least one beamformer for generating at least one beamformed signal in dependence of beamformer weights (w) configured to be applied to the multitude (M) of electric input signals. The at least one beamformed signal may e.g. be provided as a weighted sum of the multitude (M) of electric input signals provided by the microphone system. The processor may e.g. be configured to adaptively optimize the beamformer weights (w) to a plurality of target positions (θ) by maximizing a target signal to noise ratio (SNR) for sound from the plurality of target positions as provided by the various aspects of the present disclosure.

The hearing aid shown in the embodiment of FIG. 11 is a so-called Receiver In The Ear (RITE) style hearing aid. But other hearing aid styles comprising a multitude of input transducers may benefit from a directional system according to the present disclosure enabling the presentation of a sound signal to a user based on a beamformer comprising multi target direction optimization according to the present disclosure. Such alternative styles may include hearing aids, wherein the output transducer is located in the BTE-part, and where the interconnecting element (IC) between the BTE-part and the ITE-part comprises an acoustic tube to guide the loudspeaker out to the ITE-part (e.g. a mould customized to the ear (e.g. the ear canal) of the user).

FIG. 12 schematically illustrates an embodiment of a hearing aid (HD) according to the present disclosure. The hearing aid comprises three microphones ($M_1$, $M_2$, $M_3$) providing respective (time-domain) electric input signals ($X_1$, $X_2$, $X_3$). Each microphone path comprises an analysis filter bank (FBA) providing respective time-frequency representations ($X_1$, $X_2$, $X_3$) of the electric input signals. The hearing aid (HD) further comprises a beamformer (BF) for receiving the time-frequency representations ($X_1$, $X_2$, $X_3$) of the electric input signals and for providing a beamformed signal (Y) in dependence of beamformer weights (w). The beamformer weights (w) are e.g. estimated by maximizing the SNR, based on estimates of the target and the noise covariance matrices ($R_T$ and $R_V$, respectively) controlled by a voice activity control signal (VAD1) from a voice activity detector. As the acoustic properties of the target and the noise signals are changing rather slowly, the covariance estimates (or beamformer averages) are updated slowly (e.g. using time constants with a duration of 50 ms or higher). The estimated weights (w) from the beamformer block (BF) are used as input to the SNR estimator (cf. block SNR(w) in FIG. 12):

$$SNR(w) = \frac{w^H R_T w}{w^H R_V w}.$$

As the estimates (PF-SNR) of the SNR estimator (SNR (w)) have to be faster due to the fast changes of the speech signals, the estimates of the covariance matrices are based on a much faster averages (e.g. in the order of 1-10 ms). This update of the covariance matrices ($R_T$, $R_V$) may potentially be controlled by a different voice activity control signal (VAD2) provided by a further voice activity detector. The estimated SNR (PF-SNR) is mapped to a postfilter gain (PFG, cf. output of postfilter gain block (PF-gain)), which is applied to the beamformed signal (Y) by multiplication unit (CU, 'X') thereby providing output signal (OUT). The postfilter gain block (PF gain) may contain smoothing across time as well. The postfilter gain block may be implemented using a neural network trained on examples of SNR estimates and desired gain patterns (cf. e.g. EP3694229A1). The (frequency domain) output signal (OUT) from the combination unit is fed to a synthesis filter bank (FBS) providing a corresponding output signal (out) in the time domain. In a typical hearing aid application, the output of the combination unit (CU) comprising a noise reduced input (audio) signal would be fed to a processor for applying further processing algorithms to the signal to enhance its value for a user of the hearing aid, e.g. for increasing intelligibility of speech in the signal or for increasing comfort in listening to an environment signal (e.g. music), as e.g. the audio signal processor (SPRO) in FIG. 1B. The processor may be adapted to apply a compression algorithm for compensating for a hearing impairment of the user.

FIG. 13 schematically shows an example of a voice activity detector (e.g. an own voice detector) implemented as a neural network (NN). The (time domain) electric input signal (x) provided by the input microphone (Mic) is converted into the frequency domain (X (k,l)), k and l being frequency and time indices, respectively, using an analysis filter bank (FBA). The magnitude (|X(k,l)|) of the complex frequency domain signal (X(k,l)) is converted into the logarithmic domain (in the dB block), and an optional normalization is applied (in the 'Normalization' block, the dashed outline indicating 'optional'). The normalization block (Normalization) is followed by neural network layers (NN, exemplified by a gated recurrent unit layer (GRU) and a feedforward layer (FF)). The neural network may comprise one or more (hidden) layers (e.g. between 2 and 5) between the input and output layers. Between the ('hidden') layers of the neural network (here GRU, FF), non-linear activation functions (e.g. implemented as Rectified Linear units (ReLU), sigmoid-, or tan h-functions, etc.) may be applied. At the output layer, an activation function (Activation) (e.g.

a sigmoid) followed by a threshold function (Threshold) are applied. The output of the neural network may be a frequency dependent VAD control signal, indicative of 'voice', 'no-voice' (or optionally 'don't-know'). Different thresholds may be applied based on the voice-activity decision or the no-voice decision. The neural network may contain more or fewer layers than what is shown in the example of FIG. 13. The neural network is trained based on examples of frequency-domain signals, where each sample in time and frequency is labelled either as voice, no-voice, or (optionally) do not care. Alternatively, the labelling is provided as a signal-to-noise ratio (where a high SNR would correspond to VOICE and a low SNR would correspond to NO VOICE).

The input signal to the neural network (NN) is shown as a single microphone signal (here an electric input signal in the time-frequency (logarithmic) domain, optionally normalized ($\tilde{U}(k,l)$), but it may be several signals, or a combination of several signals. The output signal of the neural network may be provided as a time and frequency dependent voice activity control signal (VAD(k,l)) indicative of a voice (e.g. speech) being present or not (or indefinite) in a given time frequency unit (k,l) of the current input signal(s).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP3413589A1 (Oticon) 12 Dec. 2018

EP3300078A1 (Oticon) 28 Mar. 2018.

EP3252766A1 (Oticon) 6 Dec. 2017.

EP3694229A1 (Oticon) 12 Aug. 2020.

[Bitzer & Simmer; 2001] J. Bitzer and K. U. Simmer, "Superdirective Microphone Arrays," in "Microphone Arrays-Signal Processing Techniques," M. Brandstein and D. Wards (Eds.), Springer-Verlag, 2001, Chapter 2.

[Simmer et al.; 2001] Simmer, K. U., Bitzer, J., & Marro, C. "Post-filtering techniques", in "Microphone Arrays-Signal Processing Techniques," M. Brandstein and D. Wards (Eds.), Springer-Verlag, 2001, Chapter 3.

[Souden et al.; 2010] Souden, M., Benesty, J., and Affes, S., "On Optimal Frequency-Domain Multichannel Linear Filtering for Noise Reduction", IEEE Audio Speech and Language Processing vol. 18, no. 2, 2010, pp. 260-276.

[Warsitz & Haeb-Umbach; 2007] E. Warsitz and R. Haeb-Umbach, "Blind acoustic beamforming based on generalized eigenvalue decomposition", IEEE Transactions on Audio, Speech, and Language Processing, vol. 15, no. 5, pp. 1529-1539, 2007.

The invention claimed is:

1. A hearing aid adapted to be worn by a user, the hearing aid comprising:

a microphone system comprising a multitude of M microphones, where M is larger than or equal to two, adapted for picking up sound from an environment of the user and to provide corresponding multitude of M electric input signals, a directional noise reduction system connected to said microphone system, the directional noise reduction system comprising at least one beamformer for generating at least one beamformed signal in dependence of beamformer weights configured to be applied to the multitude of M electric input signals, thereby providing said at least one beamformed signal as a weighted sum of the multitude of M electric input signals, and wherein said beamformer weights are adaptively optimized to a plurality of target positions by maximizing a target signal to noise ratio (SNR) for sound from said plurality of target positions, wherein the target SNR is determined in dependence of said beamformer weights $\langle xx^H \rangle_T$, and $\langle xx^H \rangle_V$, where $\langle \bullet \rangle$ denotes average over time, x denotes the multitude of M electric input signals, and $(.)^H$ denotes Hermitian transposition, and wherein $\langle xx^H \rangle_T$ and $\langle xx^H \rangle_V$ are determined when said multitude of M electric input signals are labelled as target (T) and noise (V), respectively.

2. A hearing aid according to claim 1 comprising a multitude of analysis filter banks configured to provide said multitude of M electric input signals in a time-frequency representation.

3. A hearing aid according to claim 1 comprising a target signal detector configured to provide an indicator of whether or not, or with what probability, a given time frequency unit of said multitude of M electric input comprises a target signal.

4. A hearing aid according to claim 1 comprising a voice activity detector for estimating whether or not, or with what probability, at least one of said multitude of M electric input signals comprises a voice signal at a given point in time, and to provide a voice activity control signal indicative thereof.

5. A hearing aid according to claim 4, wherein voice activity control signal is further dependent on spatial information derived from said multitude of M electric input signals or a signal or signals derived therefrom.

6. A hearing aid according to claim 5, wherein said spatial information is derived from a comparison between a beamformer with its maximum sensitivity towards the frontal half-plane and another beamformer with its sensitivity towards the back half-plane.

7. A hearing aid according to claim 4, wherein said multitude of M electric input signals or said at least one beamformed signal are labelled as target (T) and noise (V), respectively, in dependence of said voice activity control signal.

8. A hearing aid according to claim 1, wherein said at least one beamformer is implemented as a linear combination of two or more pre-defined or adaptively determined beamformers.

9. A hearing aid according to claim 8, wherein a first pre-defined or adaptively determined beamformer is configured to have a spatial maximum towards a specific one of said plurality of target positions.

10. A hearing aid according to claim 8, wherein one or more second pre-defined or adaptively determined beamformers are configured to have a spatial minimum towards a respective one of said plurality of target positions.

11. A hearing aid according to claim 1 wherein said at least one beamformer is implemented as a generalized sidelobe canceller (GSC) for providing said at least one beamformed signal in dependence of said adaptively determined beamformer weights, wherein the generalized sidelobe canceller comprises a multitude of M fixed beamformers, one of the multitude of M fixed beamformers being a target signal maintaining beamformer, and M−1 of the multitude of M fixed beamformers being target-cancelling beamformers, each being configured to generate a beamformed signal in dependence of associated fixed beamformer weights and wherein the adaptively determined beamformer weights are determined in dependence of an adaptive parameter or parameter vector.

12. A hearing aid according to claim 11, wherein said adaptive parameter or parameter vector is determined in dependence of time-averaged values of the target-maintaining beamformer and the M−1 target-cancelling beamformers.

13. A hearing aid according to claim 1, wherein said first output variance is determined based on target directions determined in advance of normal use of the hearing aid.

14. A hearing aid adapted to be worn by a user, the hearing aid comprising:

- a microphone system comprising a multitude of M microphones, where M is larger than or equal to two, adapted for picking up sound from an environment of the user and to provide corresponding multitude of M electric input signals,
- a directional noise reduction system connected to said microphone system, the directional noise reduction system comprising at least one beamformer for generating at least one beamformed signal in dependence of beamformer weights configured to be applied to the multitude of M electric input signals, thereby providing said at least one beamformed signal as a weighted sum of the multitude of M electric input signals, and wherein said beamformer weights are adaptively optimized to a plurality of target positions by maximizing a target signal to noise ratio (SNR) for sound from said plurality of target positions, wherein the target SNR ratio is determined in dependence of said beamformer weights and of respective inter-microphone target covariance and inter-microphone noise covariance matrices.

15. A hearing aid adapted to be worn by a user, the hearing aid comprising:

- a microphone system comprising a multitude of M microphones, where M is larger than or equal to two, adapted for picking up sound from an environment of the user and to provide corresponding multitude of M electric input signals,
- a directional noise reduction system connected to said microphone system, the directional noise reduction system comprising at least one beamformer for generating at least one beamformed signal in dependence of beamformer weights configured to be applied to the multitude of M electric input signals, thereby providing said at least one beamformed signal as a weighted sum of said multitude of M electric input signals, wherein said beamformer weights are adaptively optimized to a plurality of target positions by maximizing a target signal to noise ratio (SNR) for sound from said plurality of target positions wherein the target SNR is expressed in dependence of said beamformer weights, an inter-microphone target covariance matrix, and an inter-microphone noise covariance matrix, and wherein the target covariance matrix is determined in dependence of a plurality of steering vectors for said plurality of target positions.

16. A hearing aid according to claim 15, wherein said target SNR is determined according to the following expression $$SNR(w) = \frac{w^H R_T w}{w^H R_V w}.$$

where H denotes Hermitian transposition.

17. A hearing aid according to claim 15 configured to adaptively optimize said beamformer weights by estimating the beamformer weights as the eigenvector belonging to the largest generalized eigenvalue.

18. A hearing aid according to claim 15, wherein the at least one beamformer comprises a Generalized Eigenvector beamformer (GEV) or an approximation thereof.

* * * * *